(12) United States Patent
Jang et al.

(10) Patent No.: US 11,716,133 B2
(45) Date of Patent: Aug. 1, 2023

(54) METHOD AND APPARATUS FOR CHANGING BEAM OF TERMINAL IN WIRELESS COMMUNICATION SYSTEM

(71) Applicant: Samsung Electronics Co., Ltd., Gyeonggi-do (KR)

(72) Inventors: Youngrok Jang, Gyeonggi-do (KR); Hoondong Noh, Gyeonggi-do (KR); Jinhyun Park, Gyeonggi-do (KR); Hyoungju Ji, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 17/762,979

(22) PCT Filed: Sep. 16, 2020

(86) PCT No.: PCT/KR2020/012485
§ 371 (c)(1),
(2) Date: Mar. 23, 2022

(87) PCT Pub. No.: WO2021/060766
PCT Pub. Date: Apr. 1, 2021

(65) Prior Publication Data
US 2022/0345195 A1    Oct. 27, 2022

(30) Foreign Application Priority Data
Sep. 27, 2019    (KR) .......................... 10-2019-0120126

(51) Int. Cl.
*H04L 5/00* (2006.01)
*H04B 7/06* (2006.01)
(Continued)

(52) U.S. Cl.
CPC ......... *H04B 7/0695* (2013.01); *H04B 7/0691* (2013.01); *H04L 5/0051* (2013.01); *H04W 72/23* (2023.01); *H04W 72/535* (2023.01)

(58) Field of Classification Search
CPC ... H04L 5/0048; H04L 5/0051; H04L 5/0094; H04L 5/0053; H04L 25/03; H04L 5/0044;
(Continued)

(56) References Cited

U.S. PATENT DOCUMENTS 10,841,914 B2 * 11/2020 Liou .................... H04L 5/0094
2018/0145742 A1   5/2018 Li et al.
(Continued)

FOREIGN PATENT DOCUMENTS

WO    WO 2019/099659    5/2019

OTHER PUBLICATIONS

European Search Report dated Sep. 8, 2022 issued in counterpart application No. 20869242.6-1206, 9 pages.
(Continued)

*Primary Examiner* — Eva Y Puente
(74) *Attorney, Agent, or Firm* — The Farrell Law Firm, P.C.

(57) ABSTRACT

An operating method of a base station in a wireless communication system includes receiving, from a terminal, information related to a first beam switching time for transmission of an uplink signal, determining a second beam switching time for transmission of the uplink signal, based on configuration information related to the uplink signal and the first beam switching time, transmitting the configuration information related to the uplink signal and the second beam switching time to the terminal, and receiving the uplink signal from the terminal, wherein the uplink signal includes at least one of a sounding reference signal (SRS), a physical uplink shared channel (PUSCH), or a physical uplink control channel (PUCCH).

15 Claims, 17 Drawing Sheets

(51) Int. Cl.
*H04W 72/23* (2023.01)
*H04W 72/50* (2023.01)

(58) Field of Classification Search
CPC .. H04L 5/0007; H04W 72/046; H04W 72/23; H04W 16/28; H04W 24/08; H04W 72/0453; H04W 72/0446; H04B 7/0695; H04B 7/0408; H04B 7/0626; H04B 7/088; H04B 7/0404; H04B 7/06; H04B 7/0617
USPC .......................................................... 375/267
See application file for complete search history.

(56) References Cited

U.S. PATENT DOCUMENTS

| | | | | |
|---|---|---|---|---|
| 2019/0239212 | A1* | 8/2019 | Wang | .................... H04L 5/0051 |
| 2019/0260456 | A1 | 8/2019 | Zhou et al. | |
| 2019/0297648 | A1 | 9/2019 | Nagaraja et al. | |
| 2019/0357193 | A1* | 11/2019 | Bai | ........................ H04W 72/56 |
| 2020/0107235 | A1* | 4/2020 | Peisa | ..................... H04W 24/08 |
| 2021/0376894 | A1* | 12/2021 | Cha | ...................... H04B 7/0695 |

OTHER PUBLICATIONS

Qualcomm Incorporated, "Enhancements on Multi-beam Operation", R1-1900906, 3GPP TSG-RAN WG1 Ad-Hoc Meeting 1901, Jan. 21-25, 2019, 23 pages.
Intel Corporation, "On TCI State Switch Delay", R4-1900111, 3GPP TSG-RAN WG4 Meeting #90, Feb. 25-Mar. 1, 2019, 5 pages.
Intel Corporation, "On SRS Antenna Switching in FR2", R4-1903123, 3GPP TSG-RAN WG4 Meeting #90Bis, Apr. 8-12, 2019, 6 pages.
International Search Report dated Dec. 18, 2020 issued in counterpart application No. PCT/KR2020/012485, 17 pages.

* cited by examiner

METHOD AND APPARATUS FOR CHANGING BEAM OF TERMINAL IN WIRELESS COMMUNICATION SYSTEM

PRIORITY

This application is a National Phase Entry of PCT International Application No. PCT/KR2020/012485, which was filed on Sep. 16, 2020, and claims priority to Korean Patent Application No. 10-2019-0120126, which was filed on Sep. 27, 2019, the entire content of each of which is incorporated herein by reference.

TECHNICAL FIELD

The present disclosure relates to a wireless communication system, and more particularly, to a method and apparatus for changing a beam of a terminal.

BACKGROUND ART

To meet the increase in demand with respect to wireless data traffic after the commercialization of $4^{th}$ generation (4G) communication systems, considerable efforts have been made to develop improved $5^{th}$ generation (5G) communication systems or pre-5G communication systems. For this reason, 5G or pre-5G communication systems are called beyond 4G network communication systems or post long-term evolution (post-LTE) systems. To achieve a high data rate, the implementation of 5G communication systems in an ultra-high frequency band (millimeter wave (mmWave)) (e.g., a 60 GHz band) is under consideration. To alleviate path loss of radio waves and increase propagation distances of radio waves in a millimeter wave band, technologies for 5G communication systems, such as beamforming, massive multi-input multi-output (MIMO), full dimensional MIMO (FD-MIMO), array antenna, analog beamforming, and large-scale antenna system, are being discussed. Also, in order to improve a system network for 5G communication, systems, technologies, such as evolved small cell, advanced small cell, cloud radio access network (cloud RAN), ultra-dense network, device-to-device (D2D) communication, wireless backhaul, moving network, cooperative communication, coordinated multi-points (CoMP), and reception interference cancellation, are being developed. In addition, for 5G communication systems, hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced access technologies, have been developed.

The Internet has evolved from a human-centered connection network, through which humans generate and consume information, to an Internet of things (IoT) network that exchanges and processes information between distributed elements such as objects. An Internet of everything (IoE) technology is emerging, in which a technology related to the IoT is combined with, for example, a technology for processing big data through connection with a cloud server. In order to implement the IoT, various technical components are required, such as, a sensing technology, wired/wireless communication and network infrastructures, a service interfacing technology, a security technology, etc. In recent years, technologies including a sensor network for connecting objects, machine-to-machine (M2M) communication, machine type communication (MTC), etc., have been studied. In the IoT environment, intelligent Internet technology (IT) services may be provided to collect and interpret data obtained from objects connected to each other, and to create new value in human life. As existing information technology (IT) and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to IoT networks. For example, technologies related to sensor networks, M2M communication, MTC, etc., are implemented by using 5G communication technologies including beamforming, MIMO, array antenna, etc. The application of cloud RAN as the big data processing technology described above may be an example of convergence of 5G communication technology and IoT technology.

As mobile communication systems are developed, various services may be provided. Therefore, there is a demand for a method of effectively providing these services.

DESCRIPTION OF EMBODIMENTS

Disclosed embodiments relate to a method and apparatus for a beam switching operation of a terminal in a wireless communication system.

Advantageous Effects of Disclosure

According to the present disclosure, a time required for a beam switching operation of a terminal in a wireless communication system may be defined and the beam switching operation of the terminal may be accordingly configured, such that the uplink transmission performance of the terminal may be improved.

BEST MODE

Figure 1:
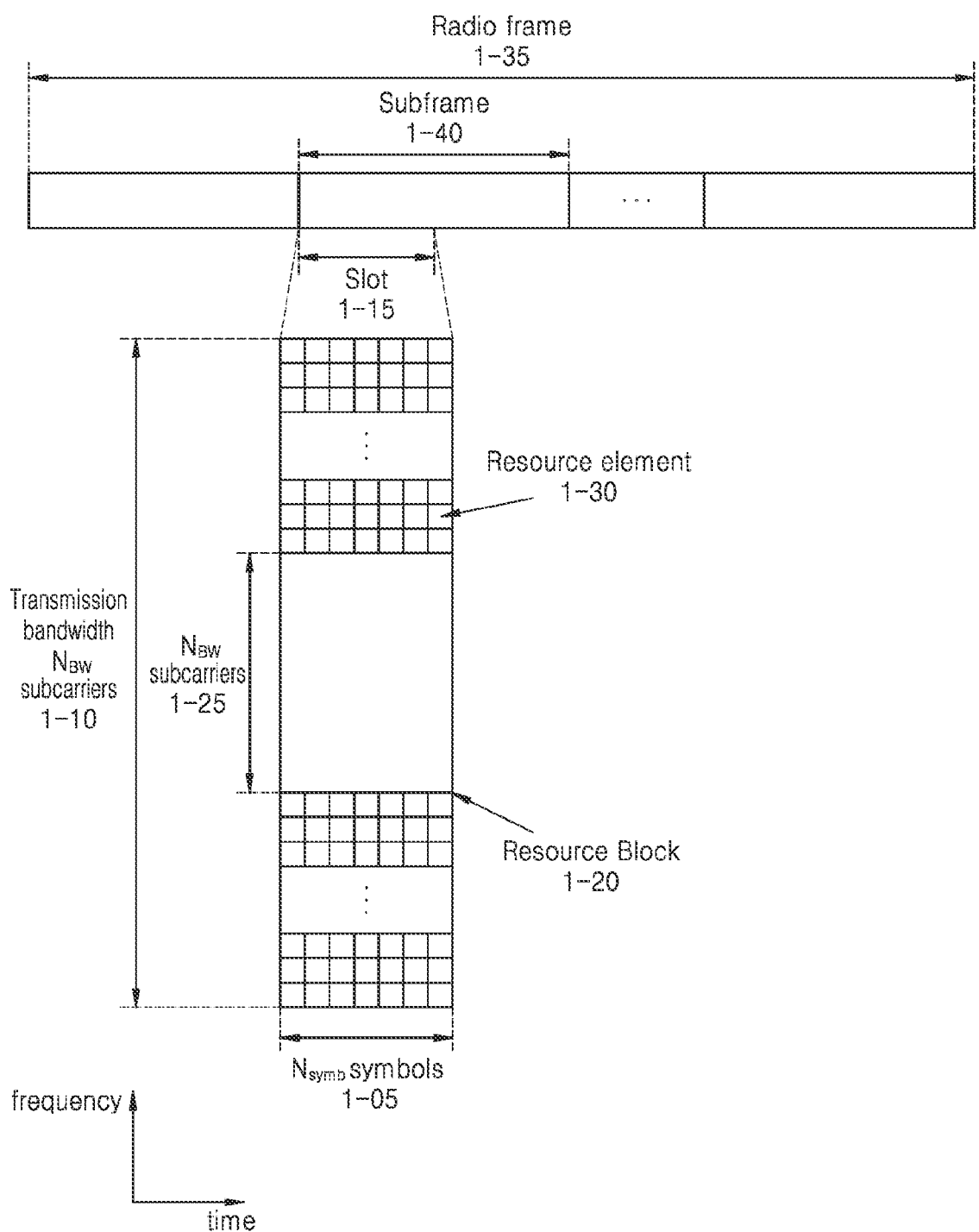
FIG. 1 is a diagram illustrating a time-frequency domain transmission structure of a long term evolution (LTE), LTE-advanced (LTE-A), new radio (NR), or similar wireless communication system.

According to an embodiment of the present disclosure, an operating method of a base station in a wireless communication system includes receiving, from a terminal, information related to a first beam switching time for transmission of an uplink signal, determining a second beam switching time for transmission of the uplink signal, based on configuration information related to the uplink signal and the first beam switching time, transmitting, to the terminal, the configuration information related to the uplink signal and the second beam switching time, and receiving, from the terminal, the uplink signal, wherein the uplink signal includes at least one of a sounding reference signal (SRS), a physical uplink shared channel (PUSCH), or a physical uplink control channel (PUCCH).

According to an embodiment of the present disclosure, an operating method of a terminal in a wireless communication system includes transmitting, to a base station, information related to a first beam switching time for transmission of an uplink signal, receiving, from the base station, configuration information related to the uplink signal and information related to a second beam switching time for transmission of the uplink signal, wherein the second beam switching time is determined based on the first beam switching time and the configuration information related to the uplink signal; and transmitting the uplink signal to the base station, based on the configuration information related to the uplink signal and the second beam switching time, wherein the uplink signal includes at least one of a sounding reference signal (SRS), a physical uplink shared channel (PUSCH), or a physical uplink control channel (PUCCH).

According to an embodiment of the present disclosure, an operating method of a terminal in a wireless communication system includes determining, based on configuration information related to an uplink signal, a beam switching time for transmission of the uplink signal, receiving, from a base station, information indicating transmission of the uplink signal, and transmitting the uplink signal to the base station, based on the beam switching time and the information indicating transmission of the uplink signal, wherein the uplink signal includes at least one of a sounding reference signal (SRS), a physical uplink shared channel (PUSCH), or a physical uplink control channel (PUCCH).

MODE OF DISCLOSURE

Hereinafter, various embodiments of the present disclosure will be described in detail with reference to the accompanying drawings.

In the following description of embodiments, descriptions of techniques that are well known in the art and not directly related to the present disclosure are omitted. This is to clearly convey the gist of the present disclosure by omitting an unnecessary description.

For the same reason, some elements in the accompanying drawings are exaggerated, omitted, or schematically illustrated. In addition, the size of each element may not substantially reflect its actual size. The same reference numerals are assigned to the same or corresponding elements in the drawings.

The advantages and features of the present disclosure, and methods of achieving the same, will become apparent with reference to embodiments described below in detail in conjunction with the accompanying drawings. The present disclosure may, however, be embodied in many different forms and should not be construed as limited to embodiments of the present disclosure set forth herein; rather these embodiments of the present disclosure are provided so that this disclosure will be thorough and complete, and will fully convey the scope of the present disclosure to one of ordinary skill in the art, and the scope of the present disclosure is defined only by the accompanying claims. In the specification, the same reference numerals denote the same elements.

It will be understood that each block of flowchart illustrations and combinations of blocks in the flowchart illustrations may be implemented by computer program instructions. Because these computer program instructions may be loaded into a processor of a general-purpose computer, special purpose computer, or other programmable data processing apparatus, the instructions, which are executed via the processor of the computer or other programmable data processing apparatus generate means for implementing the functions specified in the flowchart block(s). Because these computer program instructions may also be stored in a computer usable or computer-readable memory that may direct a computer or other programmable data processing apparatus to function in a particular manner, the instructions stored in the computer usable or computer-readable memory may produce an article of manufacture including instruction means that implement the functions specified in the flowchart block(s). Because the computer program instructions may also be loaded onto a computer or other programmable data processing apparatus, a series of operational steps may be performed on the computer or other programmable apparatus to produce a computer implemented process, and thus the instructions executed on the computer or other programmable apparatus may provide steps for implementing the functions specified in the flowchart block(s).

Also, each block of the flowchart illustrations may represent a module, segment, or portion of code, which includes one or more executable instructions for implementing the specified logical function(s). It should also be noted that in some alternative implementations, the functions noted in the blocks may occur out of the order shown. For example, two blocks shown in succession may in fact be executed substantially concurrently or the blocks may sometimes be executed in the reverse order, depending upon the functionality involved.

The term "~ unit" used in the present embodiment refers to a software or hardware component, such as a field-programmable gate array (FPGA) or an application-specific integrated circuit (ASIC), which performs certain tasks. However, "~ unit" does not mean to be limited to software or hardware. The term "~ unit" may be configured to be in an addressable storage medium or configured to operate one or more processors. Thus, "~ unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in components and "~ units" may be combined into fewer components and "~ units" or further separated into additional components and "~ units". Further, components and "~ units" may be implemented to operate one or more central processing units (CPUs) in a device or a secure multimedia card. Also, a unit in some embodiments may include one or more processors.

Hereinafter, an operation principle of the present disclosure will be described in detail with reference to the accompanying drawings. While describing the present disclosure, detailed descriptions of related well-known functions or configurations that may blur the points of the present disclosure are omitted. The terms used herein are those defined in consideration of functions in the present disclosure, but the terms may vary according to the intention of users or operators, precedents, etc. Hence, the terms used herein have to be defined based on the meaning of the terms together with the descriptions throughout the specification. Hereinafter, a base station is an entity performing resource allocation for a terminal and may include at least one of a gNode B, an eNode B, a Node B, a base station (BS), a radio access unit, a base station controller, and a node on a network. A terminal may include a user equipment (UE), a mobile station (MS), a cellular phone, a smartphone, a computer, or a multimedia system capable of performing a communication function. However, the present disclosure is not limited to the above examples.

Hereinafter, a technology for a terminal to receive broadcast information from a base station in a wireless communication system will be described. The present disclosure relates to a communication scheme that converges 5G communication systems for supporting a higher data rate than beyond 4G systems with Internet of things (IoT) technology, and a system thereof. The present disclosure may be applied to intelligent services (e.g., smart homes, smart buildings, smart cities, smart cars or connected cars, health care, digital education, retail, security and safety related services, etc.) based on 5G communication technologies and IoT related technologies.

The term referring to broadcast information, the term referring to control information, the term related to a communication coverage, the term referring to a state change (e.g., events), and the term referring to network entities, the term referring to messages, the terms referring to elements of an apparatus, etc. as used herein are exemplified for convenience of explanation. Therefore, the present disclosure is not limited to the terms to be described below, and other terms referring to equivalent technical meaning may be used.

For convenience of explanation, the terms and names defined in the $3^{rd}$ generation partnership project long term evolution (3GPP LTE) or 3GPP new radio (NR) standard may be used herein. However, the present disclosure is not limited by the terms and names and may be equally applied to systems conforming to other standards.

A wireless communication system has evolved from a system providing voice-oriented services to a broadband wireless communication system providing high speed high quality packet data services of communication standards such as high speed packet access (HSPA) of 3GPP, LTE or evolved universal terrestrial radio access (E-UTRA), LTE-advanced (LTE-A), LTE-Pro, high rate packet data (HRPD) of 3GPP2, ultra mobile broadband (UMB), and Institute of electrical and electronics engineers (IEEE) 802.16e.

In an LTE system as a representative example of a broadband wireless communication system, an orthogonal frequency division multiplexing (OFDM) scheme is employed in a downlink (DL), and a single carrier frequency division multiple access (SC-FDMA) scheme is employed in an uplink (UL). The UL refers to a radio link through which a terminal (UE or MS) transmits data or a control signal to a base station (eNode B or BS), and the DL refers to a radio link through which a base station transmits data or a control signal to a terminal. In the multiple access scheme as described above, data or control information of each user may be identified by performing allocation and operation so that time-frequency resources for carrying data or control information for each user do not overlap each other, that is, orthogonality is established.

Future communication systems after LTE, that is, 5G communication systems, have to be able to freely reflect various requirements of users and service providers. Therefore, services that satisfy various requirements at the same time have to be supported. Services considered for 5G communication systems include enhanced mobile broadband (eMBB), massive machine type communication (mMTC), and ultra reliability low latency communication (URLLC).

According to some embodiments, eMBB aims to provide a data rate higher than a data rate supported by LTE, LTE-A, or LTE-Pro. For example, in 5G communication systems, eMBB has to be able to provide a peak data rate of 20 Gbps in a DL and a peak data rate of 10 Gbps in an UL in terms of a single base station. An increased user perceived data rate of a terminal has to be simultaneously provided. In order to satisfy such requirements, there is a need to improve transmission and reception technologies including more improved multi-input multi-output (MIMO) transmission technologies. Also, because a frequency bandwidth wider than 20 MHz is used in 3-6 GHz frequency bands or 6 GHz or higher frequency bands, instead of a 2 GHz bandwidth used by existing LTE, a data rate required by 5G communication systems may be satisfied.

At the same time, mMTC is under consideration so as to support application services such as IoT in 5G communication systems. In order to efficiently provide IoT, mMTC needs to support access of a massive terminal in a cell, improve coverage of the terminal, improve battery time, and reduce costs of the terminal. Because IoT is attached to various sensors and various devices to provide a communication function, IoT has to be able to support a large number of terminals (e.g., 1,000,000 terminals/km$^2$) in a cell. Also, due to the nature of the service, the terminal supporting mMTC is likely to be located in a shaded area that is not covered by the cell, such as the basement of a building. Therefore, wider coverage than other services provided by the 5G communication systems may be required. The terminal supporting mMTC has to be configured as an inexpensive terminal, and it is difficult to frequently replace a battery of the terminal. Therefore, a very long battery life time may be required.

Finally, URLLC is a cellular-based wireless communication service used for a specific purpose (mission-critical). URLLC may be used for services used in remote control for robots or machinery, industrial automation, unmanned aerial vehicles, remote health care, emergency alerts, or the like. URLLC has to provide communications that provide ultra-low latency and ultra-high reliability. For example, a service supporting URLLC has to satisfy air interface latency of less than 0.5 milliseconds and simultaneously has a packet error rate of $10^{-5}$ or less. Therefore, for services supporting URLLC, the 5G systems have to provide a smaller transmit time interval (TTI) than other services and simultaneously require a design matter that has to allocate a wide resource in a frequency band. However, mMTC, URLLC, and eMBB are only examples of different service types, and the service types to which the present disclosure is applied are not limited to the above-described examples.

The services considered in the 5G communication systems described above have to be provided by convergence with each other based on a single framework. That is, for efficient resource management and control, it is preferable that the respective services are integrated, controlled, and transmitted by a single system rather than being operated independently.

Also, although the embodiments of the present disclosure will be described below with reference to an LTE, LTE-A, LTE Pro, or NR system as an example, the embodiments of the present disclosure may also be applied to other communication systems having a similar technical background or channel form. Also, the present disclosure may be applied to other communication systems through some modifications without departing from the scope of the present disclosure. Hereinafter, the frame structures of the LTE, LTE-A, and 5G systems will be described with reference to the drawings, and the design direction of the 5G system will be described.

FIG. 1 is a diagram illustrating a time-frequency domain transmission structure of an LTE, LTE-A, NR, or similar wireless communication system.

FIG. 1 illustrates a basic structure of a time-frequency resource region that is a wireless resource region in which data or a control channel is transmitted in an LTE, LTE-A, or NR system based on a cyclic prefix (CP) orthogonal frequency division multiplexing (OFDM) or single carrier-frequency division multiple access (SC-FDMA) waveform.

In FIG. 1, the horizontal axis represents a time domain, and the vertical axis represents a frequency domain. A UL refers to a radio link through which a UE transmits data or a control signal to a base station, and a DL refers to a radio link through which a base station transmits data or a control signal to a UE.

A minimum transmission unit of LTE, LTE-A, and NR systems in the time domain is an OFDM symbol or an SC-FDMA symbol, and $N_{symb}$ symbols 1-05 may be gathered to constitute one slot 1-15. In the case of the LTE and the LTE-A, two slots including seven symbols ($N_{symb}$=7) may be gathered to constitute one subframe 1-40. Also, according to some embodiments, the 5G may support two types of slot structures, that is, slot and mini-slot (or non-slot). In the case of a 5G slot, $N_{symb}$ may have one of 7 or 14, and in the case of a 5G mini-slot, $N_{symb}$, may be set to one of 1, 2, 3, 4, 5, 6, or 7. In the LTE and the LTE-A, the length of the slot is 0.5 ms and the length of the subframe is fixed to 1.0 ms. However, in the NR system, the length of the slot or the mini-slot may flexibly vary according to a subcarrier spacing. In the LTE and the LTE-A, a radio frame 1-35 is a time domain unit including ten subframes. In the LTE and the LTE-A, the minimum transmission unit in the frequency domain is a subcarrier in units of 15 kHz (subcarrier spacing=15 kHz), and the entire system transmission bandwidth includes a total of New subcarriers 1-10. A flexible extended frame structure of the NR system will be described below.

A basic unit of a resource in the time-frequency domain is a resource element (RE) 1-30, which may be represented by an OFDM symbol or SC-FDMA symbol index and a subcarrier index. A resource block (RB) 1-20 or a physical resource block (PRB) may be defined as $N_{symb}$ consecutive OFDM symbols or SC-FDMA symbols 1-05 in the time domain and $N_{RB}$ consecutive subcarriers 1-25 in the frequency domain. Therefore, one RB 1-20 includes $N_{symb} \times N_{RB}$ REs 1-30. In the LTE and LTE-A systems, data may be mapped in units of RBs, and the base station may perform scheduling in units of RB pairs constituting one subframe for a certain UE. $N_{symb}$, which is the number of SC-FDMA symbols or the number of OFDM symbols, is determined according to a length of a CP added to each symbol in order to prevent intersymbol interference. For example, when a general CP is applied, $N_{symb}$=7, and when an extended CP is applied, $N_{symb}$=6. Because the extended CP is applied to a system having a relatively greater radio transmission distance than the general CP, orthogonality between symbols may be maintained.

According to some embodiments, the subcarrier spacing, the length of the CP, etc. are essential information for OFDM transmission and reception, and efficient transmission and reception may be performed only when the base station and the UE recognize the subcarrier spacing, the length of the CP, etc. as common values.

The frame structures of the LTE and LTE-A systems as described above are designed considering typical voice and data communication, and expandability restrictions may follow to satisfy various services and requirements like the NR system. Therefore, the NR system needs to define and operate the frame structure flexibly considering various services and requirements.

Figure 2:
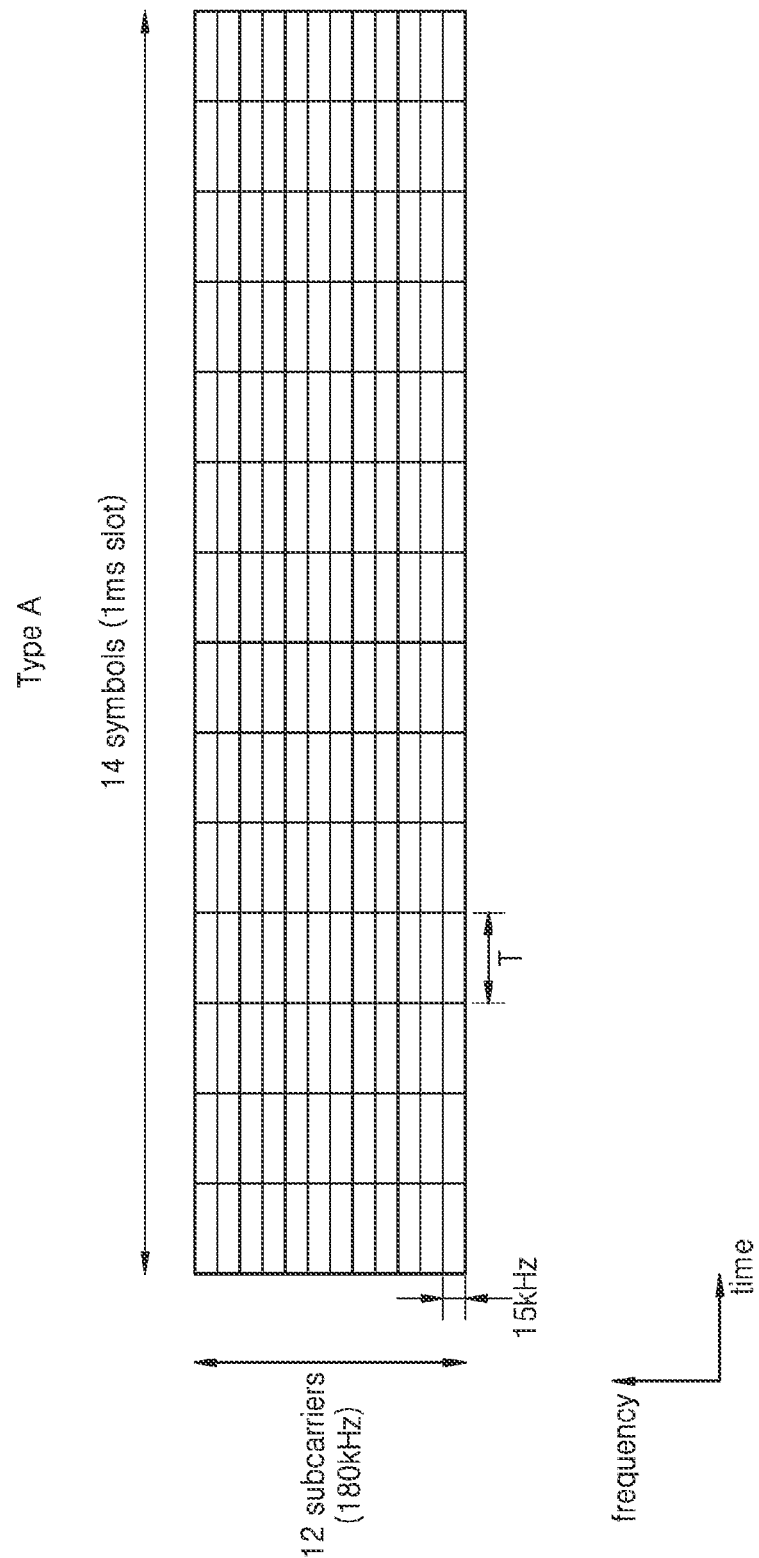
FIGS. 2 through 4 are diagrams illustrating an extended frame structure, according to some embodiments.
Figure 3:
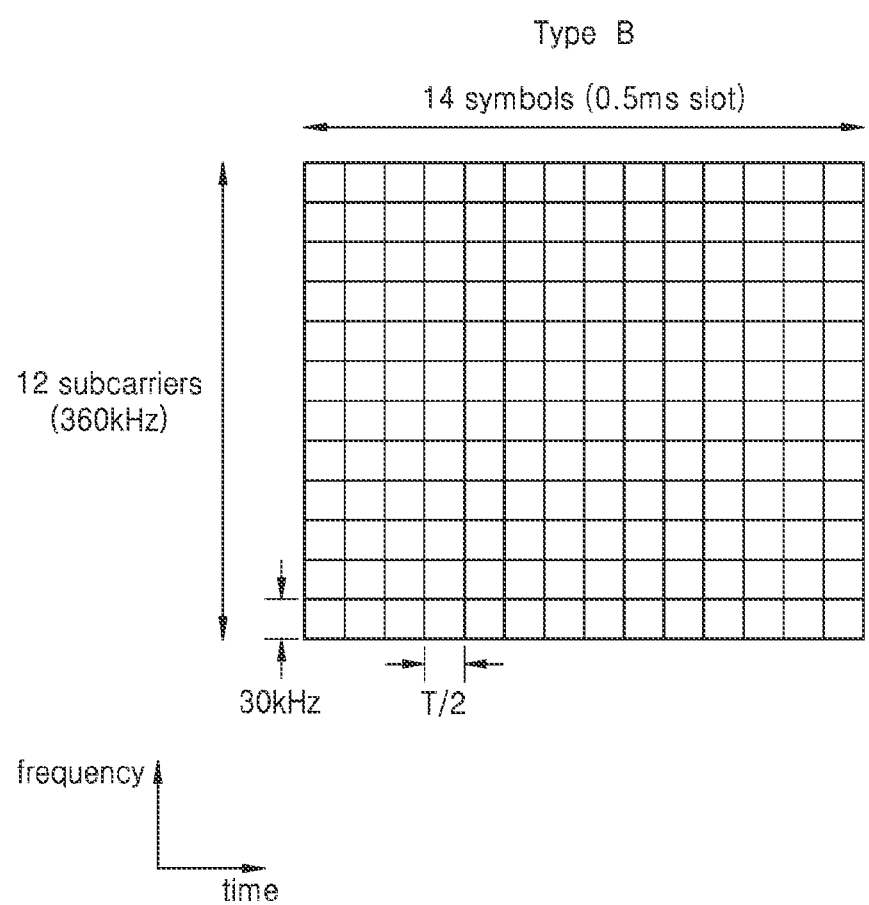
Figure 4:
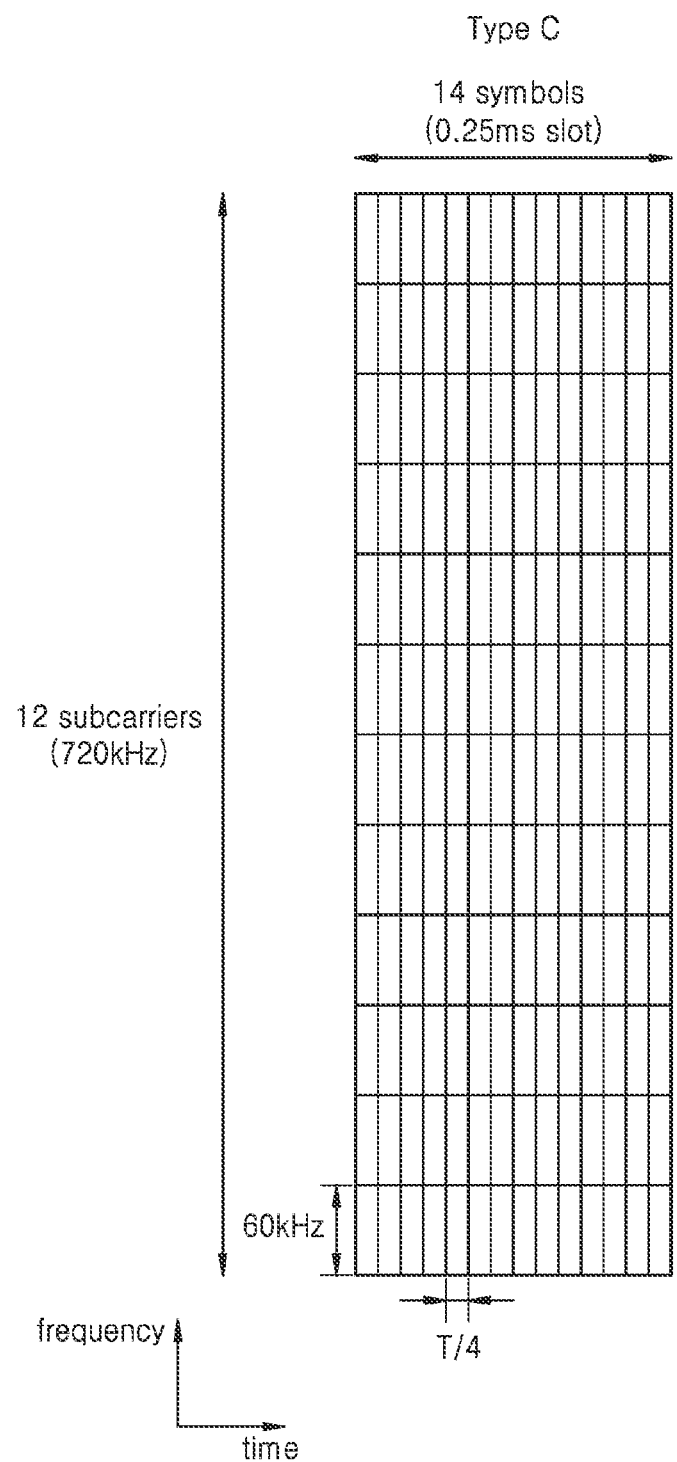

FIGS. 2 to 4 are diagrams illustrating an extended frame structure, according to some embodiments.

Examples illustrated in FIGS. 2 to 4 are essential parameter sets defining the extended frame structure, which may include a subcarrier spacing, a CP length, a slot length, and the like.

At the initial stage of introduction of the 5G system in the future, at least coexistence or dual mode operation with the existing LTE/LTE-A system is expected. In this manner, the existing LTE/LTE-A may provide a stable system operation, and the 5G system may provide improved services. Therefore, the extended frame structure of the 5G system may need to include at least the LTE/LTE-A frame structure or the essential parameter set. FIG. 2 illustrates an essential parameter set or a 5G frame structure such as the LTE/LTE-A frame structure. Frame structure type A illustrated in FIG. 2 shows that the subcarrier spacing is 15 kHz, 14 symbols constitute a 1 ms slot, and 12 subcarriers (=180 kHz=12×15 kHz) constitute a PRB.

Referring to FIG. 3, frame structure type B illustrated in FIG. 3 shows that the subcarrier spacing is 30 kHz, 14 symbols constitute a 0.5 ms slot, and 12 subcarriers (=360 kHz=12×30 kHz) constitute a PRB. That is, frame structure type B of FIG. 3 shows that the subcarrier spacing and the PRB size are increased twice and the slot length and the symbol length are reduced twice, compared with frame structure type A.

Referring to FIG. 4, frame structure type C illustrated in FIG. 4 shows that the subcarrier spacing is 60 kHz, 14 symbols constitute a 0.25 ms subframe, and 12 subcarriers (=720 kHz=12×60 kHz) constitute a PRB. That is, frame structure type C illustrated in FIG. 4 shows that the subcarrier spacing and the PRB size are increased four times and the slot length and the symbol length are reduced four times, compared with frame structure type A.

When the frame structure types are generalized, high expandability may be provided by making essential parameter sets such as the subcarrier spacing, the CP length, and the slot length have an integer multiple relationship for each frame structure type. A subframe having a fixed length of 1 ms may be defined in order to indicate a reference time unit irrelevant to the frame structure type. Therefore, one subframe in frame structure type A includes one slot, one subframe in frame structure type B includes two slots, and one subframe in frame structure type C includes four slots. Of course, the extendable frame structures are not limited to frame structure type A, B, or C described above, and may be applied to other subcarrier spacings such as 120 kHz or 240 kHz and may have different structures from each other.

According to some embodiments, the frame structure types described above may be applied to correspond to various scenarios. In terms of the cell size, as the CP length is longer, a larger cell may be supported. Thus, frame structure type A may support relatively large cells, compared with frame structure types B and C. In terms of the operating frequency band, as the subcarrier spacing is greater, it is more advantageous to recover phase noise in a high frequency band. Thus, frame structure type C may support a relatively high operating frequency, compared with frame structure types A and B. In terms of the service, the subframe length is shorter, it is more advantageous to support an ultra-low latency service such as URLLC. Thus, frame structure type C may be relatively suitable for URLLC services compared with frame structure types A and B.

Also, a plurality of frame structure types may be multiplexed in a single system for integrated operation.

In the NR, one component carrier (CC) or serving cell may include up to 250 or more RBs. Therefore, when the UE always receives the full serving cell bandwidth as in the LTE, the power consumption of the UE may be extreme. In order to solve this problem, the base station may configure one or more bandwidth parts (BWPs) for the UE and support the UE to change the reception area within the cell. In the NR, the base station may configure 'initial BWP', which is a bandwidth of control resource set (CORESET) #0 (or common search space CSS)), for the UE through a master information block (MIB). Thereafter, the base station may configure the initial BWP (first BWP) of the UE through radio resource control (RRC) signaling, and may notify at least one piece of BWP configuration information that will be indicated through downlink control information (DCI). Thereafter, the base station may indicate which band to be used by the UE by announcing a BWP ID through DCI. When the UE does not receive DCI in the currently allocated BWP for a specific time or longer, the UE may return to a 'default BWP' and attempt to receive DCI.

Figure 5:
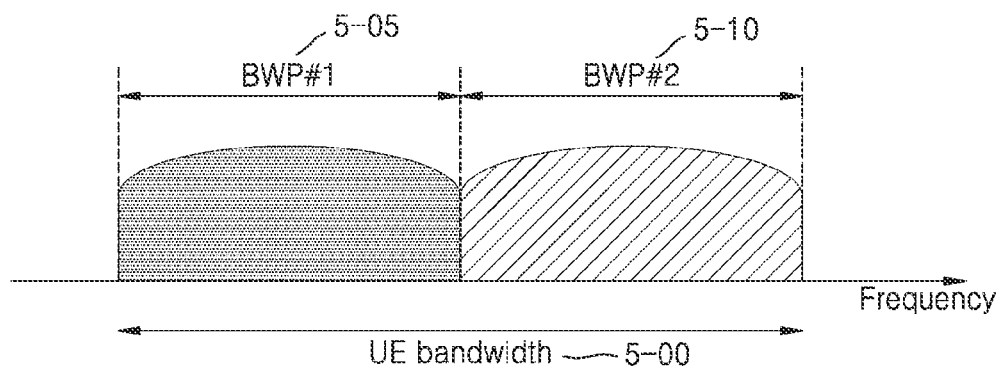
FIG. 5 is a diagram illustrating an example of configuring a bandwidth part in a $5^{th}$ generation (5G) communication system, according to some embodiments.

FIG. 5 is a diagram illustrating an example of configuring a bandwidth part in an NR communication system, according to some embodiments.

Referring to FIG. 5, a UE bandwidth 5-00 may be configured as two bandwidth parts, i.e., bandwidth part #1 5-05 and bandwidth part #2 5-10. The base station may configure one or more bandwidth parts for the UE, and may configure the following information for each bandwidth part.

TABLE 1

Configuration information 1: Bandwidth of bandwidth part (number of PRBs constituting bandwidth part)
Configuration information 2: Frequency position of bandwidth part (examples of such information include offset value relative to reference point, and reference point may include center frequency of carrier, synchronization signal, synchronization signal raster, etc.)
Configuration information 3: Numerology of bandwidth part (e.g., subcarrier spacing, CP length, etc.)
Others In addition to the pieces of configuration information of [Table 1], various parameters related to the bandwidth part may be configured for the UE. The pieces of configuration information may be transmitted from the base station to the UE through higher layer signaling, for example, RRC signaling. At least one of the configured one or more bandwidth parts may be activated. Whether to activate the configured bandwidth part may be semi-statically transmitted from the base station to the UE through RRC signaling, or may be dynamically transmitted from the base station to the UE through a medium access control element (MAC CE) or DCI.

The configuring of the bandwidth part supported by the 5G communication system may be used for various purposes.

For example, when the bandwidth supported by the UE is less than the system bandwidth, communication of the UE may be supported through bandwidth part configuration. For example, in [Table 1], the frequency position of the bandwidth part (configuration information 1) is configured for the UE in order to allow the UE to transmit and receive data at a specific frequency position within the system bandwidth.

As another example, the base station may configure a plurality of bandwidth parts for the UE in order to support different numerologies. For example, in order to support both data transmission and reception by using a subcarrier spacing of 15 kHz and a subcarrier spacing of 30 kHz with respect to a certain UE, the base station may configure the UE to use the subcarrier spacing of 15 kHz and the subcarrier spacing of 30 kHz for two bandwidth parts, respectively. Different bandwidth parts may be frequency-division-multiplexed (FDMed). When the UE attempts to transmit and receive data at a specific subcarrier spacing, the bandwidth part configured with the subcarrier spacing may be activated.

As another example, in order to reduce power consumption of the UE, the base station may configure bandwidth parts having different bandwidths for the UE. For example, when the UE supports a very great bandwidth, for example, a bandwidth of 100 MHz and always transmits and receives data at the corresponding bandwidth, very high power consumption may be caused. In particular, it may be very inefficient in terms of power consumption for the UE to monitor an unnecessary DL control channel with respect to a great bandwidth of 100 MHz in a situation where there is no traffic. Therefore, in order to reduce power consumption of the UE, the base station may configure a relatively small bandwidth part, for example, a bandwidth part of 20 MHz, for the UE. In a situation where there is no traffic, the UE may perform a monitoring operation in the bandwidth part of 20 MHz, and when data is generated, the UE may transmit and receive data by using the bandwidth part of 100 MHz according to the indication of the base station.

Figure 6:
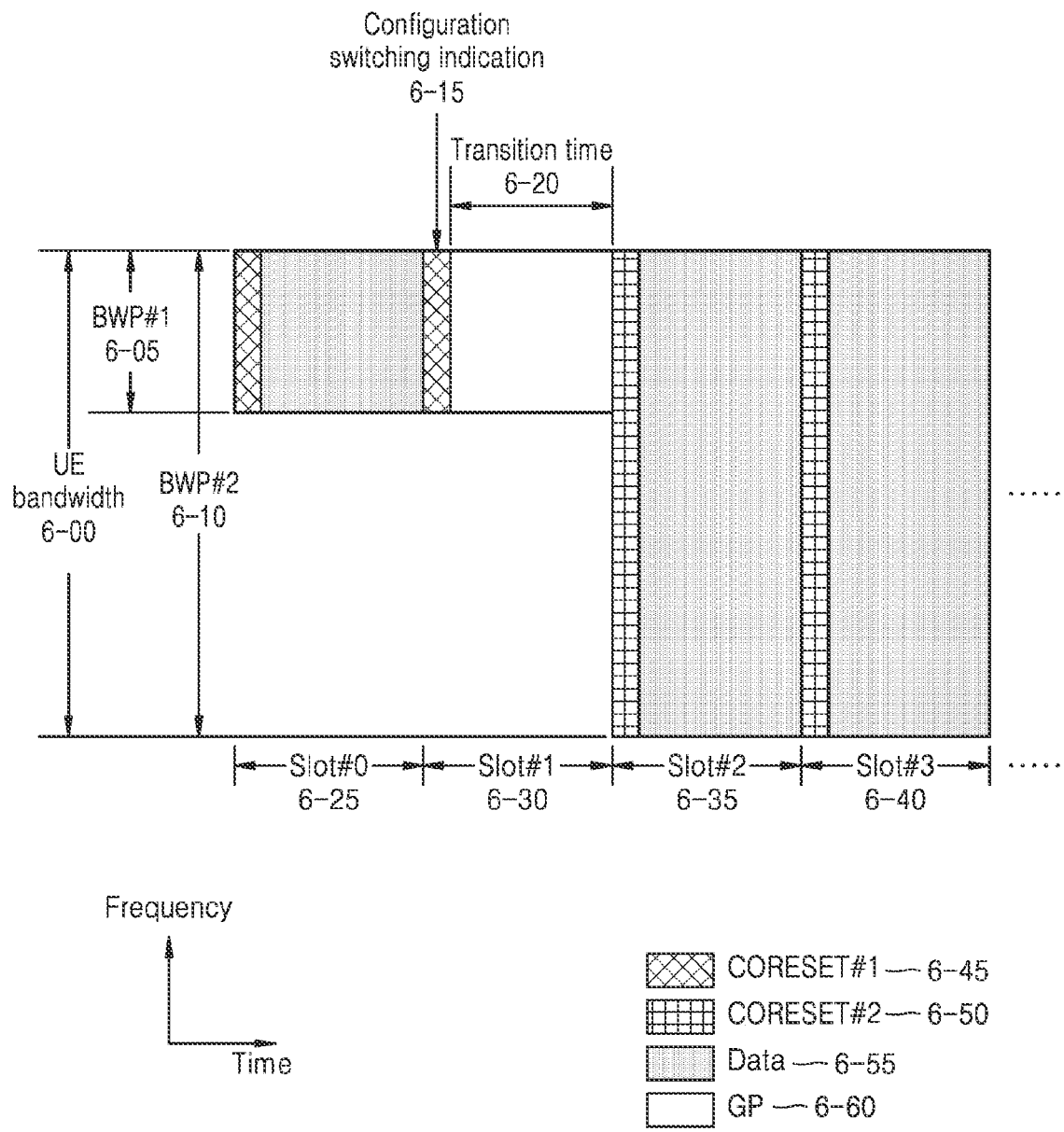
FIG. 6 is a diagram illustrating a method of indicating and changing a bandwidth part, according to some embodiments.

FIG. 6 is a diagram illustrating a method of indicating and changing a dynamic configuration of a bandwidth part, according to some embodiments.

As in the description of [Table 1] above, the base station may configure one or more bandwidth parts for the UE, and the base station may notify the UE of information related to the bandwidth of the bandwidth part, the frequency position of the bandwidth part, the numerology of the bandwidth part, etc. as the configuration of each bandwidth part. Referring to FIG. 6, two bandwidth parts, i.e., bandwidth part #1 (BPW #1) 6-05 and bandwidth part #2 (BWP #2) 6-10, may be configured for one UE in a UE bandwidth 6-00. One or more bandwidth parts in the configured bandwidth may be activated, and FIG. 6 illustrates an example in which one bandwidth part is activated. In FIG. 6, bandwidth part #1 6-02 among the bandwidth parts configured in slot #0 6-25 is in an activated state, and the UE may monitor a physical downlink control channel (PDCCH) in CORESET #1 6-45 configured in bandwidth part #1 6-05 and may transmit and receive data 6-55 in bandwidth part #1 6-05. The CORESET in which the UE receives the PDCCH may be changed according to which bandwidth part is activated among the configured bandwidth parts. Accordingly, the bandwidth on which the UE monitors the PDCCH may be changed.

The base station may additionally transmit, to the UE, an indicator for changing the configuration of the bandwidth part. Changing the configuration of the bandwidth part may be regarded as an operation of activating a specific bandwidth part (e.g., changing activation from bandwidth part A to bandwidth part B). The base station may transmit a configuration switching indicator to the UE in a specific slot. After receiving the configuration switching indicator from the base station, the UE may determine a bandwidth part to be activated by applying the changed configuration according to the configuration switching indicator from a specific time point, and may monitor the PDCCH in the CORESET configured in the activated bandwidth part.

In FIG. 6, the base station may transmit, to the UE, a configuration switching indicator 6-15 for indicating the change of the activated bandwidth part from existing bandwidth part #1 6-05 to bandwidth part #2 6-10 in slot #1 6-30. After receiving the corresponding indicator, the UE may activate bandwidth part #2 6-10 according to the contents of the indicator. In this case, a transition time 6-20 for the change of the bandwidth part may be required. Accordingly, a time point at which the bandwidth part to be activated is changed and applied may be determined. FIG. 6 illustrates a case in which the transition time 6-20 of one slot is required after the configuration switching indicator 6-15 is received. In the transition time 6-20, data transmission and reception may not be performed (6-60). Therefore, bandwidth part #2 6-10 may be activated in slot #2 6-35, and an operation of transmitting and receiving a control channel and data through the corresponding bandwidth part may be performed.

The base station may preconfigure one or more bandwidth parts for the UE through higher layer signaling (e.g., RRC signaling), and the configuration switching indicator 6-15 may indicate activation by a method of mapping to one of the bandwidth part configurations preconfigured by the base station. For example, a $\log_2 N$-bit indicator may select and indicate one of N preconfigured bandwidth parts. [Table 2] below shows an example of indicating configuration information related to the bandwidth part by using a 2-bit indicator.

TABLE 2

| Indicator value | Bandwidth part configuration |
| --- | --- |
| 00 | Bandwidth part configuration A configured through higher layer signaling |
| 01 | Bandwidth part configuration B configured through higher layer signaling |
| 10 | Bandwidth part configuration C configured through upper layer signaling |
| 11 | Bandwidth part configuration D configured through higher layer signaling |

The configuration switching indicator 6-15 for the bandwidth part described above may be transmitted to the UE in the form of MAC CE signaling or L1 signaling (e.g., common DCI, group-common DCI, UE-specific DCI, etc.).

From which time point the activation of the bandwidth part is applied according to the configuration switching indicator 6-15 for the bandwidth part described above may be determined as follows. From which time point the configuration change is applied may depend on a predefined value (e.g., applied from $N(\geq 1)$ slots after receiving the configuration switching indicator), may be configured by the base station to the UE through higher layer signaling (e.g., RRC signaling), or may be transmitted by being partially included in the contents of the configuration switching indicator 6-15. Alternatively, it may be determined by a combination of the above-described methods. After receiving the configuration switching indicator 6-15 for the bandwidth part, the UE may apply the changed configuration from the time point obtained by the method.

The NR may provide the following detailed frequency domain resource allocation (FD-RA) in addition to the frequency domain resource candidate allocation through the BWP indication.

Figure 7:
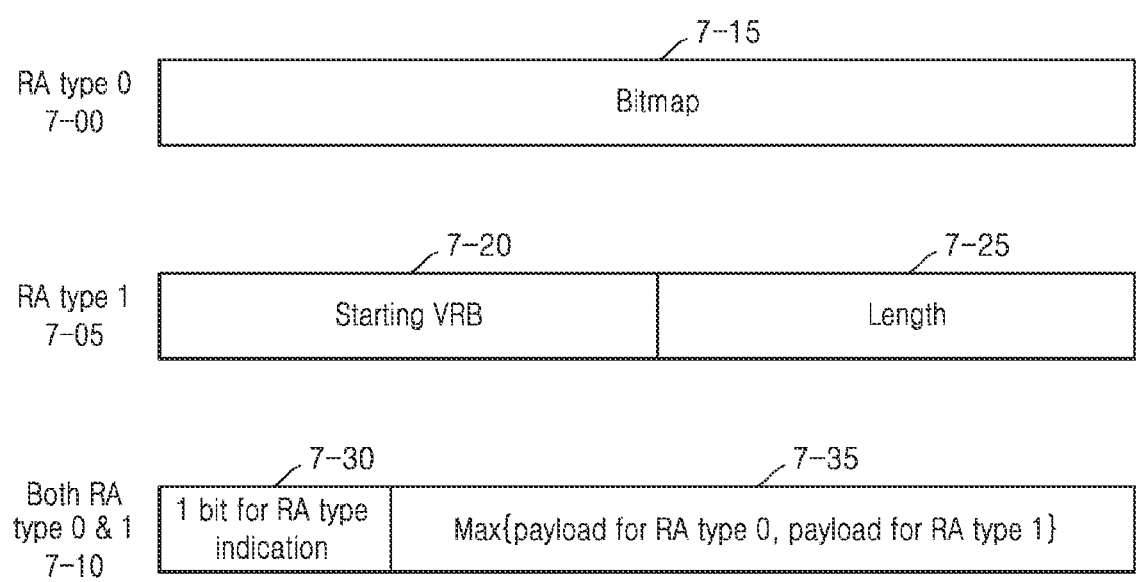
FIG. 7 is a diagram illustrating physical downlink shared channel (PDSCH) frequency domain resource allocation, according to some embodiments.

FIG. 7 is a diagram illustrating physical downlink shared channel (PDSCH) or physical uplink shared channel (PUSCH) frequency domain resource allocation, according to some embodiments. FIG. 7 illustrates three frequency domain resource allocation methods: type 0 7-00, type 1 7-05, and dynamic switch 7-10, which are configurable through a higher layer in the NR.

When the UE is configured to use only resource type 0 through higher layer signaling (7-00), a portion of DCI for allocating the PDSCH or the PUSCH to the UE has a bitmap including $N_{RBG}$ bits. The conditions for this will be described again below. At this time, $N_{RBG}$ refers to the number of resource block groups (RBGs) determined as shown in [Table 3] below according to a BWP size and a higher layer parameter rbg-Size allocated by the BWP indicator, and data is transmitted to the RBG that the bitmap indicates by 1.

TABLE 3

| Bandwidth Part Size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

When the UE is configured to use only resource type 1 through higher layer signaling (7-05), a portion of DCI for allocating the PDSCH or the PUSCH to the UE may have frequency domain resource allocation information including $[\log_2(N_{RB}^{DL,BWP}(N_{RB}^{DL,BWP}+1)/2)]$ bits. The conditions for this will be described again below. In this manner, the base station may set a starting virtual resource block (VRB) 7-20 and a length 7-25 of frequency domain resources consecutively allocated therefrom.

When the UE is configured to use both resource type 0 and resource type 1 through higher layer signaling (7-10), a portion of DCI for allocating the PDSCH or the PUSCH to the UE may have frequency domain resource allocation information including bits of a larger value 7-35 among a payload 7-15 for setting resource type 0 and payloads 7-20 and 7-25 for setting resource type 1. The conditions for this will be described again below. At this time, one bit is added to a most significant bit (MSB) of the frequency domain resource allocation information in the DCI, and when the corresponding bit is 0, it may indicate that resource type 0 would be used, and when the corresponding bit is 1, it may indicate that resource type 1 would be used.

Figure 8:
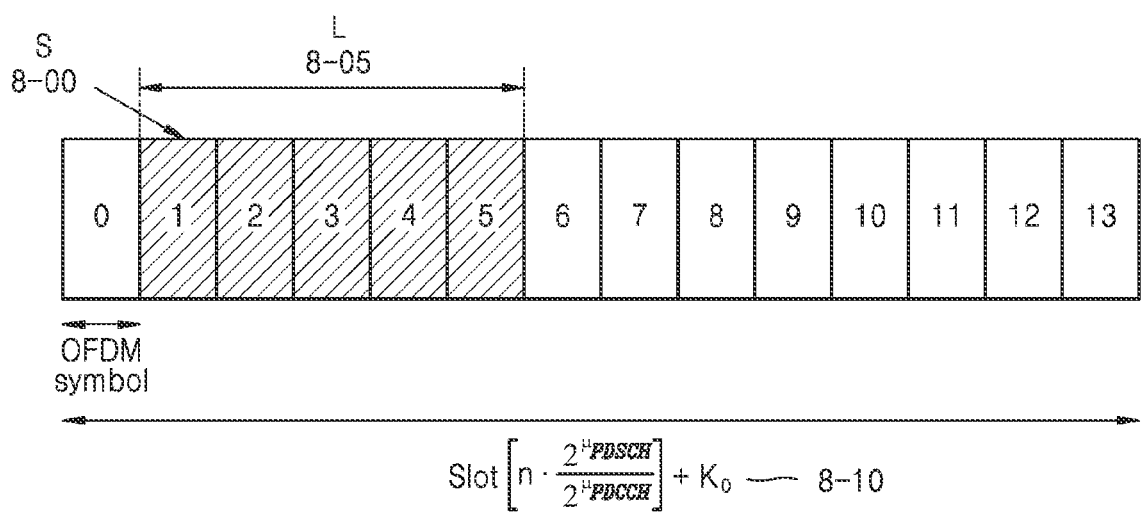
FIG. 8 is a diagram illustrating PDSCH time domain resource allocation, according to some embodiments.

FIG. 8 is a diagram illustrating PDSCH or PUSCH time domain resource allocation, according to some embodiments. Referring to FIG. 8, the base station may indicate the time domain position of the PDSCH resource based on a subcarrier spacing of a data channel and a control channel configured through higher layer signaling, a scheduling offset ($K_0$ or $K_2$) value, and an OFDM symbol start position 8-00 and a length 8-05 in one slot dynamically indicated through DCI. According to an embodiment, in FIG. 8, $$\text{slot}\left[n \cdot \frac{2^{\mu_{PDSCH}}}{2^{\mu_{PDCCH}}}\right] + K_0$$

slot 8-10 may be indicated.

In the NR, the UE performs blind decoding in a specific time and frequency domain to receive a PDCCH including DCI. The base station may configure a control resource set (CORESET) and a search space for the UE through higher layer signaling to provide a time and frequency domain for the UE to perform blind decoding, a mapping method, etc. The base station may configure up to three CORESETs and up to 10 search spaces for each BWP configured for the UE. For example, the base station and the UE may transmit and receive signaling information as in [Table 4] to transmit information about the CORESET.

TABLE 4

| ControlResourceSet Information element |
| --- |
| ASN1START |
| TAG-CONTROLRESOURCESET-START |
| ControResourceSet : : =     SEQUENCE } |
|    controlResourceSetId     ControlResourceSetId, |
|    frequencyDomainResources     SET STRING (SIZE (45)), |
|    duration     INTEGER (1..maxCoReSetDuration), |
|    ooe-Reg-MappingType     CHOICW } |
|      interleaved     SEQUENCE } |
|        reg-BundleSize     ENUMERATED {n2, n3, n6}, |
|        interleaverSize     ENUMERATED {n2, n3, n6}, |
|        shiftIndex     INTEGER(0..maxNrofTCI-StatesPDCCH)) OF TCI-StateId     OPTIONAL, |
| Need S |
|    }, |
|      nonInterleaved     NULL |
|    }, |
|    precoderGranularity     ENUMERATED {sameAsREG-bundle, allContiguousRBs), |
|    tci-StatesPDCCR-ToAddList     SEQUENCE (SIZE (1..maxNrofTCI-StatesPDCCH)) OF TCI-     OPTIONAL, |
|      StateId |
| Cond NotSIB1-initialBWP |
|    tci-StatesPDCCR-ToReleaseList     SEQUENCE (SIZE (1..maxNrofTCI-StatesPDCCH)) OF TCI-     OPTIONAL, |
|      StateId |
| Cond NotSIB1-initialBWP |
|    tci-PresentInDCI     ENUMERATED (enabled)     OPTIONAL, |
| Need S |
|    pdcch-DMRS-ScramblingID     INTEGER (0..65535)     OPTIONAL, |
| Need S |
|    ... |
| } |
|    TAG-CONTROLRESOURCESET-STOP |
|    ASN1STOP |

Signaling information ControlResourceSet of [Table 4] includes information about each CORESET. Information included in the signaling information ControlResourceSet may have the following meaning.

controlResourceSetId: indicates a CORESET index.

frequencyDomainResources: indicates frequency resource information of the CORESET. For all PRBs included in the BWP, 6 RBs are bundled and 1 bit indicates whether CORESET frequency resources include each RB bundle. (1: included in the CORESET, 0: not included in the CORESET)

duration: symbol level time resource information of the CORESET, which has a value of one of 1, 2, or 3.

cce-REG-MappingType: indicates whether control channel elements (CCEs) mapped to the CORESET are interleaved. When the CCEs are interleaved, additional information about interleaving (reg-BundleSize, inter-leaverSize, and shiftIndex) is provided.

precoderGranularity: indicates information about frequency resource precoding of the CORESET. The size of a precoder may be the same as the size of a resource element group (REG) bundle or the size of all frequency resources of the CORESET.

tci-StatePDCCH-ToAddList, tci-StatePDCCH-ToReleaseList: indicates transmission configuration indication (TCI) states that may be activated in the CORESET. One of the TCI states that may be activated in the CORESET may be activated through higher layer signaling (e.g., MAC CE). When the CORESET is a CORESET configured in an initial access procedure, the TCI states may not be configured. The TCI states will be described below.

tci-PresentInDCL: indicates whether an indicator indicating a TCI state of a PDSCH is included in DCI transmitted in the PDCCH included in the CORESET.

Pdcch-DMRS-ScramblingID: a sequence scrambling index of a DMRS transmitted in the PDCCH included in the CORESET The UE may perform blind decoding to receive the PDCCH by referring to the information about the CORESET.

In the NR, in order for the UE to smoothly receive and decode the downlink channel (e.g., PDCCH or PDSCH), the base station may transmit, to the UE, information about a quasi co-location (QCL) relationship between antenna ports (e.g., DMRS port of the PDSCH or PDSCH DMRS port or CSI-RS port of a CSI-RS) for transmitting the downlink channel. The QCL relationship between the antenna ports may have one of a total of four QCL types.

'QCL-typeA': {Doppler shift, Doppler spread, average delay, delay spread}
  'QCL-typeB': {Doppler shift, Doppler spread}
  'QCL-typeC': {Doppler shift, average delay}
  'QCL-typeD': {Spatial RX parameter}

When two different antenna ports share some of the above QCL types or one antenna port refers to some of QCL types of another antenna port, the UE may assume that parameters supported in the QCL type shared or referenced by the two antenna ports are shared and have the same value.

The base station may configure the TCI state to transmit the information about the QCL relationship between the antenna ports to the UE. The TCI state includes information about one or two downlink RSs and the supported QCL type. For example, the base station and the UE may transmit and receive signaling information as in [Table 5] to transmit information about the TCI state.

TABLE 5

| TCI-STATE information element |
| --- |
| ASN1START |
| TAG-TCI-STATE=START |
| TCI-State : := SEQUENCE } |
|   tci-StateId    TCI-StateId |
|   qcl-Type1     QCL-Info, |
|   qcl-Type2     QCL-Info                                           OPTIONAL, |
|   Need B |
|   ... |
| } |
| QCL-Info : := SEQUENCE } |
|   cell           ServCellIndex                                     OPTIONAL, |
|   Need R |
|   bwp-Id        BWP-Id                                             OPTIONAL, |
|   Cond CDI-RS-Indicated |
|   referenceSignal    Choice } |
|     cal-rs          NZP-CSI-RS-ResourceId, |
|     ssb             SSB-Index |
|   }, |
|   qcl-Type      ENUMERATED {typeA, ypeB, typeC, typeD}. |
|   ... |
| } |
| TAG-TCI-STATE-STOP |
| ASN1STOP |

Signaling information TCI state of [Table 5] includes information about each TCI state. According to the signaling information, each TCI state includes information about a TCI state index and one or two QCL-Info (qcl-Type1 and qcl-Type2). qcl-Type1 or qcl-Type2 provides a cell index configured with an RS, a BWP index including the RS, the RS for providing information about parameters supported in a QCL type according to a QCL type, and information about one of a total of four QCL types. qcl-Type1 may have one QCL type from among 'QCL-typeA', 'QCL-typeB', or 'QCL-typeC', and qcl-Type2 may have 'QCL-typeD' from among a total of four QCL types. The UE may refer to the TCI state activated in the antenna port for transmitting the downlink channel and may receive and decode the downlink channel based on the supported QCL and the referenced RS in the activated TCI state.

In the NR, various types of DCI formats may be provided according to the purpose for the efficient control channel reception of the UE as shown in [Table 6] below.

TABLE 6

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduhng of PDSCH in one cell |
| 2_0 | Notifying a group of UEs of the slot format |
| 2_1 | Notifying a group of UEs of the PRB(s) and OFD M symbol(s) where UE may assume no transmission is intended for the UE |

TABLE 6-continued

| DCI format | Usage |
|---|---|
| 2_2 | Transmission of TPC commends for PUCCH and PUSCH |
| 2_3 | Transmission of a group of TPC commands for S RS transmissions by one or more UEs |

For example, the base station may use DCI format 1_0 or DCI format 1_1 to allocate (schedule) the PDSCH to one cell.

When DCI format 1_0 is transmitted together with a cyclic redundancy check (CRC) scrambled by cell radio network temporary identifier (C-RNTI) or configured scheduling RNTI (CS-RNTI) or modulation coding scheme cell RNTI (MCS-C-RNTI), DCI format 1_0 may include at least the following information:

Identifier for DCI formats (1 bit): is a DCI format indicator and is always set to 1

Frequency domain resource assignment ($\lceil \log_2 (N_{RB}^{DL,BWP}(N_{RB}^{DL,BWP}+1)/2) \rceil$ bits): indicates frequency domain resource allocation, wherein, in a case in which DCI format 1_0 is monitored in the UE specific search space, $N_{RB}^{DL,BWP}$ is the size of the active DL BWP, and in other cases, $N_{RB}^{DL,BWP}$ is the size of the initial DL BWP. A detailed method may be described with reference to the aforementioned frequency domain resource allocation method.

Time domain resource assignment (4 bits): indicates time domain resource allocation according to the above description.

VRB-to-PRB mapping (1 bit): indicates non-interleaved when 0, and indicates interleaved VRP-to-PRB mapping when 1.

Modulation and coding scheme (5 bits): indicates a modulation order and a coding rate used for PDSCH transmission.

New data indicator (1 bit): indicates whether a PDSCH corresponds to initial transmission or retransmission according to whether the indicator is toggled.

Redundancy version (2 bits): indicates a redundancy version used for PDSCH transmission.

HARQ process number (4 bits): indicates an HARQ process number used for PDSCH transmission.

Downlink assignment index (2 bits): a DAI indicator

TPC command for scheduled PUCCH (2 bits): a PUCCH power control indicator

PUCCH resource indicator (3 bits): is a PUCCH resource indicator and indicates one of eight types of resources according to higher layer configuration.

PDSCH-to-HARQ_feedback timing indicator (3 bits): is a hybrid automatic repeat request (HARQ) feedback timing indicator and indicates one of eight types of feedback timing offsets according to the higher layer configuration.

When DCI format 1_1 is transmitted together with a CRC scrambled by C-RNTI or CS-RNTI or MCS-C-RNTI, DCI format 1_1 may include at least the following information:

Identifier for DCI formats (1 bit): is a DCI format indicator and is always set to 1

Carrier indicator (0 or 3 bits): indicates a CC (or cell) on which a PDSCH allocated by the corresponding DCI is transmitted.

Bandwidth part indicator (0, 1, or 2 bits): indicates a BWP in which a PDSCH allocated by the corresponding DCI is transmitted.

Frequency domain resource assignment (payload is determined according to frequency domain resource assignment): indicates frequency domain resource allocation, where $N_{RB}^{DL,BWP}$ is the size of an active DL BWP. A detailed method may be described with reference to the aforementioned frequency domain resource allocation method.

Time domain resource assignment (4 bits): indicates time domain resource allocation according to the above description.

VRB-to-PRB mapping (0 or 1 bit): indicates non-interleaved when 0, and indicates interleaved VRP-to-PRB mapping when 1. VRB-to-PRB mapping is 0 bit when frequency domain resource allocation is set to resource type 0.

PRB bundling size indicator (0 or 1 bit): is 0 bits when the higher layer parameter prb-BundlingType is not set or is set to 'static', and 1 bit when set to 'dynamic'.

Rate matching indicator (0, 1, or 2 bits): indicates a rate matching pattern.

ZP CSI-RS trigger (0, 1, or 2 bits): is an indicator for triggering aperiodic ZP CSI-RS.

For transport block 1:
Modulation and coding scheme (5 bits): indicates a modulation order and a coding rate used for PDSCH transmission.
New data indicator (1 bit): indicates whether a PDSCH corresponds to initial transmission or retransmission according to whether the indicator is toggled.
Redundancy version (2 bits): indicates a redundancy version used for PDSCH transmission.

For transport block 2:
Modulation and coding scheme (5 bits): indicates a modulation order and a coding rate used for PDSCH transmission.
New data indicator (1 bit): indicates whether a PDSCH corresponds to initial transmission or retransmission according to whether the indicator is toggled.
Redundancy version (2 bits): indicates a redundancy version used for PDSCH transmission.

HARQ process number (4 bits): indicates an HARQ process number used for PDSCH transmission.

Downlink assignment index (0, 2, or 4 bits): a DAI indicator

TPC command for scheduled PUCCH (2 bits): a PUCCH power control indicator

PUCCH resource indicator (3 bits); is a PUCCH resource indicator and indicates one of eight types of resources according to higher layer configuration.

PDSCH-to-HARQ_feedback timing indicator (3 bits): is a hybrid automatic repeat request (HARQ) feedback timing indicator and indicates one of eight types of feedback timing offsets according to higher layer configuration.

Antenna port (4, 5, or 6 bits): indicates a demodulation reference signal (DMRS) port and a code division multiplex (CDM) group without data.

Transmission configuration indication (TCI) (0 or 3 bits): a TCI indicator.

SRS request (2 or 3 bits): an SRS transmission request indicator

CBG transmission information (0, 2, 4, 6, or 8 bits): an indicator indicating whether to transmit code block groups in the allocated PDSCH. 0 means that the CBG is not transmitted, and 1 means that the CBG is transmitted.

CBG flushing out information (0 or 1 bit): is an indicator indicating whether previous CBGs are contaminated, wherein 0 indicates that the previous CBGs are contaminated, and 1 indicates that the previous CBGs are combinable in retransmission reception.

DMRS sequence initialization (0 or 1 bit): a DMRS scrambling ID selection indicator For example, the base station may use DCI format 0_0 or DCI format 0_1 to allocate a PUSCH to one cell.

When DCI format 0_0 is transmitted together with a CRC scrambled by at least one of C-RNTI, CS-RNTI, or MCS-C-RNTI, DCI format 00 may include at least the following information:

Identifier for DCI formats (1 bit) is a DCI format indicator and is always set to 0

Frequency domain resource assignment (payload is determined according to frequency domain resource assignment): indicates frequency domain resource allocation, where $N_{RB}^{DL,BWP}$ is the size of an active DL BWP. A detailed method may be described with reference to the aforementioned frequency domain resource allocation method.

Time domain resource assignment (4 bits): indicates time domain resource allocation according to the above description.

Frequency hopping flag (0 or 1 bit): indicates whether frequency domain hopping is enabled for a PUSCH allocated by the corresponding DCI.

Modulation and coding scheme (5 bits): indicates a modulation order and a coding rate used for PUSCH transmission.

New data indicator (1 bit): indicates whether a PUSCH corresponds to initial transmission or retransmission according to whether the indicator is toggled.

Redundancy version (2 bits): indicates a redundancy version used for PUSCH transmission.

HARQ process number (4 bits): indicates an HARQ process number used for PUSCH transmission.

TPC command for scheduled PUSCH (2 bits): an indicator for adjusting the transmission power strength of a PUSCH allocated by the corresponding DCI.

UL-SCH indicator (1 bit) indicates whether UL-SCH is included in a PUSCH allocated by the corresponding DCI.

When DCI format 0_1 is transmitted together with a CRC scrambled by at least one of C-RNTI, CS-RNTI, semi-persistent channel state information RNTI (SP-CSI-RNTI), or MCS-C-RNTI, DCI format 0_1 may include at least the following information:

Identifier for DCI formats (1 bit): is a DCI format indicator and is always set to 0

Carrier indicator (0 or 3 bits): indicates a CC (or cell) on which a PUSCH allocated by the corresponding DCI is transmitted.

UL/SUL indicator (0 or 1 bit): indicates whether a PUSCH allocated by the corresponding DCI transmits supplementary UL (SUL).

Bandwidth part indicator (0, 1, or 2 bits): indicates a BWP in which a PUSCH allocated by the corresponding DCI is transmitted.

Frequency domain resource assignment (payload is determined according to frequency domain resource assignment): indicates frequency domain resource allocation, where $N_{RB}^{DL,BWP}$ is the size of an active DL BWP. A detailed method may be described with reference to the aforementioned frequency domain resource allocation method.

Time domain resource assignment (4 bits): indicates time domain resource allocation according to the description.

Frequency hopping flag (0 or 1 bit): indicates whether frequency domain hopping is enabled for a PUSCH allocated by the corresponding DCI.

Modulation and coding scheme (5 bits): indicates a modulation order and a coding rate used for PUSCH transmission.

New data indicator (1 bit): indicates whether a PUSCH is initial transmission or retransmission according to whether the indicator is toggled.

Redundancy version (2 bits): indicates a redundancy version used for PUSCH transmission.

HARQ process number (4 bits): indicates an HARQ process number used for PUSCH transmission.

$1^{st}$ downlink assignment index (1 or 2 bits): indicates a DAI for HARQ-ACK codebook generation.

$2^{nd}$ downlink assignment index (0 or 2 bits): indicates a DAI for HARQ-ACK codebook generation.

TPC command for scheduled PUSCH (2 bits): an indicator for adjusting the transmission power strength of a PUSCH allocated by the corresponding DCI.

SRS resource indicator (variable according to an SRS usage configuration): indicates a transmission precoding configuration of a PUSCH allocated by the corresponding DCI through an SRS resource.

Precoding information and number of layers (0, 1, 2, 3, 4, 5, or 6 bits): indicates transmission precoding information of a PUSCH allocated by the corresponding DCI and the number of transmission layers.

Antenna port (2, 3, 4, or 5 bits): indicates a transmission DMRS port of a PUSCH allocated by the corresponding DCI and a CDM group without data.

SRS request (2 or 3 bits): indicates an SRS resource requested to be transmitted through the corresponding DCI.

CSI request (0, 1, 2, 3, 4, 5, or 6 bits): indicates a CSI report trigger state requested to be transmitted through the corresponding DCI.

CBG transmission information (0, 2, 4, 6, or 8 bits): indicates whether code block groups in a PUSCH allocated by the corresponding DCI are transmitted.

Phase tracking reference signal (PTRS)-DMRS association (0 or 2 bits): indicates an association between a PTRS port and a DMRS port of a PUSCH allocated by the corresponding DCI.

Beta_offset indicator (0 or 2 bits): indicates an offset value used when an HARQ-ACK or a CSI report is multiplexed to a PUSCH.

DMRS sequence initialization (0 or 1 bit): is a DMRS scrambling ID selection indicator.

UL-shared channel (SCH) indicator (0 or 1 bit): indicates whether a UL-SCH is included in a PUSCH allocated by the corresponding DCI.

The maximum number of DCIs of different sizes that the UE is able to receive per slot in the corresponding cell is 4. The maximum number of DCIs of different sizes scrambled by C-RNTI that the UE is able to receive per slot in the cell is 3.

In the NR, the base station may schedule a PDSCH for the UE by using DCI format 1_0 or DCI format 1_1. When the base station schedules a PDSCH for the UE through DCI, QCL relation information of the transmitted PDSCH may be determined by referring to a TCI state indicated through the DCI. For example, the base station may configure a plurality of TCI states for the UE through RRC signaling, and may select some of them through MAC CE signaling. The base station may determine QCL relation information of the PDSCH by referring to one TCI state selected through a TCI field of the DCI from among the TCI states selected through the MAC CE signaling. However, the one TCI state selected through the TCI field of the DCI may not be followed by considering a DCI format for scheduling the PDSCH, a CORESET configuration value for determining whether the TCI field is included in the DCI, whether the UE reports a beam switching time for receiving the PDSCH as UE capability (e.g., timeDurationForQCL), the beam switching time for receiving the PDSCH reported by the UE, etc. In this case, an activated TCI state of a CORESET in which a PDCCH including DCI is transmitted may be followed, or an activated TCI state of a specific CORESET may be followed.

Figure 9:
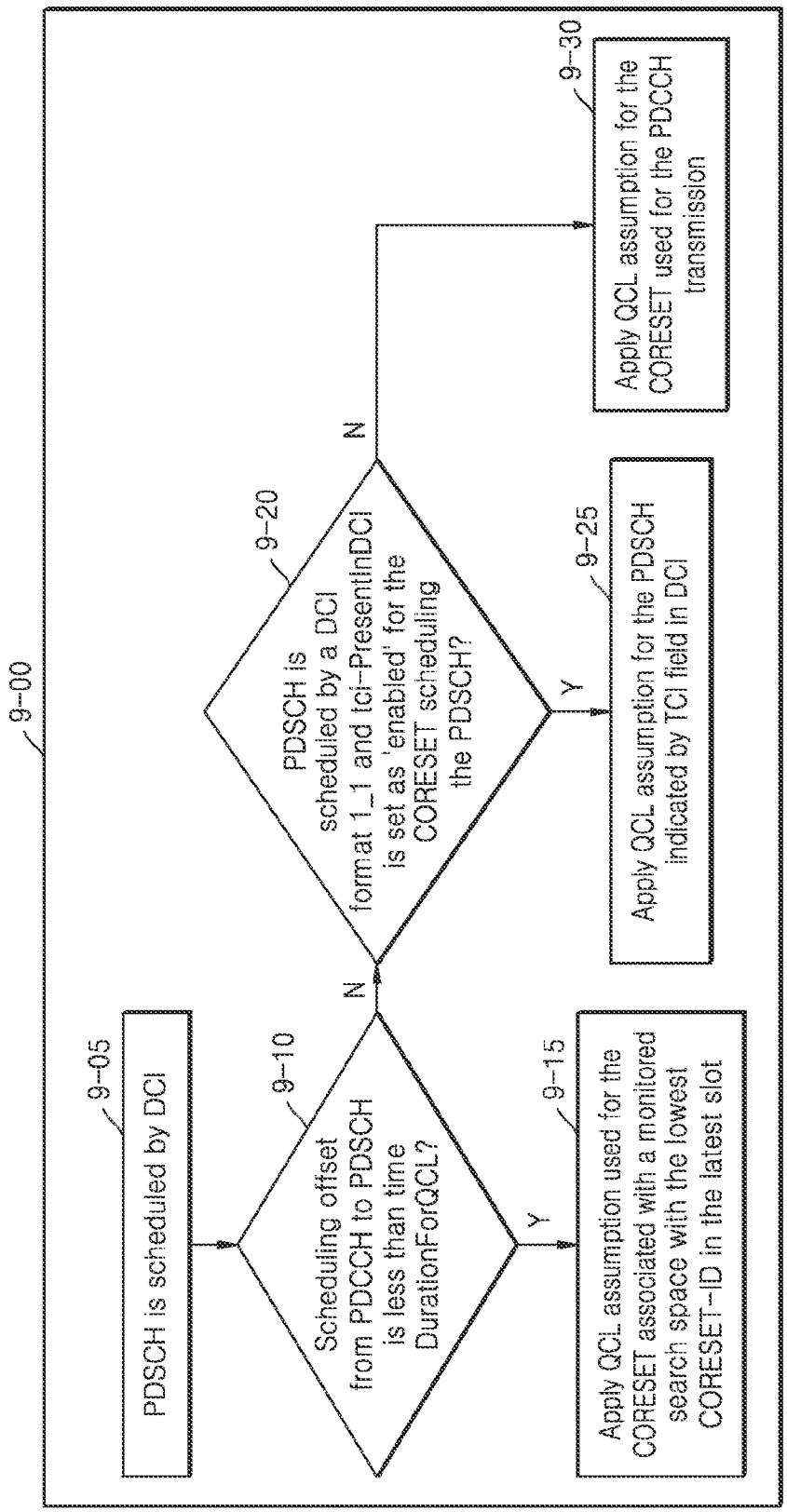
FIG. 9 is a flowchart illustrating a process of determining, when a base station schedules a PDSCH through downlink control information (DCI), a transmission configuration indication (TCI) state referenced to obtain quasi co-location (QCL) relationship information of the PDSCH to be transmitted, according to some embodiments.

FIG. 9 is a flowchart illustrating a process of determining, when a base station schedules a PDSCH through DCI, a TCI state referenced to obtain QCL relation information of the PDSCH to be transmitted, according to some embodiments.

Referring to FIG. 9, when a base station schedules a PDSCH through DCI, a TCI state referenced to obtain QCL relation information of the PDSCH to be transmitted may be determined according to flowchart 9-00. A base station schedules the PDSCH through the DCI. (9-05) When a symbol unit scheduling offset from a last symbol of a PDCCH including the DCI to a first symbol of the scheduled PDSCH is less than timeDurationForQCL reported by a UE as UE capability for a beam switching time to receive the PDSCH (9-10), QCL relation information of the PDSCH refers to an activated TCI state in a CORESET with a lowest CORESET index including a monitored search space of a latest slot for monitoring at least one CORESET within an activated BWP of a serving cell. (9-15) When the scheduling offset is equal to or greater than timeDurationForQCL (9-10), a DCI format for scheduling the PDSCH and a CORESET configuration value 'tci-PresentInDCI' for determining whether a TCI field is included in the DCI are determined. (9-20) When the PDSCH is scheduled with DCI format 1_1 and the value 'tci-PresentInDCI' of the CORESET including the PDCCH for scheduling the PDSCH is set to 'enabled', the QCL relation information of the PDSCH to be transmitted is determined by referring to a TCI state selected through the TCI field of the DCI. (9-25) When the PDSCH is scheduled with DCI format 1_0 or the value 'tci-PresentInDCI' of the CORESET including the PDCCH for scheduling the PDSCH is set to 'disabled', the QCL relation information of the PDSCH to be transmitted is determined by referring to an activated TCI state of a CORESET in which the PDCCH including the DCI for scheduling the PDSCH is transmitted. (9-30)

The process of determining the TCI state for obtaining the QCL relation information of the PDSCH by referring to flowchart 9-00 may be applied only when the UE reports beamSwitchTiming as UE capability. Alternatively, the process may be applied only when a frequency range (FR) in which the PDSCH is transmitted is FR2. Alternatively, the process may be applied only when at least one of TCI states selected through RRC signaling or MAC CE signaling includes 'QCL-typeD' including beam information.

In NR, when the base station schedules the PDSCH for the UE by using DCI format 1_0 or DCI format 1_1, the UE may transmit HARQ-ACK feedback information of the PDSCH through a physical uplink control channel (PUCCH) to the base station. The base station indicates, to the UE, a type of a PUCCH resource and a slot to which the PUCCH for transmitting the HARQ-ACK feedback information is mapped through the DCI for scheduling the PDSCH. In detail, the base station may indicate a slot offset between the PDSCH and the PUCCH for transmitting the HARQ-ACK feedback information through a PDSCH-to-HARQ_feedback timing indicator field of the DCI for scheduling the PDSCH. Also, the base station may indicate a type of a PUCCH resource for transmitting the HARQ-ACK feedback information through a PUCCH resource indicator of the DCI for scheduling the PDSCH.

Figure 10:
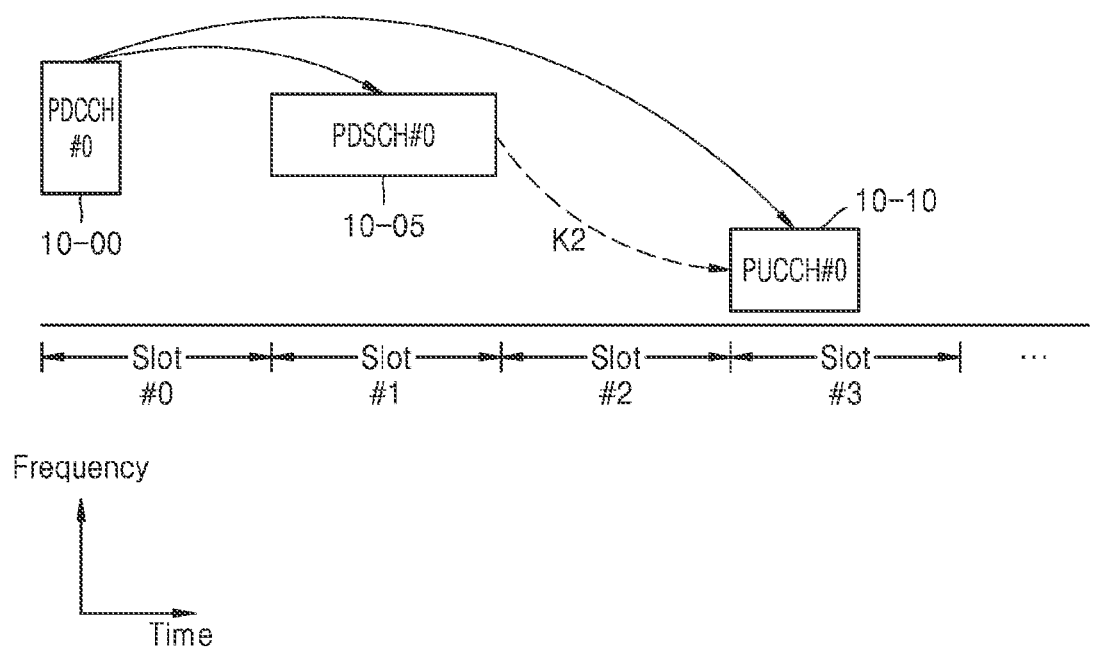
FIG. 10 is a diagram illustrating physical uplink control channel (PUCCH) resource allocation for HARQ-ACK feedback, according to some embodiments.

FIG. 10 is a diagram illustrating PUCCH resource allocation for HARQ-ACK feedback, according to some embodiments.

When a PDSCH 10-05 is scheduled based on DCI of a PDCCH 10-00, the PDSCH is transmitted, and slot information to which a PUCCH 10-10 including HARQ-ACK feedback corresponding to the PDSCH is mapped and symbol mapping information in the slot of the PUCCH 10-10 including the HARQ-ACK feedback are transmitted. In detail, a slot interval K2 between the PDSCH and the HARQ-ACK feedback corresponding to the PDSCH is indicated through a PDSCH-to-HARQ_feedback timing indicator, and one of eight feedback timing offsets configured through higher layer signaling or pre-determined to be 1 to 8 is indicated with a candidate value of the slot interval. Also, in order to transmit a PUCCH resource including a PUCCH-format for mapping HARQ-ACK feedback information, a position of a start symbol, and the number of mapping symbols, one of eight resources configured through higher layer signaling is indicated through a PUCCH resource indicator. A UE determines a time domain mapping position of the PUCCH including the HARQ-ACK feedback by referring to the slot interval between the PDSCH and the HARQ-ACK feedback corresponding to the PDSCH, and the position of the start symbol and the number of mapping symbols configured in the PUCCH resource. Also, the HARQ-ACK feedback information is mapped according to the PUCCH-format configured in the PUCCH resource.

A spatial domain transmission filter of the UE that transmits the PUCCH follows spatial relation info of the PUCCH activated through higher layer signaling including MAC CE in the PUCCH resource. When the activated spatial relation info of the PUCCH resource refers to an index of a CSI-reference signal (RS) resource OR a synchronization/broadcast channel block (SS/PBCH block (SSB)), the UE may transmit the PUCCH by using the same spatial domain transmission filter as a spatial domain receive filter used to receive the referenced CSI-RS resource or SSB. Alternatively, when the activated spatial relation info of the PUCCH resource refers to an index of a sounding reference signal (SRS) resource, the UE may transmit the PUCCH by using a spatial domain transmission filter used to transmit the referenced SRS resource.

In NR, a base station may schedule, by using DCI format 0_0 or DCI format 0_1, the UE to transmit a PUSCH. Time domain and frequency domain resource mapping information of the PUSCH to be transmitted by the UE may be obtained by referring to a value of a time domain resource assignment and frequency domain resource assignment field of the DCI, and a detailed mapping method follows the above time domain resource allocation method and frequency domain resource allocation method. Also, transmission precoding information, a rank, and the number of transmission layers of the PUSCH to be transmitted by the UE may refer to configuration information of an SRS resource indicated through an SRS resource indicator (SRI) field of the DCI or follows information indicated through a precoding information and number of layers field of the DCI. In detail, when the base station schedules the UE to transmit the PUSCH by using DCI format 0_0, the UE may transmit the PUSCH through a single layer without applying precoding. When the base station schedules the UE to transmit a codebook-based PUSCH by using DCI format 0_1, the UE may transmit the PUSCH by determining transmission precoding and the number of transmission layers according to the configuration information of the SRS resource indicated through the SRI field of the DCI and the information indicated in the precoding information and number of layers field of the DCI. When the base station schedules the UE to transmit a non-codebook-based PUSCH by using DCI format 0_1, the UE may transmit the PUSCH by determining transmission precoding and the number of transmission layers to be applied to the PUSCH according to transmission precoding and the number of transmission layers applied to transmit the SRS resource(s) indicated through the SRI field of the DCI.

The spatial domain transmission filter of the UE applied to the PUSCH transmitted by the UE may follow a value configured in the SRS resource indicated through the SRI field of the DCI or may apply a pre-determined spatial domain transmission filter. In detail, when the base station schedules the UE to transmit the PUSCH by using DCI format 0_0, the UE follows activated spatial relation info of the PUCCH resource with a lowest index in an activated uplink BWP of a serving cell. When the spatial relation info refers to the index of the CSI-RS resource or the SSB, the UE may use the spatial domain transmission filter such as the spatial domain receive filter used to receive the referenced CSI-RS resource or SSB. Alternatively, when the spatial relation info refers to the index of the SRS resource, the UE may use the spatial domain transmission filter used to transmit the referenced SRS resource. When the base station schedules the UE to transmit the PUSCH by using DCI format 0_1, the UE follows the spatial relation info or associated CSI-RS information configured through higher layer signaling in the SRS resource indicated through the SRI field of the DCI. When the spatial relation info is configured in the SRS resource, the UE may use the spatial domain transmission filter according to the above spatial relation info referencing method. When the spatial relation info is not configured in the SRS resource and csi-RS or associatedCSI-RS configuration information is included in an SRS resource set including the SRS resource, the UE may determine the spatial domain transmission filter by referring to transmission precoding information calculated according to the associated CSI-RS information.

When the base station schedules the UE to transmit the PUSCH by using DCI format 0_0 or DCI format 0_1, the UE may need a PUSCH preparation procedure time for transmitting the PUSCH by applying a transmission method (the transmission precoding method, the number of transmission layers, and the spatial domain transmission filter to the SRS resource) indicated through the DCI. In NR, the PUSCH preparation procedure time was defined in consideration of this. The PUSCH preparation procedure time of the UE may follow [Equation 1] below.

$$T_{proc,2} = \max((N_2 + d_{2,1})(2048 + 144) \cdot \kappa 2^{-\mu} \cdot T_c, d_{2,2})$$ [Equation 1]

Each variable in $T_{proc,2}$ may have the following meaning.

$N_2$: the number of symbols determined according to UE processing capability 1 or 2 according to the capability of the UE and a numerology μ. When UE processing capability 1 is reported according to the capability report of the UE, <<img1>> may have a value of [Table 7], and when UE processing capability 2 is reported and it is configured through higher layer signaling that UE processing capability 2 may be used, <<img1>> may have a value of [Table 8].

TABLE 7

| μ | PUSCH preparation time $N_2$ [symbols] |
|---|---|
| 0 | 10 |
| 1 | 12 |
| 2 | 23 |
| 3 | 36 |

TABLE 8

| μ | PUSCH preparation time $N_2$ [symbols] |
|---|---|
| 0 | 5 |
| 1 | 5.5 |
| 2 | 11 for frequency range 1 |

$d_{2,1}$: the number of symbols set to 0 when a first symbol of the PUSCH is configured only with a DM-RS, and set to 1 when not.

κ: 64

μ: from among or $\mu_{DL}$ or $\mu_{UL}$, a value in which $T_{proc,2}$ is larger is followed. $\mu_{DL}$ denotes a numerology of a downlink in which the PDCCH including the DCI for scheduling the PUSCH is transmitted, and $\mu^{UL}$ denotes a numerology of an uplink in which the PUSCH is transmitted.

$T_c$: $1/(\Delta f_{max} \cdot N_f)$, $\Delta f_{max} = 480 \cdot 10^3$ Hz, and $N_f = 4096$.

$d_{2,2}$: follows a BWP switching time when the DCI for scheduling the PUSCH indicates BWP switching, and, and has 0 when not.

Considering timing advance (TA) effect between the uplink-downlink and the time domain resource mapping information of the PUSCH scheduled through the DCI, when a first symbol of the PUSCH starts earlier than a first uplink symbol on which a CP starts after $T_{proc,2}$ from a last symbol of the PDCCH including the DCI for scheduling the PUSCH, the base station and the UE determine that the PUSCH preparation procedure time is insufficient. Otherwise, the base station and the UE determine that the PUSCH preparation procedure time is sufficient. When the PUSCH preparation procedure time is sufficient, the UE may transmit the PUSCH, and when the PUSCH preparation procedure time is insufficient, the UE may ignore the DCI for scheduling the PUSCH.

NR includes a channel state information (CSI) framework for indicating the base station to measure and report CSI of the UE. The CSI framework of the NR may include at least two elements, that is, resource setting and report setting. The report setting may have a connection relationship with each other by referring to at least one ID of the resource setting.

According to an embodiment of the present disclosure, the resource setting may include information related to a reference signal (RS) for the UE to measure CSI. The base station may configure at least one resource setting for the UE. As an example, the base station and the UE may exchange signaling information as in [Table 9] in order to transmit information about the resource setting.

TABLE 9

CSI-ResourceConfig information element

```
ASN1START
TAG-CSI-RECOURCECONFIG-STARRT
CSI-ResourceConfig : :=              SEQUENCE {
csi-ResourceConfigId                    CSI-ResourceConfigId,
csi-RS-ResourceSetList                  CHOICE {
nzp-CSI-RS-SSB                            SEQUENCE {
nzp-CSI-RS-ResourceSetList                  SEQUENCE (SIZE (1..maxNrofNZP-CSI-RS-ResourceSetsPerConfig)) OF
                                        NZP-
CSI-RS-ResourceSetId
OPTIONAL, Need R
csi-SSB-ResourceSetList                     SEQUENCE (SIZE (1..maxNrofCSI-SSB-ResourceSetsPerConfig)) OF CSI-
                                        SSB-
ResourceSetId
OPTIONAL, Need R
},
csi-IM-ResourceSetList                  SEQUENCE (Size (1..maxNrofCSI-IM-ResourceSetsPerConfig)) OF CSI-IM-
ResourceSetId
},
bwp-Id                                  BWP-Id,
resourceType                            ENUMERATED ( aperiodic, semiPersistent, periodic ),
...
}
TAG-CSI-RESOURCECONFIG-STOP
ASN1STOP
```

Signaling information CSI-ResourceConfig of [Table 9] includes information about each resource setting. According to the signaling information CSI-ResourceConfig, each resource setting may include a resource setting index (csi-ResourceConfigId) or a BWP index (bwp-ID) or a time domain transmission configuration of resources (resource-Type) or a resource set list (csi-RS-ResourceSetList) including at least one resource set. The time domain transmission configuration of resources may be configured to be aperiodic transmission or semi-persistent transmission or periodic transmission. The resource set list may be a set including resource sets for channel measurement, or a set including resource sets for interference measurement. When the resource set list is a set including resource sets for channel measurement, each resource set may include at least one resource, and the at least one resource may be an index of the CSI-RS resource or SSB. When the resource set list is a set including resource sets for interference measurement, each resource set may include at least one interference measurement resource (CSI interference measurement (CSI-IM)). For example, when the resource set includes a CSI-RS, the base station and the UE may exchange signaling information as in [Table 10] in order to transmit information about the resource set.

The signaling information NZP-CSI-RS-ResourceSet of [Table 10] includes information about each CSI-RS. According to the signaling information, each resource set may include at least information about a resource set index (nzp-CSI-ResourceSetId) or a CSI-RS index set (nzp-CSI-RS-Resources) included in each resource set. In addition, each resource set may include a part of information about the spatial domain transmission filter of the CSI-RS resource included in each resource set (repetition) or information about a tracking purpose of the CSI-RS resource (trs-Info).

The CSI-RS may be a most representative reference signal included in the resource set. The base station and the UE may exchange signaling information as in [Table 11] in order to transmit information about the CSI-RS resource.

TABLE 10

NZP-CSI-RS-Resource information element

```
ASN1START
TAG-NZP-CSI-RS-RESOURCESET-START
NZP-CSI-RS-Resource : :=             SEQUENCE {
nzp-CSI-RS-ResourceSetId                NZP-CSI-RS-ResourceSetId,
nzp-CSI-RS-Resources                    SEQUENCE (SIZE (1..maxNrodNZP-CSI-RS-ResourcesPerSet)) OF NZP-CSI-RS
ResourceId,
repetition                              ENUMERATED ( on, off )
OPTIONAL, Need S
aperiodTriggeringOffset                 INTEGER (0..6)
OPTIONAL, Need S
trs-info                                ENUMERATED (true)
OPTIONAL, Need S
...
}
  TAG-NZP-CSI-RS-RESOURCE-STOP
  ASN1STOP
```

TABLE 11

NZP-CSI-RS-Resource information element

```
ASN1START
TAG-NZP-CSI-RS-RESOURCE-START
NZP-CSI-RS-Resource ::=         SEQUENCE }
  nzp-CSI-RS-ResourceId           NZP-CSI-RS-ResourceId,
  resourceMapping                 CSI-RS-ResourceMapping
  powerControlOffset              INTEGER (-8..15),
  powerControlOffsetSS            ENUMERATED(db-3, db0, db3, db6)  OPTIONAL, Need R
  scramblingID                    ScramblingId,
  periodicAndOffset               CSI-ResourcePeriodicAndOffset    OPTIONAL, Cond
PeriodicOrSemiPersistent
  qcl-InfoPeriodcCSI-RS           TCI-StateId                      OPTIONAL, Cond
Periodic
  . . .
}
  TAG-NZP-CSI-RS-RESOURCE-STOP
  ASN1STOP
```

Signaling information NZP-CSI-RS-Resource of [Table 11] includes information about each CSI-RS. Information included in the signaling information NZP-CSI-RS-Resource may have the following meaning.

nzp-CSI-RS-ResourceId: an index of the CSI-RS resource 232-resourceMapping: resource mapping information of the CSI-RS resource powerControlOffset: a ratio between PDSCH EPRE (energy per RE) and CSI-RS EPRE resourceMapping included in the signaling information NZP-CSI-RS-Resource may indicate resource mapping information of the CSI-RS resource, and may include RE mapping for frequency resources, the number of ports, symbol mapping, CDM type, frequency resource density, and frequency band mapping information. Each of the number of ports, frequency resource density, CDM type, and time-frequency domain RE mapping, which may be configured through resourceMapping, may have a determined value in one of rows shown in [Table 12].

TABLE 12

| Row | Ports X | Density ρ | cdm-Type | $(\bar{k},\bar{l})$ | CDM group index j | k' | l' |
| --- | --- | --- | --- | --- | --- | --- | --- |
| 1 | 1 | 3 | No CDM | $(k_0,l_0), (k_0+4,l_0), (k_0+8,l_0)$ | 0,0,0 | 0 | 0 |
| 2 | 1 | 1, 0.5 | No CDM | $(k_0,l_0)$ | 0 | 0 | 0 |
| 3 | 2 | 1, 0.5 | FC-CDM2 | $(k_0,l_0)$ | 0 | 0,1 | 0 |
| 4 | 4 | 1 | FC-CDM2 | $(k_0,l_0), (k_0+2,l_0)$, | 0,1 | 0,1 | 0 |
| 5 | 4 | 1 | FC-CDM2 | $(k_0,l_0), (k_0,l_0+1)$, | 0,1 | 0,1 | 0 |
| 6 | 8 | 1 | FC-CDM2 | $(k_0,l_0), (k_1,l_0), (k_2,l_0), (k_3,l_0)$, | 0,1,2,3 | 0,1 | 0 |
| 7 | 8 | 1 | FC-CDM2 | $(k_0,l_0), (k_1,l_0), (k_0,l_0+1), (k_0,l_0+1)$, | 0,1,2,3 | 0,1 | 0 |
| 8 | 8 | 1 | CDM4 (FD2, TD2) | $(k_0,l_0), (k_1,l_0)$, | 0,1 | 0,1 | 0,1 |
| 9 | 12 | 1 | FD-CDM2 | $(k_0,l_0), (k_1,l_0), (k_2,l_0), (k_3,l_0), (k_4,l_0), (k_5,l_0)$, | 0,1,2,3,4,5 | 0,1 | 0 |
| 10 | 12 | 1 | CDM4 (FD2, TD2) | $(k_0,l_0), (k_1,l_0), (k_2,l_0)$, | 0,1,2 | 0,1 | 0,1 |
| 11 | 16 | 1, 0.5 | FD-CDM2 | $(k_0,l_0), (k_1,l_0), (k_2,l_0), (k_3,l_0)$, $(k_0,l_0+1), (k_1,l_0+1), (k_2,l_0+1), (k_3,l_0+1)$, | 0,1,2,3, 4,5,6,7 | 0,1 | 0 |
| 12 | 16 | 1, 0.5 | CDM4 (FD2, TD2) | $(k_0,l_0), (k_1,l_0), (k_2,l_0), (k_3,l_0)$, | 0,1,2,3 | 0,1 | 0,1 |
| 13 | 24 | 1, 0.5 | FD-CDM2 | $(k_0,l_0), (k_1,l_0), (k_2,l_0), (k_0,l_0+1), (k_1,l_0+1), (k_2,l_0+1),0,1,2,3,4,5$ $(k_0,l_1), (k_1,l_1), (k_2,l_1), (k_0,l_1+1), (k_1,l_1+1), (k_2,l_1+1),6,7,8,9,10,11$ | | 0,1 | 0 |
| 14 | 24 | 1, 0.5 | CDM4 (FD2, TD2) | $(k_0,l_0), (k_1,l_0), (k_2,l_0), (k_0,l_1), (k_1,l_1), (k_2,l_1)$, | 0,1,2,3,4,5 | 0,1 | 0,1 |
| 15 | 24 | 1, 0.5 | CDMB (FD2, TD4) | $(k_0,l_0), (k_1,l_0), (k_2,l_0)$, | 0,1,2 | 0,1 | 0,1 |
| 16 | 32 | 1, 0.5 | FD-CDM2 | $(k_0,l_0), (k_1,l_0), (k_2,l_0), (k_3,l_0)$, $(k_0,l_0+1), (k_1,l_0+1), (k_2,l_0+1), (k_3,l_0+1)$, $(k_0,l_1), (k_1,l_1), (k_2,l_1), (k_3,l_1)$, $(k_0,l_1+1), (k_1,l_1+1), (k_2,l_1+1), (k_3,l_1+1)$, | 0,1,2,3, 4,5,6,7, 8,9,10,11, 12,13,14,15 | 0,1 | 0 |
| 17 | 32 | 1, 0.5 | CDM4 (FD2, TD2) | $(k_0,l_0), (k_1,l_0), (k_2,l_0), (k_3,l_0), (k_0,l_1), (k_1,l_1), (k_2,l_1)$, $(k_3,l_1)$, | 0,1,2,3,4,5,6,7 | 0,1 | 0,1 |
| 18 | 32 | 1, 0.5 | CDM8 (FD2, TD4) | $(k_0,l_0), (k_1,l_0), (k_2,l_0), (k_3,l_0)$, | 0,1,2,3 | 0,1 | 0,1, 2,3 | powerControlOffsetSS: a ratio between SS/PBCH block EPRE and CSI-RS EPRE scramblingID: a scrambling index of a CSI-RS sequence periodicityAndOffset: a transmission period and a slot offset of the CSI-RS resource qcl-InfoPerodicCSI-RS: TCI-state information when the corresponding CSI-RS is a periodic CSI-RS

[Table 12] shows a frequency resource density configurable according to the number (X) of CSI-RS ports, a CDM type, frequency and time domain starting positions $(\bar{k},\bar{l})$ of a CSI-RS component RE pattern, and the number (k') of frequency domain REs and the number (l') of time domain REs of the CSI-RS component RE pattern. The CSI-RS component RE pattern may be a basic unit configuring the CSI-RS resource. The CSI-RS component RE pattern may include YZ REs through Y=1+max(k') frequency domain REs and Z=1+max(l') time domain REs. When the number of CSI-RS ports is 1, a position of a CSI-RS RE may be designated in a PRB without restriction on subcarriers, and may be designated by a bitmap having 12 bits. When the number of CSI-RS ports is {2, 4, 8, 12, 16, 24, 32} and Y is equal to 2, a position of a CSI-RS RE may be designated at every two subcarriers in a PRB, and may be designated by a bitmap having 6 bits. When the number of CSI-RS ports is 4 and Y is equal to 4, a position of a CSI-RS RE may be designated at every four subcarriers in a PRB, and may be designated by a bitmap having 3 bits. Similarly, a position of a time domain RE may be designated by a bitmap having a total of 14 bits. In this case, according to a Z value shown in [Table 12], the length of the bitmap may be changed like a frequency position designation. However, the principle thereof is similar to the above description, and therefore, a repeated description thereof will be omitted hereinafter.

The base station may activate, deactivate, or trigger CSI-RS transmission and reception to the UE through higher layer signaling including RRC signaling or MAC CE signaling or L1 signaling (e.g., DCI).

For example, the base station may activate or deactivate periodic CSI-RS transmission and reception through higher layer signaling to the UE. The base station may indicate to activate CSI-ResourceConfig in which resourceType is set to periodic through higher layer signal, and may transmit an NZP CSI-RS resource included in an NZP CSI-RS resource set referenced in the activated CSI-ResourceConfig. Time-frequency domain resource mapping in a slot of the transmitted NZP CSI-RS resource follows resource mapping information configured in the CSI-RS resource, and slot mapping including a transmission period and a slot offset follows periodicityAndOffset configured in the CSI-RS resource. Also, QCL relation information of the transmitted NZP CSI-RS resource may refer to a TCI state configured in the CSI-RS resource. The UE may receive a CSI-RS transmitted in an activated BWP for the activated periodic CSI-RS resource through higher layer signaling.

For example, the base station may activate or deactivate semi-persistent CSI-RS transmission and reception through higher layer signal to the UE. The base station may indicate to activate one or more NZP CSI-RS resource sets through MAC CE signaling, and may transmit an NZP CSI-RS resource included in the activated NZP CSI-RS resource set. The NZP CSI-RS resource set activated through MAC CE signaling may be limited to an NZP CSI-RS resource set including only a semi-persistent NZP CSI-RS resource, and the semi-persistent NZP CSI-RS resource may be limited to an NZP CSI-RS resource including periodicityAndOffset for configuring slot mapping including a transmission period and a slot offset and not including QCL relation information. Time-frequency domain resource mapping in a slot of the transmitted NZP CSI-RS resource follows resource mapping information configured in the CSI-RS resource, and the slot mapping including the transmission period and the slot offset follows periodicityAndOffset configured in the CSI-RS resource. Also, the QCL relation information of the transmitted NZP CSI-RS resource may refer to a TCI state indicated in an individual NZP CSI-RS resource in MAC CE signaling for activating the NZP CSI-RS resource set. The UE may receive a CSI-RS transmitted in an activated BWP for the activated semi-persistent CSI-RS resource through MAC CE signaling.

For example, the base station may trigger aperiodic CSI-RS transmission and reception through higher layer signaling or DCI to the UE. The base station may configure a plurality of aperiodic trigger states through RRC signaling for the UE and may select some of the aperiodic trigger states through MAC CE signaling. The base station may select one of the aperiodic trigger states selected through MAC CE signaling through DCI, and may trigger transmission and reception of aperiodic CSI-RS(s) referenced in the aperiodic trigger state. In detail, the aperiodic trigger state selected through the DCI by the base station may refer to one or more CSI-AssociatedReportConfigInfo, and CSI-AssociatedReportConfigInfo may refer to a CSI-RS resource set or an SSB resource set referenced for CSI report and CSI-ReportConfig for CSI report configuration. When the CSI-RS resource set referenced for CSI report is an NZP CSI-RS resource set including only an aperiodic NZP CSI-RS resource, transmission and reception of the aperiodic NZP CSI-RS resource included in the NZP CSI-RS resource set is triggered. The aperiodic NZP CSI-RS resource may be limited to an NZP CSI-RS resource not including periodicityAndOffset for configuring slot mapping including a transmission period and a slot offset of a periodic CSI-RS or a semi-persistent CSI-RS. Time-frequency domain resource mapping in a slot of the transmitted NZP CSI-RS resource follows resource mapping information configured in the CSI-RS resource. Also, slot mapping of the transmitted NZP CSI-RS resource may be determined a slot offset between the PDCCH including the DCI and the NZP CSI RS resource, and may follow a triggering offset configured in the NZP CSI-RS resource set. When all TCI states referenced for the transmitted NZP CSI-RS resource(s) does not include 'QCL-typeD' including beam information, a slot offset between the PDCCH including the DCI and the NZP CSI-RS resource may be determined to be 0 without following the triggering offset configured in the NZP CSI-RS resource set. The UE may receive a CSI-RS transmitted in an activated BWP for the triggered aperiodic CSI-RS resource through DCI.

When the base station triggers aperiodic CSI-RS transmission and reception through higher layer signaling or DCI to the UE, the QCL relation information of the NZP CSI-RS to be transmitted resource may refer to a TCI state configured for an individual NZP CSI-RS resource in AssociatedReportConfigInfo(s) referenced in the aperiodic trigger state selected through the DCI. When the UE reports a beam switching time for receiving the aperiodic CSI-RS as UE capability (e.g., beamSwitchTiming), in consideration of this, a TCI state configured for the NZP CSI-RS may not be followed, a TCI state referenced by another downlink channel or RS transmitted in the same symbol may be followed or an activated TCI state of a specific CO RESET may be followed.

Figure 11:
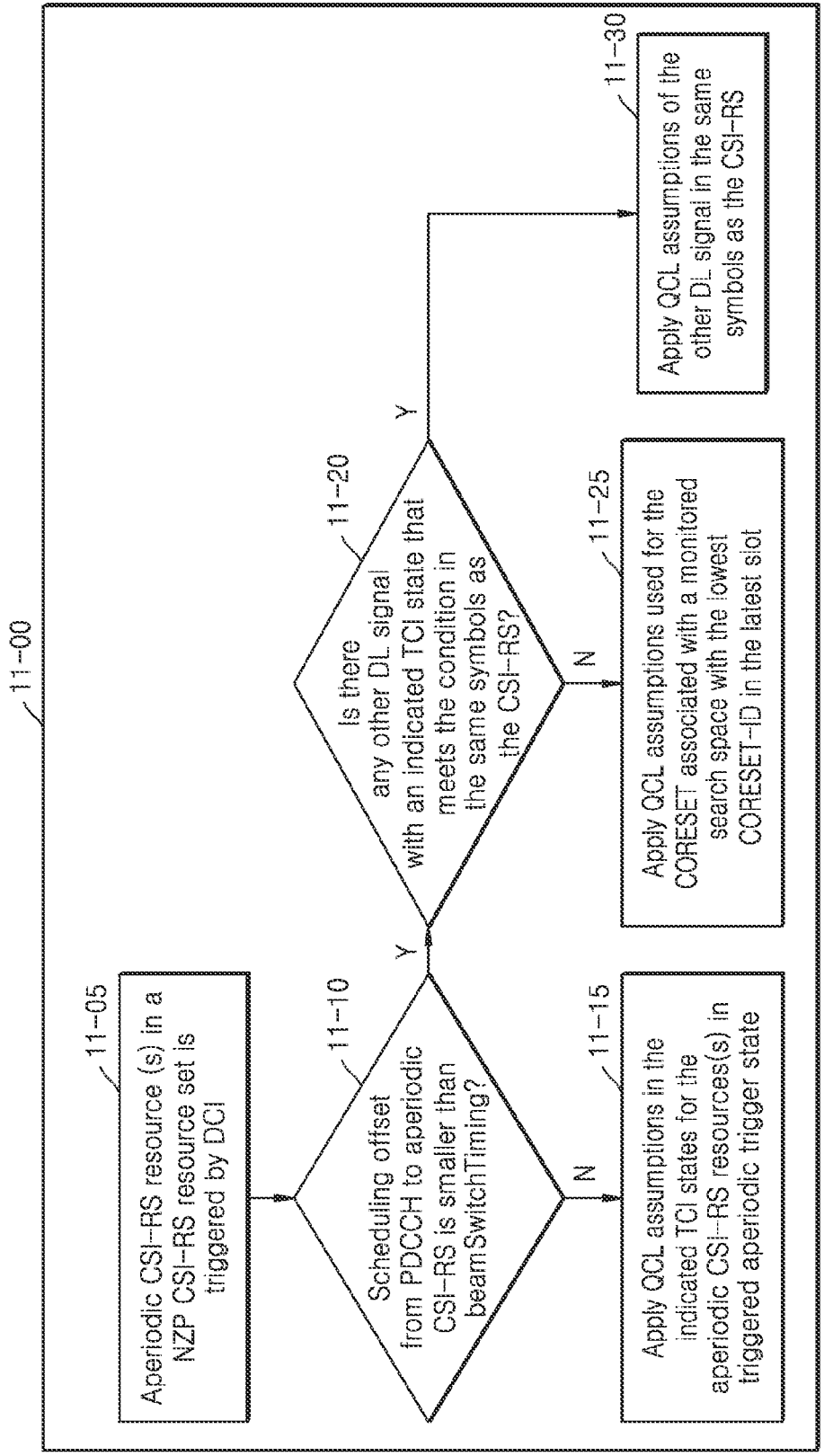
FIG. 11 is a flowchart illustrating a process of determining, when a base station triggers aperiodic channel state information-reference signal (CSI-RS) transmission and reception through DCI, a TCI state referenced to obtain QCL relationship information of a NZP CSI-RS resource to be transmitted, according to some embodiments.

FIG. 11 is a flowchart illustrating a process of determining, when a base station triggers aperiodic CSI-RS transmission and reception through DCI, a TCI state referenced to obtain QCL relation information of a NZP CSI-RS resource to be transmitted, according to some embodiments.

Referring to FIG. 11, when a base station triggers aperiodic CSI-RS transmission and reception through DCI, a TCI state referenced to obtain QCL relation information of a NZP CSI-RS resource to be transmitted may be determined according to flowchart 11-00. A base station triggers aperiodic CSI-RS resource(s) transmission and reception included in an NZP CSI-RS resource set through DCI. (11-05) When a symbol unit scheduling offset from a last symbol of a PDCCH including the DCI to a first symbol of the triggered aperiodic CSI-RS resource(s) is not less than beamSwitchTiming reported by a UE as UE capability for a beam switching time to receive an aperiodic CSI-RS (11-10), QCL relation information of a transmitted NZP CSI-RS resource refers to a TCI state configured for an individual NZP CSI-RS resource in CSI-AssociatedReportConfigInfo(s) referenced in an aperiodic trigger state selected through the DCI. (11-15) When the scheduling offset is less than beamSwitchTiming (11-10), it is determined whether there is a 'downlink signal satisfying a special condition' transmitted in the same symbol as the transmitted NZP CSI-RS resource. (11-20) When the 'downlink signal satisfying the special condition' may be limited to a PDSCH scheduled with an offset between the PDCCH and the PDSCH which is equal to or greater than timeDurationForQCL reported as UE capability for a beam switching time for receiving the PDSCH, or an aperiodic CSI-RS or a periodic CSI-RS or a semi-persistent CSI-RS scheduled with an offset between the PDCCH and a CSI-RS which is equal to or greater than beamSwitchTiming. When there is no 'downlink signal satisfying the special condition' transmitted in the same symbol as the transmitted NZP CSI-RS resource, QCL relation information of the transmitted NZP CSI-RS resource refers to an activated TCI state in a CORESET with a lowest CORESET index including a monitored search space of a latest slot for monitoring at least one CORESET within an activated BWP of a serving cell. (11-25) When there is ae downlink signal satisfying the special condition' transmitted in the same symbol as the transmitted NZP CSI-RS resource, QCL relation information of the transmitted NZP CSI-RS resource refers to a TCI state configured for the 'downlink signal satisfying the special condition' transmitted in the same symbol as the NZP CSI-RS resource. (11-30) The process of determining the TCI state for obtaining the QCL relation information of the NZP CSI-RS resource by referring to flowchart 11-00 may be applied only when the NZP CSI-RS resource set including the NZP CSI-RS resource does not include "trs-info' or 'repetition' configuration information according to a usage of the NZP CSI-RS resource. Alternatively, the process may be applied only when the UE reports beamSwitchTiming as UE capability. Alternatively, the process may be applied only when beamSwitchTiming reported by the UE is 14, 28, or 48 symbols.

The base station may configure at least one SRS configuration for each uplink BWP in order to transmit configuration information for SRS transmission to the UE, and may configure at least one SRS resource set for each SRS configuration. For example, the base station and the UE may transmit and receive the following signaling information to transmit information about the SRS resource set.

srs-ResourceSetId: an index of the SRS resource set
  srs-ResourceIdList: SRS resource indexes referenced in the resource set
  resourceType: a time domain transmission configuration of an SRS resource referenced in the SRS resource set, which may have one of 'periodic', 'semi-persistent', and 'aperiodic'. When resourceType is set to 'periodic' or 'semi-persistent', associated CSI-RS information may be provided according to a usage of the SRS resource set. When resourceType is set to 'aperiodic', an aperiodic SRS resource trigger list and slot offset information may be provided, and associated CSI-RS information may be provided according to a usage of the SRS resource set.
  usage: a configuration of a usage of the SRS resource referenced in the SRS resource set, which may have one of 'beamManagement', 'codebook', 'nonCodebook', and 'antennaSwitching'.
  alpha, p0, pathlossReferenceRS, srs-PowerControlAdjustmentStates: a parameter configuration for adjusting transmission power of the SRS resource referenced in the SRS resource set is provided.

The UE may understand that the SRS resource included in SRS resource indexes referenced in the SRS resource set follows information configured in the SRS resource set.

Also, the base station and the UE may transmit and receive higher layer signaling information in order to transmit individual configuration information of an SRS resource. For example, the individual configuration information of the SRS resource may include time-frequency domain mapping information in a slot of the SRS resource, and the time-frequency domain mapping information may include information about frequency hopping between slots or in a slot of the SRS resource. In another example, the individual configuration information of the SRS resource may include a time domain transmission configuration of the SRS resource, and may have one of 'periodic', 'semi-persistent', and 'aperiodic', Accordingly, it may be limited to have the same time domain transmission configuration as an SRS resource set including the SRS resource. When the time domain transmission configuration of the SRS resource is set to 'periodic' or 'semi-persistent', a transmission period and a slot offset of the SRS resource (e.g., periodicityAndOffset) may be additionally included. In another example, the individual configuration information of the SRS resource may include a configuration of a spatial domain transmission filter of the UE that transmits the SRS resource, and the configuration may be provided through spatial relation info for an SRS. When the spatial relation info included in the individual configuration information of the SRS resource refers to an index of a CSI-RS resource or an SSB, the UE may understand that the same spatial domain transmission filter as a spatial domain reception filter used to receive the CSI-RS resource or the SSB is used. Alternatively, when the spatial relation info refers to another SRS resource index, the UE may understand that a spatial domain transmission filter used to transmit the referenced SRS resource is used.

The base station may activate, deactivate, or trigger SRS transmission to the UE through higher layer signaling including RRC signaling or MAC CE signaling, or L1 signaling (e.g., DCI).

For example, the base station may activate or deactivate periodic SRS transmission through higher layer signaling to the UE. The base station may indicate to activate an SRS resource set in which resourceType is set to periodic through higher layer signaling, and the UE may transmit an SRS resource referenced in the activated SRS resource set. Time-frequency domain resource mapping in a slot of the transmitted SRS resource follows resource mapping information configured in the SRS resource, and slot mapping including a transmission period and a slot offset follows periodicityAndOffset configured in the SRS resource. Also, a spatial domain transmission filter applied to the transmitted SRS resource may refer to spatial relation info configured in the SRS resource, or may refer to associated CSI-RS information configured in the SRS resource set including the SRS resource. The UE may transmit the SRS resource in an activated uplink BWP for the activated periodic SRS resource through higher layer signaling.

For example, the base station may activate or deactivate semi-persistent SRS transmission through higher layer signaling to the UE. The base station may indicate to activate an SRS resource set through MAC CE signaling, and the UE may transmit an SRS resource referenced in the activated SRS resource set. The SRS resource set activated through MAC CE signaling may be limited to an SRS resource set in which resourceType is set to semi-persistent. Time-frequency domain resource mapping in a slot of the transmitted SRS resource follows resource mapping information configured in the SRS resource, and slot mapping including a transmission period and a slot offset follows periodicityAndOffset configured in the SRS resource. Also, a spatial domain transmission filter applied to the transmitted SRS resource may refer to spatial relation info configured in the SRS resource, or may refer to associated CSI-RS information configured in the SRS resource set including the SRS resource. When the spatial relation info is configured in the SRS resource, the spatial relation info may not be followed and the spatial domain transmission filter may be determined by referring to configuration information of the spatial relation info transmitted MAC CE signaling for activating semi-persistent SRS transmission. The UE may transmit the SRS resource in an activated uplink BWP for the activated semi-persistent SRS resource through higher layer signaling.

For example, the base station may trigger aperiodic SRS transmission through DCI to the UE. The base station may indicate one of aperiodic SRS resource triggers through an SRS request field of the DCI. The UE may understand that an SRS resource set including the aperiodic SRS resource trigger indicated through the DCI is triggered in an aperiodic SRS resource trigger list, in configuration information of the SRS resource set. The UE may transmit an SRS resource referenced in the triggered SRS resource set. Time-frequency domain resource mapping in a slot of the transmitted SRS resource follows resource mapping information configured in the SRS resource. Also, slot mapping of the transmitted SRS resource may be determined through a slot offset between a PDCCH including the DCI and the SRS resource, and may refer to value(s) included in a slot offset set configured in the SRS resource set. In detail, the slot offset between the PDCCH including the DCI and the SRS resource may apply a value indicated in a time domain resource assignment field of the DCI from among offset value(s) included in the slot offset set configured in the SRS resource set. Also, a spatial domain transmission filter applied to the transmitted SRS resource may refer to spatial relation info configured in the SRS resource, or may refer to associated CSI-RS information configured in the SRS resource set including the SRS resource. The UE may transmit the SRS resource in an activated uplink BWP for the aperiodic SRS resource triggered through the DCI.

When the base station triggers aperiodic SRS transmission through DCI to the UE, in order to transmit an SRS by applying configuration information of an SRS resource, the UE may need a minimum time interval between a PDCCH including the DCI for triggering aperiodic SRS transmission and the transmitted SRS. A time interval for SRS transmission of the UE may be defined as the number of symbols between a last symbol of the PDCCH including the DCI for triggering aperiodic SRS transmission and a first symbol to which a first transmitted SRS resource from among transmitted SRS resource(s) is mapped. The minimum time interval may be determined by referring to a PUSCH preparation procedure time required for the UE to prepare PUSCH transmission. Also, the minimum time interval may vary according to a usage of a SRS resource set including the transmitted SRS resource. For example, the minimum time interval may be determined to be $N_2$ symbols defined by considering UE processing capability according to UE capability by referring to the PUSCH preparation procedure time of the UE. Also, when the usage of the SRS resource set is set to 'codebook' or 'antennaSwitching' by considering the usage of the SRS resource set including the transmitted SRS resource, the minimum time interval may be determined to be $N_2$ symbols, and when the usage of the SRS resource set is set to 'nonCodebook' or 'beamManagement', the minimum time interval may be determined to be $N_2+14$ symbols. When the time interval for SRS transmission is equal to or greater than the minimum time interval, the UE may transmit the aperiodic SRS, and when the time interval for SRS transmission is less than the minimum time interval, the UE may ignore the DCI for triggering the aperiodic SRS.

The present disclosure provides a method by which the UE determines a beam switching time required to transmit an uplink signal by using an uplink beam indicated through higher layer signal or L1 signaling, and a method of determining an uplink beam by considering a beam switching time when various uplink signals (e.g., SRS, PUSCH, or PUCCH) are transmitted. The base station may indicate uplink signal transmission to the UE through higher layer signaling or L1 signaling, and may also transmit configuration information of an uplink beam used by the UE during uplink signal transmission. The base station may directly inform an uplink beam to notify configuration information of the uplink beam to the UE, or may indirectly indicate an uplink beam through configuration information of uplink signal transmission (e.g., SRS resource or PUCCH resource configuration information). The UE may decode higher layer signaling or L1 signaling of the base station indicating uplink signal transmission, and then may perform uplink signal transmission by using an uplink beam indicated by the base station. In this case, in order for the UE to use the uplink beam indicated by the base station after decoding the higher layer signaling or L1 signaling of the base station, a sufficient time for preparing the uplink beam should be guaranteed between the signaling of the base station and the uplink signal transmission. In the present disclosure, the time is defined as a beam switching time for the uplink signal transmission of the UE. The beam switching time for the uplink signal transmission of the UE is a time required by the UE between the signaling through which the base station indicates the uplink signal transmission to the UE and the uplink signal transmission of the UE, and may vary according to a signaling method of the base station and characteristics of the uplink signal. An uplink signal considered in the present disclosure includes at least all or part of an SRS, a PUSCH, or a PUCCH, and the signaling for the uplink signal transmission of the base station includes all or part of higher layer signaling including RRC or MAC CE or L1 signaling including DCI. A method of determining a beam switching time for uplink signal transmission of the UE in various cases will be described in detail in the following embodiments.

The UE may perform uplink signal transmission by considering indication or configuration information for uplink signal transmission of the base station and a beam switching time for uplink signal transmission. For example, when signaling for uplink transmission of the base station sufficiently satisfies a beam switching time for uplink signal transmission by considering indication for uplink transmission of the base station and configuration information for uplink transmission, the UE may perform uplink signal transmission by using an uplink beam indicated by the base station. When the signaling for uplink transmission of the base station does not sufficiently satisfy the beam switching time for uplink signal transmission, the UE may follow one of the following uplink signal transmission methods.

Method 1: The UE may perform uplink signal transmission by using an uplink beam according to a pre-determined rule without following an uplink beam indicated by the base station. In this case, the UE may follow the indication of the base station for a configuration of uplink signal transmission except for the uplink beam.

Method 2: The UE may perform uplink signal transmission according to configuration information of uplink signal transmission (e.g., SRS resource or PUCCH resource) according to a pre-determined rule, without following configuration information of uplink signal transmission indicated by the base station. In this case, an uplink beam follows the configuration information of uplink signal transmission according to the pre-determined rule.

Method 3: The UE may not perform uplink signal transmission indicated by the base station. In the case of aperiodic SRS transmission, a minimum time interval may be determined by considering a beam switching time, and the UE may be indicated not to perform aperiodic SRS transmission when the beam switching time for aperiodic SRS transmission is not satisfied. Alternatively, the beam switching time and the minimum time interval may be individually considered, and the UE may be indicated not to perform aperiodic SRS transmission when at least one of the beam switching time and the minimum time interval is not satisfied. In the case of PUSCH transmission, a PUSCH preparation procedure time may be determined by considering a beam switching time, and the UE may be indicated not to perform PUSCH transmission when the beam switching time for PUSCH transmission is not satisfied. Alternatively, the beam switching time and the PUSCH preparation procedure time may be individually considered, and the UE may be indicated not to perform PUSCH transmission when at least one of the beam switching time and the PUSCH preparation procedure time is not satisfied.

A detailed operation for uplink signal transmission of the UE considering a beam switching time for uplink signal transmission may vary according to a signaling method of the base station and characteristics of an uplink signal transmitted by the UE. An uplink signal transmission operation of the UE considering a beam switching time for uplink signal transmission in various cases will be described in detail in the following embodiments.

The present disclosure guarantees a sufficient preparation time required for the UE to decode higher layer signaling or L1 signaling of the base station and then use an uplink beam indicated by the base station by considering a beam switching time for uplink signal transmission of the UE. The beam switching time for uplink signal transmission of the UE may be reported as UE capability to the base station, and may vary according to a signaling method of the base station and characteristics of an uplink signal transmitted by the UE. Accordingly, a preparation time for using an uplink beam which the UE should satisfy may be determined, and thus the following advantages may be provided in terms of operating the base station and the UE.

Advantage 1: Because the base station and the UE commonly recognize a preparation time for using an uplink beam indicated by the base station, the base station may indicate uplink signal transmission considering this to the UE. In other words, the base station may expect that the indicated uplink beam will be used when the UE satisfies a beam switching time for uplink signal transmission.

Advantage 2: When the UE does not sufficiently satisfy the beam switching time for uplink signal transmission and thus does not perform uplink signal transmission, inefficient uplink signal transmission of the UE may be suppressed, thereby efficiently operating an uplink channel.

Advantage 3: When the UE does not sufficiently satisfy the beam switching time for uplink signal transmission and thus performs uplink signal transmission by using an uplink beam according to a pre-determined rule without following the uplink beam indicated by the base station, the base station and the UE may commonly recognize the uplink beam used by the UE, thereby expecting an improvement in the uplink signal decoding performance of the base station.

Advantage 4: From the viewpoint of the UE, because a preparation time for using the uplink beam indicated by the base station is guaranteed, decoding of signaling of the base station and preparation for using the uplink beam may be flexibly performed within the beam switching time for uplink signal transmission. In other words, the UE may autonomously operate as long as the UE satisfies the beam switching time for uplink signal transmission.

Advantage 5: Because the beam switching time for uplink signal transmission of the UE is differently determined according to a signaling method of the base station and characteristics of an uplink signal transmitted by the UE, a difference in operations of the base station and the UE in various cases may be reflected. Accordingly, efficient network operation may be expected.

Advantage 6: The beam switching time may be determined by considering the implementation capability of the UE for uplink signal transmission such as the number of beams which the UE may use for uplink signal transmission, the number of panels which the UE has, and the number of panels activated by the UE. Accordingly, a difference in the implementation of the UE in the configuration of uplink signal transmission and the indication of the base station may be reflected.

The present disclosure provides a method of determining a beam switching time according to a signaling method of a base station and characteristics of an uplink signal according to the following embodiments. Also, the present disclosure provides a method of determining, when a base station indicates uplink signal transmission to a UE, an operation of the UE by considering a beams switching time.

Hereinafter, embodiments of the present disclosure will be described in detail with reference to the accompanying drawings. While describing the present disclosure, detailed descriptions of related well-known functions or configurations that may blur the points of the present disclosure are omitted. The terms used herein are those defined in consideration of functions in the present disclosure, but the terms may vary according to the intention of users or operators, precedents, etc. Hence, the terms used herein have to be defined based on the meaning of the terms together with the descriptions throughout the specification.

Hereinafter, examples are described through a plurality of embodiments in the present disclosure, but these are not independent and one or more embodiments may be applied simultaneously or in combination.

First Embodiment: Method of Determining a Beam Switching Time for Uplink Signal Transmission of a UE As an example of a method of determining a beam switching time for uplink signal transmission of a UE, the UE may report capability for the beam switching time for uplink signal transmission time to a base station. In addition, the beam switching time for uplink signal transmission of the UE may be differently determined according to condition or configuration information by considering at least one of the following condition or configuration information.

Type of an uplink signal (e.g., SRS, PUSCH, or PUCCH)

Numerology of an uplink BWP for transmitting an uplink signal

The number of UE panels (e.g., the number of panels through which the UE performs uplink signal transmission or the number of panels that may be simultaneously activated by the UE for uplink signal transmission or the number of panels that may be used by the UE for uplink signal transmission)

The base station and the UE may individually determine a beam switching time according to various types of uplink signals, a numerology, and the number of UE panels by considering the beam switching time for uplink signal transmission reported by the UE and the above condition and configuration information. For example, when the beam switching time for uplink transmission reported by the UE to the base station is X symbols, a beam switching time for uplink transmission to be actually applied may be determined to be X+Y symbols, and the determination of the Y value may vary according to a type of an uplink signal, a numerology, and the number of UE panels. Alternatively, the UE may report beam switching times for a plurality of uplink transmissions as UE capability by considering a type of an uplink signal, a numerology, and the number of UE panels. For example, the UE may report that a beam switching time for SRS transmission is $X_1$ symbols, may report a beam switching time for PUSCH transmission is $X_2$ symbols, and may report that a beam switching time for PUCCH transmission is $X_3$ symbols. In this case, different beam switching times may be applied according to a type of an uplink signal transmitted by the UE. When a type of an uplink signal is an SRS, a PUSCH, or a PUCCH, a method of determining a beam switching time according to the type of the uplink signal will be described in detail in $1\text{-}1^{th}$ Embodiment, $1\text{-}2^{th}$ Embodiment, and $1\text{-}3^{th}$ Embodiment. In another example, the UE may report that a beam switching time when an uplink numerology is $\mu_1$ is $X_1$ symbols, and may report that a beam switching time when an uplink numerology is $\mu_2$ is $X_2$. In this case, the UE may apply different beam switching times according to a numerology of an uplink BWP for transmitting an uplink signal.

In order to determine a beam switching time for uplink signal transmission of the UE is satisfied, a time interval between signaling through which the base station indicates uplink signal transmission to the UE and an uplink signal transmitted by the UE should be calculated and compared with the beam switching time. In the present disclosure, a time interval between signaling through which the base station indicates uplink signal transmission to the UE and an uplink signal transmitted by the UE may be expressed as a 'time offset', and may also be expressed as a 'scheduling interval', a 'scheduling offset', or a 'time interval'. A time offset according to a signaling method of the base station indicating uplink signal transmission may be calculated as follows.

When the base station indicates uplink signal transmission through L1 signaling including DCI, a time offset may be calculated as 'from the end of a last symbol on which a PDCCH including DCI is transmitted to the start of a first symbol on which an uplink signal (e.g., aperiodic/semi-persistent SRS or PUSCH or PUCCH including HARQ-ACK for a PDSCH) is transmitted'. The time offset may be calculated in units of absolute time or units of symbols. When a DCI decoding time of the UE is additionally considered, the time offset may be calculated as 'from when the DCI decoding time elapses from the end of the last symbol on which the PDCCH including the DCI is transmitted to when the first symbol on which the uplink signal is transmitted starts'.

When the base station indicates uplink signal transmission through MAC CE signaling, a time offset may be calculated by using the following methods.

Method 1: from the end of a last symbol on which a PDSCH including MAC CE signaling is transmitted to the start of a first symbol on which an uplink signal (e.g., aperiodic/semi-persistent SRS) is transmitted Method 2: from the end of a last symbol on which a PUCCH/PUSCH including HARQ-ACK for a PDSCH carrying MAC CE signaling is transmitted to the start of a first symbol on which an uplink signal is transmitted Method 3: from when a MAC CE application delay time (e.g., first slot after 3 ms elapses) elapses from the end of a last symbol on which a PUCCH/PUSCH including HARQ-ACK for a PDSCH including MAC CE signaling is transmitted to when a first symbol on which an uplink signal is transmitted starts The defined time offset may be calculated in units of absolute time or units of symbols.

When the time offset calculated according to the above method is less than a beam switching time for uplink signal transmission, the base station and the UE may determine that the beam switching time for uplink signal transmission of the UE is not satisfied. Alternatively, when the d time offset calculated according to the above method is equal to or greater than the beam switching time for uplink signal transmission of the UE, the base station and the UE may determine that the beam switching time for uplink signal transmission is satisfied. An operation of the UE according to whether a beam switching time for uplink signal transmission of the UE is satisfied will be described in detail in Second Embodiment, Third Embodiment, and Fourth Embodiment.

$1\text{-}1^{th}$ Embodiment: Method of Determining a Beam Switching Time for SRS Transmission As an example of a method of determining a beam switching time for SRS transmission, the UE may report capability for a beam switching time for SRS transmission to the base station. In addition, the beam switching time for SRS transmission of the UE may be differently determined according to condition or configuration information by considering at least one of the following condition or configuration information.

Signaling method (e.g., L1 signaling including DCI or MAC CE signaling) by which the base station triggers or activates SRS transmission to the UE Time domain transmission information of an SRS (e.g., periodic SRS or semi-persistent SRS or periodic SRS) which the base station indicates the UE to transmit Usage configuration information of an SRS resource set which the base station indicates the UE to transmit or a usage of an SRS resource (e.g., 'beamManagement' or 'codebook' or 'nonCodebook' or 'antennaSwitching') referenced in the SRS resource set The number of SRS resource sets which the base station may indicate the UE to transmit, or the number of SRS resource sets of an activated BWP configured through RRC signaling for the UE The number of SRS resources which the base station may indicate the UE to transmit or the number of SRS resources of an activated BWP configured through RRC signaling for the UE or the maximum number of SRS resources included in an SRS resource set of an activated BWP configured through RRC signaling for the UE The base station and the UE may individually determine a beam switching time according to various signaling methods of the base station, time domain transmission information of an SRS, a usage of an SRS resource set, and the number of SRS resource sets or SRS resources by considering the beam switching time for SRS transmission reported by the UE and the above condition or configuration information. For example, when the beam switching time for SRS transmission reported by the UE to the base station is X symbols, a beam switching time for SRS transmission to be actually applied may be determined to be X+Y symbols, and the determination of the Y value may vary according to a signaling method of the base station, time domain transmission information of an SRS, a usage of an SRS resource set, and the number of SRS resource sets or SRS resources. In this case, the Y value may be limited to integers including a positive number, 0, and a negative number. Alternatively, the UE may report beam switching times for a plurality of SRS transmissions as UE capability by considering a signaling method of the base station, time domain transmission information of an SRS, a usage of an SRS resource set, and the number of SRS resource sets or SRS resources. For example, the UE may report that a beam switching time for SRS transmission when a usage of an SRS resource set is 'beam Management' is $X_1$ symbols, and may report that a beam switching time for SRS transmission when a usage of an SRS resource set is 'antennaSwitching' is $X_2$. In this case, different beam switching times may be applied according to a usage of an SRS resource set which the base station indicates the UE to transmit.

1-2$^{th}$ Embodiment: Method of Determining a Beam Switching Time for PUSCH Transmission As an example of a method of determining a beam switching time for PUSCH transmission, the UE may report capability for a beam switching time for PUSCH transmission to the base station. In addition, the beam switching time for PUSCH transmission of the UE may be differently determined according to condition or configuration information by considering at least one of the following condition or configuration information.

Format (e.g., DCI format0_0 or DCI format 0_1) of DCI in which the base station indicates PUSCH transmission to the UE Precoding method (e.g., codebook-based PUSCH transmission or non-codebook-based PUSCH transmission) of a PUSCH which the base station indicates the UE to transmit The number of SRS resource sets or the number of SRS resources according to a precoding method of a PUSCH which the base station indicates the UE to transmit (e.g., the number of SRS resource sets in which usage configuration information of an SRS resource set is 'codebook' or the number of SRS resources included in the SRS resource set, or the number of SRS resource sets in which usage configuration information of an SRS resource set is 'nonCodebook' or the number of SRS resources included in the SRS resource set)

Relationship between an antenna port number used for PUSCH transmission which the base station indicates the UE to transmit and an antenna port number through which an SRS referenced for PUSCH transmission is transmitted The base station and the UE may individually determine a beam switching time according to various DCI formats, a PUSCH precoding method, the number of SRS resource sets or SRS resources according to a PUSCH precoding method, and a relationship between antenna port numbers for PUSCH and SRS transmission by considering the beam switching time for PUSCH transmission reported by the UE and the above condition or configuration information. For example, when the beam switching time for PUSCH transmission reported by the UE to the base station is X symbols, a beam switching time for PUSCH transmission to be actually applied may be determined to be X+Y symbols, and the determine of the Y value may vary according to a DCI format, a PUSCH precoding method, the number of SRS resource sets or SRS resources according to a PUSCH precoding method, and a relationship between antenna port numbers for PUSCH and SRS transmission. In this case, the Y value may be limited to integers including a positive number, 0, and a negative number. Alternatively, the UE may report beam switching times for a plurality of PUSCH transmissions as UE capability by considering a DCI format, a PUSCH precoding method, the number of SRS resource sets or SRS resources according to a SRS precoding method, and a relationship between antenna port numbers for PUSCH and SRS transmission. For example, the UE may report that a codebook-based beam switching time for PUSCH transmission is $X_1$ symbols, and may report that a non-codebook-based beam switching time for PUSCH transmission is $X_2$ symbols. In this case, different beam switching times may be applied according to a precoding method of a PUSCH which the base station indicates the UE to transmit. Alternatively, a beam switching time may be determined to be 0 by considering a DCI format, a PUSCH precoding method, and the number of SRS resource sets or SRS resources according to a PUSCH precoding method, or a beam switching time may not be considered. For example, when the base station indicates PUSCH transmission to the UE through DCI format 0_0, the base station and the UE may understand that a beam switching time is determined to be 0 symbols or a beam switching time is not considered.

1-3$^{th}$ Embodiment: Method of Determining a Beam Switching Time for PUCCH Transmission As an example of a method of determining a beam switching time for PUCCH transmission, the UE may report capability for a beam switching time for PUCCH transmission to the base station. In addition, the beam switching time for PUCCH transmission of the UE may be differently determined according to condition or configuration information by considering at least one of the following condition or configuration information.

The number of PUCCH resources for a PUCCH including HARQ-ACK for a PDSCH scheduled by the base station The number of spatial relation info configured through RRC signaling for PUCCH transmission or the number of activated spatial relation info of PUCCH resource(s) for a PUCCH including HARQ-ACK for a PDSCH The base station and the UE may individually determine a beam switching time according to the number of PUCCH resources for a PUCCH including HARQ-ACK for a scheduled PDSCH, the number of spatial relation info for PUCCH transmission, and the number of activated spatial relation info of a PUCCH resource by considering the beam switching time for PUCCH transmission reported by the UE and the above condition or configuration information. For example, when the beam switching time for PUCCH transmission reported by the UE to the base station is X symbols, a beam switching time for PUCCH transmission to be actually applied may be determined to be X+Y symbols, and the determination of the Y value may vary according to the number of PUCCH resources for a PUCCH including HARQ-ACK for a scheduled PDSCH, the number of spatial relation info for PUCCH transmission, and the number of activated spatial relation info of a PUCCH resource. In this case, the Y value may be limited to integers including a positive number, 0, and a negative number. Alternatively, the UE may report beam switching times for a plurality of PUCCH transmissions as UE capability by considering the number of PUCCH resources for a PUCCH including HARQ-ACK for a scheduled PDSCH, the number of spatial relation info for PUCCH transmission, and the number of activated spatial relation info of a PUCCH resource. In this case, different beam switching times may be applied according to the number of PUCCH resources for a PUCCH including HARQ-ACK for a scheduled PDSCH, the number of spatial relation info for PUCCH transmission, and the number of activated spatial relation info of a PUCCH resource. Also, the spatial relation info of the PUCCH resource may then be replaced with a UL TCI state in NR Release.

Second Embodiment: Method of Indicating SRS Transmission by Considering a Beam Switching Time The base station and the UE may determine a beam switching time for SRS transmission by using the method of First Embodiment or 1-1$^{th}$ Embodiment, and a method by which the base station indicates SRS transmission to the UE or an operation of the UE for the SRS transmission indication of the base station may be determined by considering the beam switching time. For example, the base station may force SRS transmission indication to the UE as long as the beam switching time is satisfied. Alternatively, when the SRS transmission indication of the base station does not satisfy the beam switching time for SRS transmission of the UE, the UE may be determined to perform the following operations.
  Method 1: The UE may perform SRS signal transmission by using an uplink beam according to a pre-determined rule without following an uplink beam for SRS transmission indicated by the base station.
  Method 2: The UE may perform uplink signal transmission according to configuration information (e.g., SRS resource) of SRS transmission according to a pre-determined rule, without following configuration information of SRS transmission indicated by the base station.
  Method 3: The UE may not perform SRS transmission indicated by the base station.

An operation of the UE for the SRS transmission indication of the base station may be differently determined according to a time domain operation configuration of an SRS (e.g., aperiodic SRS or semi-persistent SRS or periodic SRS) or a usage (e.g., 'beamManagement' or 'codebook' or 'nonCodebook' or 'antennaSwitching') of an SRS resource set which the base station indicates to trigger or activate. A method of determining an operation of the UE for the SRS transmission indication of the base station will be described in detail in 2-1$^{th}$ Embodiment or 2-2$^{th}$ Embodiment.

2-1$^{th}$ Embodiment: Method of Defining a Minimum Time Interval for SRS Transmission In an embodiment, a minimum time interval for aperiodic SRS transmission of the UE may be newly defined by considering a beam switching time for SRS transmission. Considering the newly defined minimum time interval, when the aperiodic SRS transmission indication of the base station does not satisfy the minimum time interval, the UE may not perform SRS transmission indicated by the base station. A method of newly defining a minimum time interval by considering a beam switching time for SRS transmission of the UE may follow one of the following methods.
  Method 1: A larger value from among a pre-defined minimum time interval and a beam switching time for SRS transmission may be newly defined as a minimum time interval. For example, when the pre-defined minimum time interval is $N_2$ symbols, the newly defined minimum time interval may follow [Equation 2].

$$\text{minimum time interval} = \max(N_2, \text{beam switching time}) \quad \text{[Equation 2]}$$

Method 2: Assuming that a beam switching time is required in addition to a pre-defined minimum time interval, a minimum time interval may be newly defined by adding the beam switching time. For example, when the pre-defined minimum time interval is $N_2$ symbols, the newly defined minimum time interval may follow [Equation 3].

$$\text{minimum time interval} = N_2 + \text{beam switching time} \quad \text{[Equation 3]}$$

When a pre-defined minimum time interval is differently defined according to a usage of an SRS resource set, a newly defined minimum time interval may also be differently defined according to the usage of the SRS resource set. For example, when a minimum time interval when a usage of an SRS resource set is set to 'beamManagement' is defined as $N_2+14$, a newly defined minimum time interval may be calculated by putting $N_a+14$, instead of $N_2$, into [Equation 2] or [Equation 3].

2-2$^{th}$ Embodiment: Method of Indicating a Spatial Domain Transmission Filter for SRS Transmission In an embodiment, considering a beam switching time for SRS transmission of the UE, when the SRS transmission indication of the base station does not satisfy the beam switching time, the UE may determine that a sufficient time to transmit an SRS by using an uplink beam indicated by the base station is not guaranteed, and may perform SRS signal transmission by using an uplink beam according to a pre-determined rule without following the uplink beam indicated by the base station. From among configuration information of SRS resource set(s) or SRS resource(s) which the base station indicates the UE to transmit, configuration information of SRS resource set(s) or SRS resource(s) other than configuration information of the uplink beam may follow the indication of the base station. When the base station indicates aperiodic SRS transmission to the UE, a minimum time interval for aperiodic SRS transmission of the UE may be applied separately from a beam switching time. In other words, when the aperiodic SRS transmission indication of the base station does not satisfy the minimum time interval, the UE may not perform SRS transmission indicated by the base station, and when the aperiodic SRS transmission indication of the base station satisfies the minimum time interval but does not satisfy the beam switching time, the UE may perform SRS signal transmission by using an uplink beam according to a pre-determined rule without following an uplink beam indicated by the base station.

For example, when the SRS transmission indication of the base station does not satisfy the beam switching time, a rule according to which the UE determines an uplink beam for transmitting an SRS signal may follow one of the following methods.

Method 1: The UE may determine an uplink beam by referring to spatial domain transmission filter configuration information of an SRS resource set or an SRS resource which is most recently transmitted before an SRS indicated by the base station is transmitted.

Method 2: The UE may determine an uplink beam by referring to spatial domain transmission filter configuration information of an SRS resource set or an SRS resource which is most recently transmitted before higher layer signaling or L1 signaling including DCI of the base station indicating SRS transmission is transmitted.

Method 3: The UE may determine an uplink beam by referring to spatial domain transmission filter configuration information of a preconfigured default SRS resource set or SRS resource.

Method 4: The UE may determine an uplink beam by referring to preconfigured default spatial domain transmission filter configuration information from among spatial domain transmission filter configuration information configurable in an SRS resource.

Method 5: The UE may determine an uplink beam by referring to any spatial domain transmission filter configuration information in a preconfigured spatial domain transmission filter set form among spatial domain transmission filter configuration information configurable in an SRS resource.

Because Method 1 or Method 2 determines that the UE refers to an uplink beam recently used for SRS transmission, the complexity of uplink beam transmission of the UE may be reduced, and the accuracy of a transmission/reception beam direction between the base station and the UE when a beam switching time is not satisfied may be increased. Because Method 3 or Method 4 determines that the UE uses a pre-determined uplink beam, the complexity of uplink beam transmission of the UE when a beam switching time is not satisfied may be reduced. Also, because Methods 1 through 4 allow the base station to understand an uplink beam of the UE when a beam switching time is not satisfied, the uplink signal decoding performance of the base station may be improved. Because Method 5 determines that the UE selects and uses any of a pre-determined uplink beam set, the degree of freedom for uplink beam operation of the UE may be increased, and the understanding of the base station about an uplink beam of the UE may be increased.

Figure 12:
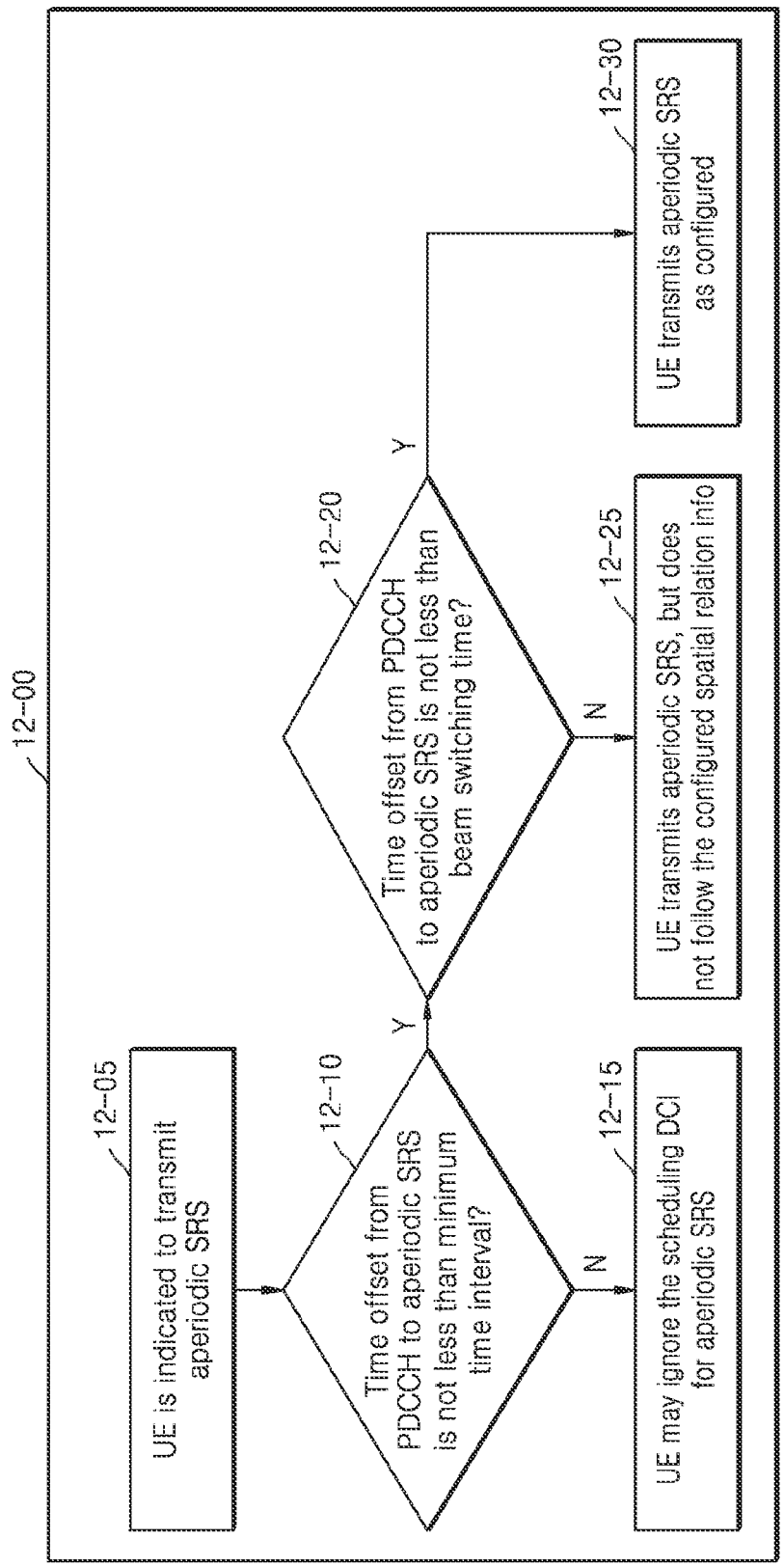
FIG. 12 is a flowchart illustrating a method of determining, when a base station triggers aperiodic SRS transmission through DCI, an operation of a user equipment (UE) considering a beam switching time, according to some embodiments.

FIG. 12 is a flowchart illustrating a method of determining, when a base station triggers aperiodic SRS transmission through DCI, an operation of a UE considering a beam switching time, according to some embodiments.

Referring to FIG. 12, when a base station triggers aperiodic SRS transmission to a UE through DCI, an operation of the UE considering a beam switching time may be determined according to flowchart 12-00. A base station triggers SRS resource(s) transmission included in SRS resource set(s) indicated through DCI to a UE. (12-05) The UE compares a time offset (e.g., from the end of a last symbol on which a PDCCH including the DCI is transmitted to the start of a first symbol on which an aperiodic SRS is transmitted) between the PDCCH including the DCI through which the base station triggers aperiodic SRS transmission to the UE and the aperiodic SRS transmitted by the UE with a minimum time interval required by the UE to transmit the aperiodic SRS. (12-10) When the time offset is less than the minimum time interval, the UE may not perform SRS transmission indicated by the base station. (12-15) When the time offset is equal to or greater than the minimum time interval, the UE compares the time offset with a beam switching time for transmitting an SRS. (12-20) When the time offset is less than the beam switching time for transmitting an SRS, the UE may perform SRS signal transmission by using an uplink beam according to a pre-determined rule without following an uplink beam indicated by the base station. (12-25) When the time offset is equal to or greater than the minimum time interval, the UE performs SRS transmission indicated by the base station according to configuration information. (12-30)

The process of determining the operation of the UE considering the beam switching time by referring to flowchart 12-00 may be applied only when usage configuration information of an SRS resource set is not set to 'beamManagement' according to a usage of an SRS resource set in which the base station triggers SRS transmission to the UE. When the usage configuration information of the SRS resource set in which the base station triggers SRS transmission to the UE is set to 'beamManagement', the UE may understand to follow the method of 2-1$^{th}$ Embodiment without following 2-2$^{th}$ Embodiment.

Figure 13:
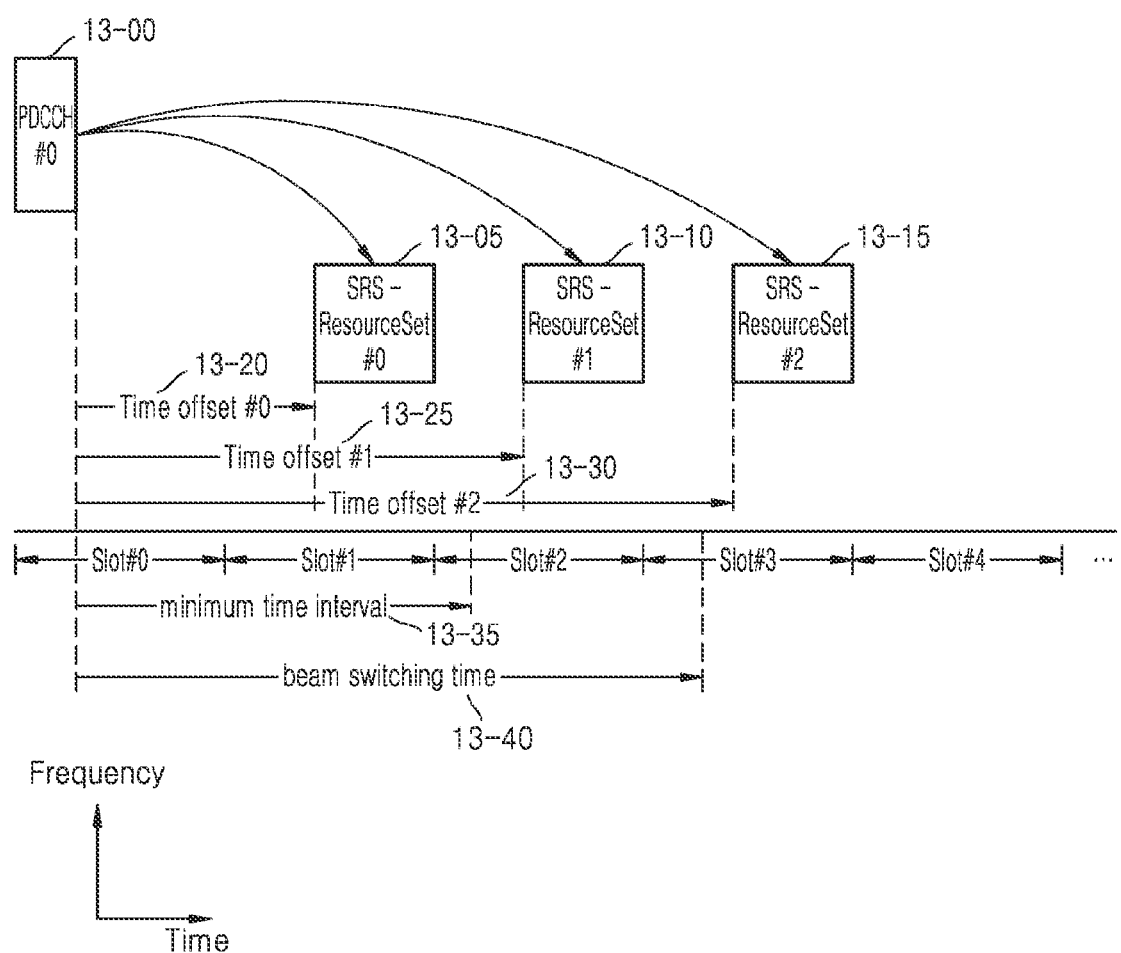
FIG. 13 is a diagram illustrating, when a base station triggers aperiodic sounding reference signal (SRS) transmission through DCI, a time offset between a physical downlink control channel (PDCCH) including the DCI for triggering SRS transmission and aperiodic SRS(s) transmitted by a UE, according to some embodiments.

FIG. 13 is a diagram illustrating, when a base station triggers aperiodic SRS transmission through DCI, a time offset between a PDCCH including the DCI for triggering SRS transmission and aperiodic SRS(s) transmitted by a UE, according to some embodiments.

FIG. 13 illustrates a PDCCH 13-00 transmitted by a base station to trigger aperiodic SRS transmission through DCI to a UE and time-frequency domain resource allocation of SRS-ResourceSet #0 13-05, SRS-ResourceSet #1 13-10, and SRS-ResourceSet #2 13-15 triggered through the DCI. A time offset between the PDCCH including the DCI through which the base station triggers aperiodic SRS transmission to the UE and an aperiodic SRS transmitted by the UE may be determined as from the end of a last symbol on which the PDCCH including the DCI is transmitted to the start of a first symbol on which the aperiodic SRS is transmitted. Accordingly, time offsets for SRS-ResourceSet #0 13-05, SRS-ResourceSet #1 13-10, and SRS-ResourceSet #2 13-15 may be respectively calculated as Time offset #0 13-20, Time offset #1 13-25, and Time offset #2 13-30. In the case of SRS-ResourceSet #0 13-05, because Time offset #0 13-20 is less than a minimum time interval 13-35, the UE may not transmit SRS-ResourceSet #0 13-05 according to the above embodiments. In the case of SRS-ResourceSet #1 13-10, because Time offset #1 13-25 is equal to or greater than the minimum time interval 13-35 but is less than a beam switching time 13-40, the UE may transmit SRS-ResourceSet #1 13-10 by using an uplink beam according to a pre-determined rule without following an uplink beam for SRS transmission indicated by the base station according to the above embodiments. In this case, configuration information other than configuration information for the uplink beam follows configuration information of SRS-ResourceSet #1 13-10 or configuration information of SRS resource(s) included in SRS-ResourceSet #1 13-10. In the case of SRS-ResourceSet #2 13-15, because Time offset #2 13-30 is equal to or greater than the minimum time interval 13-35 and the beam switching time 13-40, the UE may transmit SRS-ResourceSet #2 13-15 by referring to configuration information indicated by the base station according to the above embodiments.

Third Embodiment: Method of Indicating PUSCH Transmission by Considering a Beam Switching Time The base station and the UE may determine a beam switching time for PUSCH transmission by using the method of First Embodiment or 1-2$^{th}$ Embodiment, and a method by which the base station indicates PUSCH transmission to the UE or an operation of the UE for the PUSCH transmission indication of the base station may be determined by considering the beam switching time. For example, the base station may force PUSCH transmission indication to the UE as long as the beam switching time is satisfied. Alternatively, when the PUSCH transmission indication of the base station does not satisfy the beam switching time for PUSCH transmission of the UE, the UE may be determined to perform the following operations.

Method 1: The UE may perform PUSCH signal transmission by using an uplink beam according to a pre-determined rule without following an uplink beam for PUSCH transmission indicated by the base station. In this case, from among configuration information for PUSCH transmission, configuration information other than configuration information of the uplink beam may follow the indication of the base station.

Method 2: The UE may perform PUSCH signal transmission according to configuration information (e.g., SRS resource or PUCCH resource) of PUSCH transmission according to a pre-determined rule, without following configuration information of PUSCH transmission indicated by the base station.

Method 3: The UE may not perform PUSCH transmission indicated by the base station.

An operation of the UE for the PUSCH transmission indication of the base station may be differently determined according to a DCI format (e.g., DCI format 0_0 or DCI format 0_1) for scheduling a PUSCH, a precoding method for the PUSCH (e.g., codebook-based PUSCH or non-codebook-based PUSCH), and a relationship between antenna port numbers for PUSCH and SRS transmission. A method of determining an operation of the UE for the PUSCH transmission indication of the base station will be described in detail in 3-1$^{th}$ Embodiment or 3-2$^{th}$ Embodiment.

3-1$^{th}$ Embodiment: Method of Defining a Preparation Procedure Time for PUSCH Transmission In an embodiment, a preparation procedure time for PUSCH transmission of a UE may be newly defined by considering a beam switching time for PUSCH transmission. Considering the newly defined PUSCH preparation procedure time, when the PUSCH transmission indication of a base station does not satisfy the PUSCH preparation proeducere time, the UE may not perform PUSCH transmission indicated by the base station. A method of newly defining a PUSCH preparation procedure time by considering a beam switching time for PUSCH transmission may follow one of the following methods.

Method 1: A larger value from among a pre-defined PUSCH preparation procedure time and a beam switching time for PUSCH transmission may be newly defined as a PUSCH preparation procedure time. For example, when the pre-defined PUSCH preparation procedure time follows [Equation 1], the newly defined PUSCH preparation procedure time may follow [Equation 4].

$$T_{proc,2,new}=\max((N_2+d_{2,1})(2048+144)\cdot\kappa 2^{-\mu}\cdot T_c, d_{2,2}, \text{beam switching time}) \quad \text{[Equation 4]}$$

Method 2: Assuming that a beam switching time is additionally required in addition to the pre-defined PUSCH preparation procedure time, a PUSCH preparation procedure time may be newly defined. In this case, $d_{2,2}$ considering a BWP switching time may be considered separately from the beam switching time. For example, when the pre-defined PUSCH preparation procedure time follows [Equation 1], the newly defined PUSCH preparation procedure time may follow [Equation 5].

$$T_{proc,2,new}=\max((N_2+d_{2,1})(2048+144)\cdot\kappa 2^{-\mu}\cdot T_c+\text{beam switching time}, d_{2,2}) \quad \text{[Equation 5]}$$

When a beam switching time for PUSCH transmission is defined in units of symbols, in order to match the unit with a pre-defined PUSCH preparation procedure time, the beam switching time may converted into units of absolute time and may be applied to [Equation 4] or [Equation 5] for a newly defined PUSCH preparation procedure time.

When a pre-defined PUSCH preparation procedure time is differently defined according to a capability report of the UE, a newly defined PUSCH preparation procedure time may also be differently defined according to capability report information of the UE for a PUSCH preparation procedure time.

3-2$^{th}$ Embodiment: Method of Indicating an SRS Resource or Spatial Domain Transmission Filter for PUSCH Transmission In an embodiment, considering a beam switching time for PUSCH transmission of the UE, when the PUSCH transmission indication of the base station does not satisfy the beam switching time, the UE may determine that a sufficient time to transmit a PUSCH by using an uplink beam indicated by the base station is not guaranteed and may perform PUSCH signal transmission by using an uplink beam according to a pre-determined rule without following the uplink beam indicated by the base station. From among configuration information of the PUSCH which the base station indicates the UE to transmit, configuration information other than configuration information of the uplink beam may follow the indication of the base station. Alternatively, when the PUSCH transmission indication of the base station does not satisfy the beam switching time, the UE may perform PUSCH signal transmission by referring to SRS resource(s) or PUCCH resource according to a pre-determined rule without following SRS resource(s) which the base station indicates the UE to refer to for PUSCH transmission. From among configuration information of the PUSCH in which the base station indicates the UE to transmit, configuration information other than configuration of the referenced SRS resource(s) or PUCCH resource may follow the indication of the base station. A UE operation when the PUSCH transmission indication of the base station does not satisfy the beam switching time may vary according to a relationship between antenna port numbers for PUSCH and SRS transmission. For example, when the antenna port numbers for PUSCH and SRS transmission are shared (e.g., when the antenna port number for SRS transmission and the antenna port for PUSCH transmission are the same), the UE may perform PUSCH signal transmission by referring to SRS resource(s) or PUCCH resource according to a pre-determined rule without following SRS resource(s) or PUCCH resource which the base station indicates the UE to refer to for PUSCH transmission. When the antenna port numbers for PUSCH and SRS transmission are not shared (e.g., when the antenna port number for SRS transmission and the antenna port for PUSCH transmission are different from each other), the UE may perform PUSCH signal transmission by using an uplink beam according to a pre-determined rule without following an uplink beam indicated by the base station.

When the base station indicates PUSCH transmission to the UE, a preparation procedure time for PUSCH transmission of the UE may be applied separately from a beam switching time. In other words, when the PUSCH transmission indication of the base station does not satisfy the PUSCH preparation procedure time, the UE may not perform PUSCH transmission indicated by the base station, and when the PUSCH transmission indication of the base station satisfies the PUSCH preparation procedure time but does not satisfy the beam switching time, the UE may perform PUSCH signal transmission by using an uplink beam according to a pre-determined rule without following an uplink beam indicated by the base station or may perform PUSCH signal transmission by referring to SRS resource(s) or PUCCH resource according to a pre-determined rule without following SRS resource(s) or PUCCH resource which the base station indicates the UE to refer to for PUSCH transmission.

For example, when the PUSCH transmission indication of the base station does not satisfy the beam switching time, a rule according to which the UE transmits a PUSCH signal may follow one of the following methods.

Method 1: The UE may perform PUSCH signal transmission by referring to an SRS resource set or an SRS resource which is most recently transmitted before a PUSCH indicated by the base station is transmitted.

Method 2: The UE may perform PUSCH signal transmission by referring to an SRS resource set or an SRS resource which is most recently transmitted before higher layer signaling or L1 signaling including DCI through which the base station indicates PUSCH transmission is transmitted.

Method 3: The UE may perform PUSCH signal transmission by referring to a preconfigured default SRS resource set or SRS resource.

Method 4: The UE may determine an uplink beam for transmitting a PUSCH by referring to spatial domain transmission filter configuration information of an SRS resource set or SRS resource which is most recently transmitted before a PUSCH indicated by the base station is transmitted.

Method 5: The UE may determine an uplink beam for transmitting a PUSCH by referring to spatial domain transmission filter configuration information of an SRS resource set or SRS resource which is most recently transmitted before higher layer signaling or L1 signaling including DCI through which the base station indicates PUSCH transmission is transmitted.

Method 6: The UE may determine an uplink beam for transmitting a PUSCH by referring to spatial domain transmission filter configuration information of a preconfigured default SRS resource set or SRS resource.

Method 7: The UE may determine an uplink beam for transmitting a PUSCH by referring to spatial domain transmission filter configuration information of a preconfigured default PUCCH resource (e.g., PUCCH resource with a lowest ID configured in an activated uplink BWP of a serving cell).

Because Methods 1 through 3 determine that the UE refers to a most recently transmitted or default SRS resource without following an SRS resource which the base station indicates the UE to refer to for PUSCH transmission, Methods 1 through 3 may be applied to a case where antenna port numbers for PUSCH and SRS transmission are shared. Spatial domain transmission filter configuration information used for PUSCH signal transmission may refer to spatial domain transmission filter configuration information of a referenced SRS resource set or SRS resource. Because Methods 4 through 7 determine that the UE refers to a spatial domain transmission filter of a most recently transmitted or default SRS resource of PUCCH resource without following spatial domain transmission filter configuration information of an SRS resource which the base station indicates the UE to refer to for PUSCH transmission, Methods 4 through 7 may be applied to a case where antenna ports for PUSCH and SRS transmission are not shared. Configuration information other than configuration information of an uplink beam follows the indication of the base station.

Because Method 1, 2, 4, or 5 determines that the UE determines an uplink beam for PUSCH transmission by referring to spatial domain transmission filter configuration information of a recently transmitted SRS resource, the complexity of uplink beam transmission of the UE may be reduced and the accuracy of a transmission/reception beam direction between the base station and the UE when a beam switching time is not satisfied may be increased. Because Method 3, 6, or 7 determines that the UE uses a pre-determined uplink beam, the complexity of uplink beam transmission of the UE when a beam switching time is not satisfied may be reduced. Also, because Methods 1 through 7 allow the base station to understand an uplink beam of the UE when a beam switching time is not satisfied, the uplink signal decoding performance of the base station may be improved.

Figure 14:
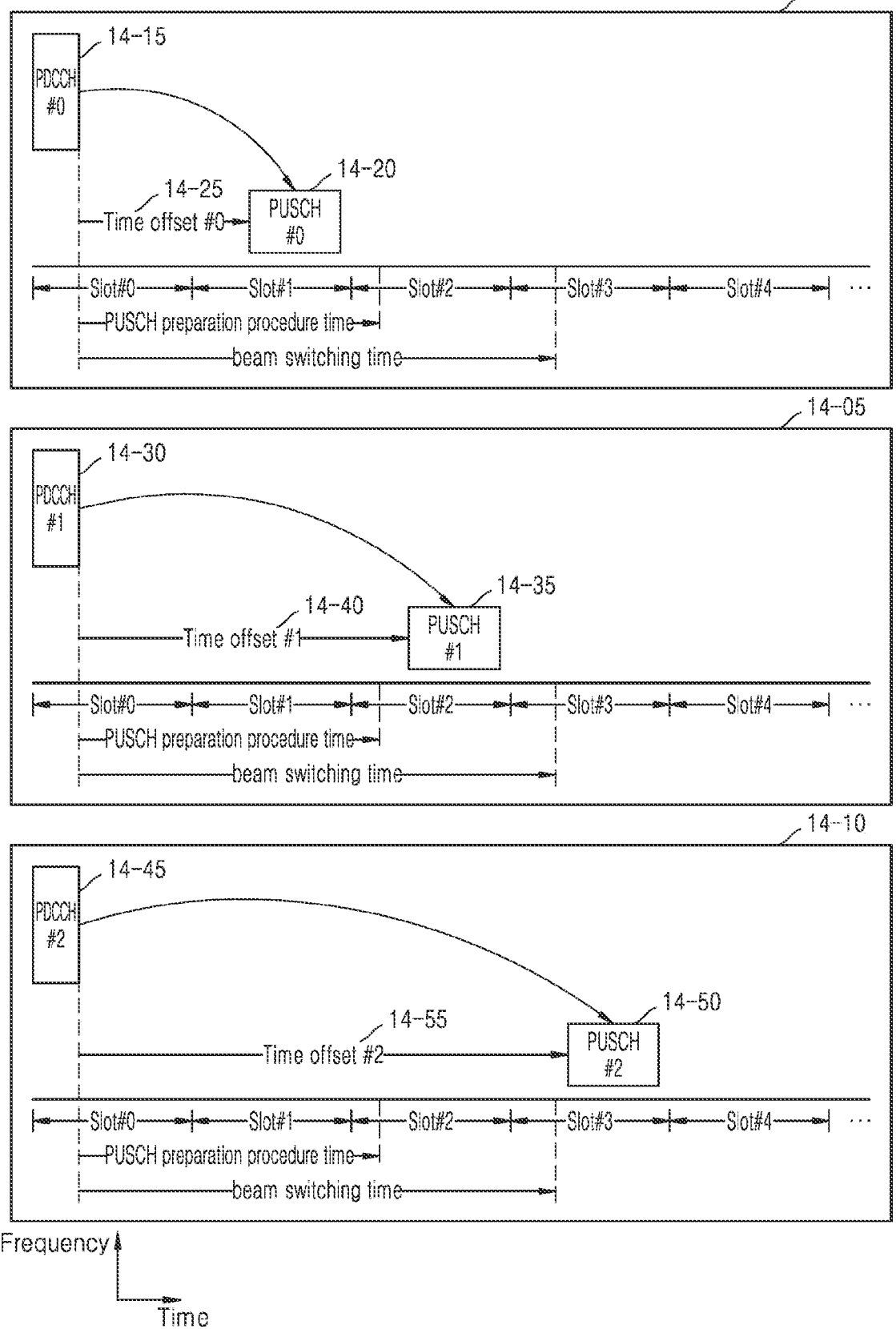
FIG. 14 is a diagram illustrating, when a base station indicates physical uplink shared channel (PUSCH) transmission through DCI, a time offset between a PDCCH including the DCI for indicating the PUSCH transmission and the PUSCH to be transmitted by a UE, according to some embodiments.

FIG. 14 is a diagram illustrating, when a base station indicates PUSCH transmission through DCI, a time offset between a PDCCH including the DCI for indicating PUSCH transmission and the PUSCH to be transmitted by a UE, according to some embodiments.

FIG. 14 illustrates Examples 14-00, 14-05, and 14-10 for time-domain resource allocation of a PDCCH in which a base station indicates PUSCH transmission through DCI to a UE and a PUSCH scheduled through the DCI. Referring to Example 14-00, Time offset #0 14-25 between PDCCH #0 14-15 in which the base station indicates PUSCH transmission through DCI to the UE and PUSCH #0 14-20 transmitted by the UE is less than a PUSCH preparation procedure time. When Time offset #0 14-25 is less than the PUSCH preparation procedure time, the UE may not perform transmission of PUSCH #0 14-20 indicated by the base station according to the above embodiments. Referring to Example 14-05, Time offset #1 14-40 between PDCCH #1 14-30 in which the base station indicates PUSCH transmission through DCI to the UE and PUSCH #1 14-35 transmitted by the UE is equal to or greater than a PUSCH preparation procedure time but is less than a beam switching time. When Time offset #1 14-40 is less than the beam switching time, the UE may perform transmission of PUSCH #1 14-35 by using an uplink beam according to a pre-determined rule without following an uplink beam for PUSCH transmission indicated by the base station according to the above embodiment, or may perform transmission of PUSCH #1 14-35 by referring to an SRS resource according to a pre-determined rule without following an SRS resource which the base station indicates the UE to refer to for PUSCH transmission. Referring to Example 14-10, Time offset #2 14-55 between PDCCH #2 14-45 in which the base station indicates PUSCH transmission through DCI to the UE and PUSCH #2 14-50 transmitted by the UE is equal to or greater than a PUSCH preparation procedure time and a beam switching time. When Time offset #2 14-55 is equal to or greater than the PUSCH preparation procedure time and the beam switching time, the UE may perform transmission of PUSCH #2 14-50 by referring to configuration information indicated by the base station according to the above embodiments.

Fourth Embodiment: Method of Indicating PUCCH Transmission by Considering a Beam Switching Time The base station and the UE may determine a beam switching time for PUCCH transmission by using the method of First Embodiment or 1-3$^{th}$ Embodiment, and a method by which the base station indicates PUCCH transmission to the UE or an operation of the UE for the PUCCH transmission indication of the base station may be determined by considering the beam switching time. For example, the base station may force PUCCH transmission indication to the UE as long as the beam switching time is satisfied. Alternatively, when the PUCCH transmission indication of the base station does not satisfy the beam switching time for PUCCH transmission of the UE, the UE may be determined to perform the following operations.
  Method 1: The UE may perform PUCCH signal transmission by using an uplink beam according to a pre-determined rule without following an uplink beam for PUCCH transmission indicated by the base station. In this case, from among configuration information for PUCCH transmission, configuration information other than configuration information of the uplink beam may follow the indication of the base station.
  Method 2: The UE may not perform PUCCH transmission indicated by the base station.

An operation of the UE considering a beam switching time for PUCCH transmission for the PUCCH transmission indication of the base station may be applied only when a PUCCH including HARQ-ACK for a PDSCH scheduled by the base station is transmitted. When the PUCCH including HARQ-ACK information for the PDSCH scheduled by the base station is transmitted, a time offset may be defined as from the end of a last symbol on which a PDCCH including DCI for scheduling the PDSCH is transmitted to the start of a first symbol on which the PUCCH including HARQ-ACK for the PDSCH is transmitted. Also, an operation for PUCCH transmission of the UE considering a beam switching time for PUCCH transmission of the UE may be applied only when the base station changes activated spatial relation info of a PUCCH resource through higher layer signaling. In other words, when a time offset between the signaling of the base station of changing the activated spatial relation info of the PUCCH resource and the PUCCH transmitted by the UE does not satisfy the beam switching time for PUCH transmission, a method of determining an operation of the UE considering the beam switching time when the base station indicates PUCCH transmission may be equally applied. A method of determining an operation of the UE for the PUCCH transmission indication of the base station will be described in detail in 4-2$^{th}$ Embodiment.

4-1$^{th}$ Embodiment: Method of Defining a Slot Offset for PUCCH Transmission

In an embodiment, when the UE transmits a PUCCH including HARQ-ACK information for a PDSCH scheduled by the base station through DCI, in order to satisfy a beam switching time for PUCCH transmission, a slot offset between the PUCCH and a PDSCH configured for time domain resource allocation of the PUCCH including HARQ-ACK information may be newly defined. Considering the beam switching time for PUCCH transmission of the UE, the slot offset between the PDSCH and the PUCCH may be indicated to be long enough to satisfy the beam switching time. According to the current NR Release 15, the base station may indicate the slot offset between the PDSCH and the PUCCH for transmitting HARQ-ACK feedback information through a PDSCH-to-HARQ_feedback timing indicator field of the DCI via which the base station schedules the PDSCH. A method of newly defining a slot offset between a PDSCH and a PUCCH for transmitting HARQ-ACK feedback information may follow one of the following methods.
  Method 1: A slot offset between a PDSCH and a PUCCH for transmitting HARQ-ACK feedback information may be calculated by considering a numerology of an activated BWP of a downlink or an uplink. For example, when a slot offset between a PDSCH and a PUCCH for transmitting HARQ-ACK feedback information indicated through a PDSCH-to-HARQ_feedback timing indicator field of DCI is k slots and a numerology of an activated BWP of an uplink is μ the slot offset k may be calculated as k·2$^{μ}$ slots.
  Method 2: A slot offset set that may be indicated by a slot offset between a PDSCH and a PUCCH for transmitting HARQ-ACK feedback information may be individually defined for each numerology of an activated BWP of a possible downlink or uplink. In this case, the interpretation of a PDSCH-to-HARQ_feedback timing indicator field value of DCI may vary according to the numerology of the activated BWP of the downlink or uplink. For example, assuming that a code value of the PDSCH-to-HARQ_feedback timing indicator field of the DCI is set to 000, when the numerology of the activated BWP of the uplink is $μ_1$, the slot offset may be calculated to be $k_1$, and when the numerology of the activated BWP of the uplink is $μ_2$, the slot offset may be calculated to be $k_2$.

Figure 15:
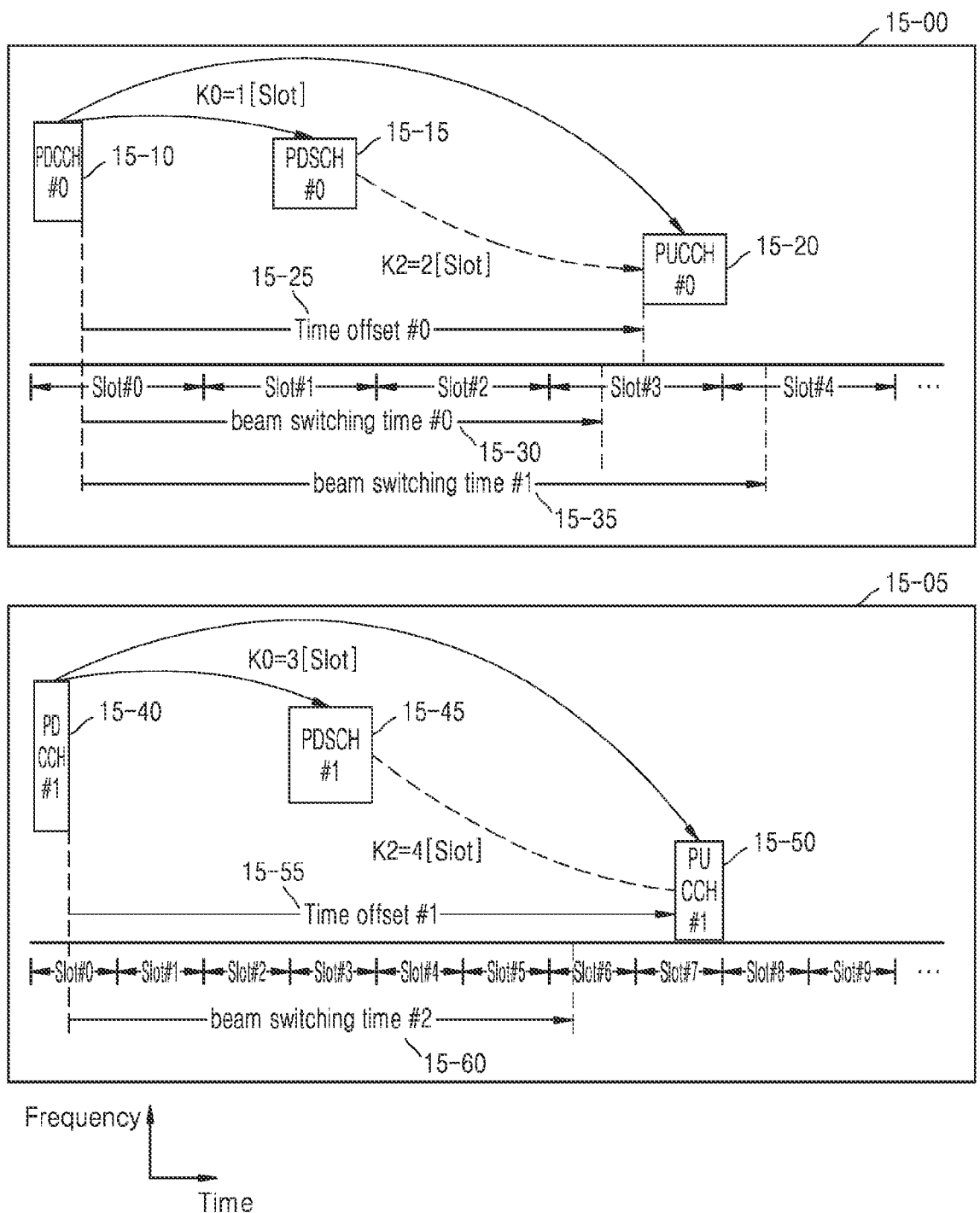
FIG. 15 is a diagram illustrating, when a base station schedules a PDSCH through DCI, frequency-time domain resource allocation of a PDCCH including the DCI for scheduling the PDSCH, the scheduled PDSCH, and a PUCCH including HARQ-ACK information for the PDSCH, according to some embodiments.

FIG. 15 is a diagram illustrating, when a base station schedules a PDSCH through DCI, frequency-time domain resource allocation of a PDCCH including the DCI for scheduling the PDSCH, the scheduled PDSCH, and a PUCCH including HARQ-ACK information for the PDSCH, according to some embodiments.

Referring to FIG. 15, when a base station schedules a PDSCH through DCI, Examples 15-00 and 15-05 of frequency-time domain resource allocation of a PDCCH including the DCI for scheduling the PDSCH, the scheduled PDSCH, and a PUCCH including HARQ-ACK information for the PDSCH are illustrated.

Referring to Example 15-00, frequency-time domain resource allocation of PDCCH #0 15-10 in which a base station schedules a PDSCH through DCI, scheduled PDSCH #0 15-15, and PUCCH #0 15-20 including HARQ-ACK information for PDSCH #0 15-15 is illustrated. Because Time offset #0 15-25 between PDCCH #0 15-10 and PUCCH #0 15-20 is equal to or greater than beam switching time #0 15-30 for PUCCH transmission, the UE may perform transmission of PUCCH #0 15-20 indicated by the base station. Referring to Example 15-05 in which a numerology of an activated BWP of a downlink and an uplink is twice that of Example 15-00, frequency-time domain resource allocation of PDCCH #1 15-40 in which the base station schedules a PDSCH through DCI, scheduled PDSCH #1 15-45, and PUCCH #1 15-50 including HARQ-ACK information for PDSCH #1 15-45 is illustrated. According to the above embodiments, considering that the numerology of the activated BWP of the uplink is twice that of Example 15-00, a slot offset K2 between the PDSCH and the PUCCH for transmitting HARQ-ACK feedback information is calculated to be twice. In this case, because Time offset #1 15-55 between PDCCH #1 15-40 and PUCCH #1 15-50 is equal to or greater than beam switching time #2 15-60 for PUCCH transmission, the UE may perform transmission of PUCCH #1 15-40 indicated by the base station.

4-2$^{th}$ Embodiment: Method of Indicating a Spatial Domain Transmission Filter for PUCCH Transmission In an embodiment, considering a beam switching time for PUCCH transmission of the UE, when the PUCCH transmission indication of the base station does not satisfy the beam switching time, the UE may determine that a sufficient time to transmit a PUCCH by using an uplink beam indicated by the base station is not guaranteed, and may perform PUCCH signal transmission by using an uplink beam according to a pre-determined rule without following the uplink beam indicated by the base station. From among configuration information of a PUCCH resource which the base station indicates the UE to transmit, configuration information of a PUCCH resource other than configuration information of the uplink beam may follow the indication of the base station. For example, when the PUCCH transmission indication of the base station does not satisfy the beam switching time, a rule according to which the UE determines an uplink beam for transmitting the PUCCH may follow one of the following methods.

Method 1: The UE may determine an uplink beam for transmitting the PUCCH by referring to spatial domain transmission filter configuration information of a preconfigured default PUCCH resource (e.g., PUCCH resource with a lowest ID configured in an activated uplink BWP of a serving cell).

Method 2: From among spatial domain transmission filter configuration information which may be configured for a PUCCH resource (e.g., one of preconfigured PUCCH-spatialRelationInfo) or may be used (e.g., spatial domain transmission filter used to receive an SS/PBCH block during initial access), the UE may determine an uplink bema by referring to preconfigured default spatial domain transmission filter configuration information.

Because Method 1 or 2 determines that the UE uses a pre-determined uplink beam, the complexity of uplink beam transmission of the UE when a beam switching time is not satisfied may be reduced. Also, because Method 1 or 2 allows the base station to understand an uplink beam of the UE when a beam switching time is not satisfied, the uplink signal decoding performance of the base station may be improved.

Referring to Example 15-00, frequency-time domain resource allocation of PDCCH #0 15-10 in which the base station schedules a PDSCH through DCI, scheduled PDSCH #0 15-15, and PUCCH #0 15-20 including HARQ-ACK information for PDSCH #0 15-15 is illustrated. Because Time offset #0 15-25 between PDCCH #0 15-10 and PUCCH #0 15-20 is equal to or less than beam switching time #1 15-35 for PUCCH transmission, the UE may not perform transmission of PUCCH #0 15-20 indicated by the base station, may determine an uplink beam for transmission of PUCCH #0 15-20 by referring to spatial domain transmission filter configuration information of a preconfigured default PUCCH resource (e.g., PUCCH resource with a lowest ID configured in an activated uplink BWP of a serving cell), or may determine an uplink beam by referring to a preconfigured default spatial domain transmission filter configuration information from among spatial domain transmission filter configuration information that may be configured for a PUCCH resource.

Figure 16:
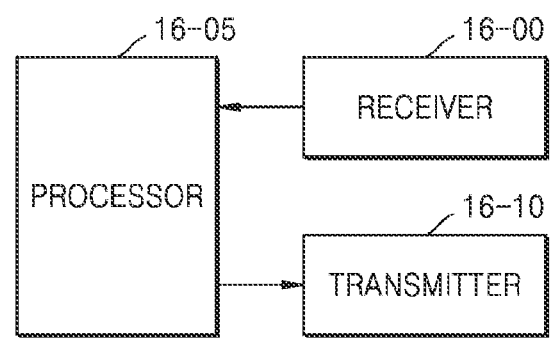
FIG. 16 is a block diagram illustrating a structure of a UE, according to some embodiments.

FIG. 16 is a block diagram illustrating a structure of a UE, according to some embodiments.

Referring to FIG. 16, a UE may include a transmitter 16-10, a receiver 16-00, and a processing unit 16-05 including a memory and a processor. According to a communication method of the UE described above, the transmitter 16-10, the receiver 16-00, and the processing unit 16-05 of the UE may operate. However, elements of the UE are not limited thereto. For example, the UE may include more or fewer elements than those illustrated in FIG. 16. Also, the transmitter 16-10, the receiver 16-00, and the processing unit 16-05 may be implemented as one chip.

The transmitter 16-10 and the receiver 16-00 may transmit and receive a signal to and from a base station. The signal may include control information and data. To this end, the transmitter 16-10 and the receiver 16-00 may include a radio frequency (RF) transmitter that up-converts and amplifies a frequency of a transmitted signal and an RF receiver that low-nose amplifies a received signal and down-converts a frequency. However, this is merely an example, and elements of the transmitter 16-10 and the receiver 16-00 are not limited to the RF transmitter and the RF receiver.

Also, the transmitter 16-10 and the receiver 16-00 may receive a signal through a wireless channel and may output a signal to the processing unit 16-05, and may transmit a signal output from the processing unit 16-05 through the wireless channel.

The processing unit 16-05 may store a program and data required for an operation of the UE. Also, the processing unit 16-05 may store control information or data included in a signal obtained from the UE. The processing unit 16-05 may include a memory including a storage medium such as a read-only memory (ROM), a random-access memory (RAM), a hard disk, a compact disc-ROM (CD-ROM), or a digital versatile disc (DVD), or a combination thereof.

Also, the processing unit 16-05 may control a series of processes so that the UE operates according to the above embodiments. According to some embodiments, the processing unit 16-05 may control elements of the UE to simultaneously receive a plurality of PDSCHs by receiving DCI including two layers.

Figure 17:
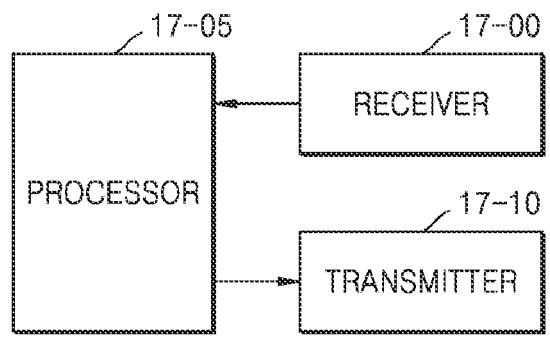
FIG. 17 is a block diagram illustrating a structure of a base station, according to some embodiments.

FIG. 17 is a block diagram illustrating a structure of a base station, according to some embodiments.

Referring to FIG. 17, a base station may include a transmitter 17-10, a receiver 17-00, and a processing unit 17-05 including a memory and a processor. According to a communication method of the base station described above, the transmitter 17-10, the receiver 17-00, and the processing unit 17-05 may operate. However, elements of the base station are not limited thereto. For example, the base station may include more or fewer elements than those illustrated in FIG. 17. Also, the transmitter 17-10, the receiver 17-00, and the processing unit 17-05 may be implemented as one chip.

The transmitter 17-10 and the receiver 17-00 may transmit and receive a signal to and from a UE. The signal may include control information and data. To this end, the transmitter 17-10 and the receiver 17-00 may include an RF transmitter that up-converts and amplifies a frequency of a transmitted signal, and an RF receiver that low-noise amplifies a received signal and down-converts a frequency. However, this is merely an example, and elements of the transmitter 17-10 and the receiver 17-00 are not limited to the RF transmitter and the RF receiver.

Also, the transmitter 17-10 and the receiver 17-00 may receive a signal through a wireless channel and may output a signal to the processing unit 17-05, and may transmit a signal output from the processing unit 17-05 through the wireless channel.

The processing unit 17-05 may store a program and data required for an operation of the base station. Also, the processing unit 17-05 may store control information or data included in a signal obtained from the base station. The processing unit 17-05 may include a memory including a storage medium such as a ROM, a RAM, a hard disk, a CD-ROM, or a DVD, or a combination thereof.

The processing unit 17-05 may control a series of processes so that the base station operates according to the above embodiments of the present disclosure. According to some embodiments, the processing unit 17-05 may configure DCI including allocation information of a PDSCH, and may control each element of the base station to transmit the DCI.

In a wireless communication system according to an embodiment, a UE may transmit beam switching time-related capability information for uplink signal transmission to a base station, may receive information about a beam switching time determined based on at least one of the capability information, a type of an uplink signal, and a numerology of an uplink BWP from the base station, and may perform uplink signal transmission based on the information about the beam switching time.

According to an embodiment of the present disclosure, an operating method of a base station in a wireless communication system includes receiving, from a terminal, information related to a first beam switching time for transmission of an uplink signal, determining a second beam switching time for transmission of the uplink signal, based on configuration information related to the uplink signal and the first beam switching time, transmitting the configuration information related to the uplink signal and the second beam switching time to the terminal, and receiving the uplink signal from the terminal, wherein the uplink signal includes at least one of a sounding reference signal (SRS), a physical uplink shared channel (PUSCH), or a physical uplink control channel (PUCCH).

According to an embodiment, when the uplink signal includes the SRS, the configuration information related to the uplink signal may include time domain transmission information of the SRS or information related to a resource set of the SRS, wherein the determining of the second beam switching time for transmission of the uplink signal based on the configuration information related to the uplink signal and the first beam switching time includes determining the second beam switching time, based on at least one of the time domain transmission information of the SRS or the information related to the resource set of the SRS, and the first beam switching time.

According to an embodiment, when the uplink signal includes the PUSCH, the configuration information related to the uplink signal may include at least one of information about a downlink control information (DCI) format for indicating transmission of the PUSCH, information about a precoding method for the PUSCH, information related to a resource set of the SRS corresponding to the precoding method for the PUSCH, or information indicating a relationship between an antenna port number related to transmission of the PUSCH and an antenna port number related to transmission of the SRS, wherein the determining of the second beam switching time for transmission of the uplink signal based on the configuration information related to the uplink signal and the first beam switching time includes determining the second beam switching time based on at least one of the information about the DCI format for indicating transmission of the PUSCH, the information about the precoding method for the PUSCH, the information related to the resource set of the SRS corresponding to the precoding method for the PUSCH, or the information indicating the relationship between the antenna port number related to transmission of the PUSCH and the antenna port number related to transmission of the SRS, and the first beam switching time.

According to an embodiment, when the uplink signal includes the PUCCH, the configuration information related to the uplink signal may include at least one of information related to a resource of the PUCCH including HARQ-ACK for a physical downlink shared channel (PDSCH) or spatial relation information related to transmission of the PUCCH, wherein the determining of the second beam switching time for transmission of the uplink signal based on the configuration information related to the uplink signal and the first beam switching time includes determining the second beam switching time based on at least one of the information related to the resource of the PUCCH including HARQ-ACK for the PDSCH or the spatial relation information related to transmission of the PUCCH, and the first beam switching time.

According to an embodiment of the present disclosure, an operating method of a terminal in a wireless communication system includes transmitting, to a base station, information related to a first beam switching time for transmission of an uplink signal, receiving, from the base station, configuration information related to the uplink signal and information related to a second beam switching time for transmission of the uplink signal, wherein the second beam switching time is determined based on the first beam switching time and the configuration information related to the uplink signal, and transmitting the uplink signal to the base station, based on the configuration information related to the uplink signal and the second beam switching time, wherein the uplink signal includes at least one of a sounding reference signal (SRS), a physical uplink shared channel (PUSCH), or a physical uplink control channel (PUCCH).

According to an embodiment of the present disclosure, an operating method of a terminal in a wireless communication system includes determining, based on configuration information related to an uplink signal, a beam switching time for transmission of the uplink signal, receiving, from a base station, information indicating transmission of the uplink signal, and transmitting the uplink signal to the base station, based on the beam switching time and the information indicating transmission of the uplink signal, wherein the uplink signal includes at least one of a sounding reference signal (SRS), a physical uplink shared channel (PUSCH), or a physical uplink control channel (PUCCH).

According to an embodiment, when the uplink signal includes the SRS, the configuration information related to the uplink signal may include at least one of time domain transmission information of the SRS or information related to a resource set of the SRS, wherein the determining of the beam switching time for transmission of the uplink signal based on the configuration information related to the uplink signal includes determining the beam switching time based on at least one of the time domain transmission information of the SRS or the information related to the resource set of the SRS.

According to an embodiment, when the uplink signal includes the PUSCH, the configuration information related to the uplink signal may include at least one of information about a downlink control information (DCI) format for indicating transmission of the PUSCH, information about a precoding method for the PUSCH, information related to a resource set of the SRS corresponding to the precoding method for the PUSCH, or information indicating a relationship between an antenna port number related to transmission of the PUSCH and an antenna port number related to transmission of the SRS, wherein the determining of the beam switching time for transmission of the uplink signal based on the configuration information related to the uplink signal includes determining the beam switching time based on at least one of the information about the DCI format for indicating transmission of the PUSCH, the information about the precoding method for the PUSCH, the information related to the resource set of the SRS corresponding to the precoding method for the PUSCH, or the information indicating the relationship between the antenna port number related to transmission of the PUSCH and the antenna port number related to transmission of the SRS.

According to an embodiment, when the uplink signal includes the PUCCH, the configuration information related to the uplink signal may include at least one of information related to a resource of the PUCCH including HARQ-ACK for a physical downlink shared channel (PDSCH) or spatial relation information related to transmission of the PUCCH, wherein the determining of the beam switching time for transmission of the uplink signal based on the configuration information related to the uplink signal includes determining the beam switching time based on at least one of the information related to the resource of the PUCCH including HARQ-ACK for the PDSCH or the spatial relation information related to transmission of the PUCCH.

According to an embodiment, when the uplink signal includes the SRS, the information indicating transmission of the uplink signal may include information indicating transmission of the SRS, wherein the operating method further includes determining, based on the beam switching time, a minimum time interval between a time point when the information indicating transmission of the SRS is received and a time point when the SRS is transmitted.

According to an embodiment, the transmitting of the uplink signal to the base station based on the beam switching time and the information indicating transmission of the uplink signal may include determining whether to transmit the SRS based on the information indicating transmission of the SRS, by comparing at least one of the minimum time interval or the beam switching time with a time offset between a resource to which the information indicating transmission of the SRS is allocated and at least one resource set for the SRS allocated by the information indicating transmission of the SRS.

According to an embodiment, when the uplink signal includes the PUSCH, the information indicating transmission of the uplink signal may include information indicating transmission of the PUSCH, wherein the operating method further includes determining a PUSCH preparation procedure time for transmission of the PUSCH, based on the beam switching time.

According to an embodiment, the transmitting of the uplink signal to the base station based on the beam switching time and the information indicating transmission of the uplink signal may include determining whether to transmit the PUSCH based on the information indicating transmission of the PUSCH, by comparing at least one of the PUSCH preparation procedure time or the beam switching time with a time offset between a resource to which the information indicating transmission of the PUSCH is allocated and a PUSCH resource allocated by the information indicating transmission of the PUSCH.

According to an embodiment, when the uplink signal includes the PUCCH, the information indicating transmission of the uplink signal may include information indicating transmission of the PUCCH, wherein the operating method further includes determining a time interval between a time point when a PDCCH including information for scheduling a physical downlink shared channel (PDSCH) is received and a time point when the PUCCH including HARQ-ACK for the PDSCH is transmitted.

According to an embodiment, the transmitting of the uplink signal to the base station based on the beam switching time and the information indicating transmission of the uplink signal may include determining whether to transmit the PUCCH based on the information indicating transmission of the PUCCH, by comparing the time interval between the time point when the PDCCH is received and the time point when the PUCCH is transmitted with the beam switching time.

It should be understood that the embodiments of the present disclosure described herein should be considered in a descriptive sense only and not for purposes of limitation. That is, it will be understood by one of ordinary skill in the art that various changes in form and details may be made in the embodiments of the present disclosure without departing from the spirit and scope of the present disclosure. Also, the embodiments of the present disclosure may be used in combination when necessary. For example, parts of Embodiment 1 and Embodiment 2 of the present disclosure may be combined with each other so that a base station and a UE operate.

In detailed embodiments of the present disclosure, components included in the present disclosure have been expressed as singular or plural according to the detailed embodiments of the present disclosure. However, the singular or plural form is selected appropriately for a condition provided for convenience of explanation, and the present disclosure is not limited to the singular or plural form. An element expressed in a singular form may include a plurality of elements and elements expressed in a plural form may include a single element.

Particular embodiments of the present disclosure have been described in the detailed descriptions of the present disclosure, but it will be understood that various modifications may be made without departing the scope of the present disclosure. Hence, the scope of the present disclosure is not limited to the above embodiments of the present disclosure, and may be defined by not only the following claims but also equivalents thereof.

The invention claimed is:

1. An operating method of a base station in a wireless communication system, the operating method comprising:
receiving, from a terminal, information related to a first beam switching time for transmission of an uplink signal;
determining a second beam switching time for transmission of the uplink signal, based on configuration information related to the uplink signal and the first beam switching time;
transmitting, to the terminal, the configuration information related to the uplink signal and the second beam switching time; and
receiving, from the terminal, the uplink signal,
wherein the uplink signal comprises at least one of a sounding reference signal (SRS), a physical uplink shared channel (PUSCH), or a physical uplink control channel (PUCCH).

2. The operating method of claim 1, wherein, when the uplink signal comprises the SRS, the configuration information related to the uplink signal comprises time domain transmission information of the SRS or information related to a resource set of the SRS,
wherein the determining of the second beam switching time for transmission of the uplink signal based on the configuration information related to the uplink signal and the first beam switching time comprises determining the second beam switching time, based on at least one of the time domain transmission information of the SRS or the information related to the resource set of the SRS, and the first beam switching time.

3. The operating method of claim 1, wherein, when the uplink signal comprises the PUSCH, the configuration information related to the uplink signal comprises at least one of information about a downlink control information (DCI) format for indicating transmission of the PUSCH, information about a precoding method for the PUSCH, information related to a resource set of the SRS corresponding to the precoding method for the PUSCH, or information indicating a relationship between an antenna port number related to transmission of the PUSCH and an antenna port number related to transmission of the SRS,
wherein the determining of the second beam switching time for transmission of the uplink signal based on the configuration information related to the uplink signal and the first beam switching time comprises determining the second beam switching time based on at least one of the information about the DCI format for indicating transmission of the PUSCH, the information about the precoding method for the PUSCH, the information related to the resource set of the SRS corresponding to the precoding method for the PUSCH, or the information indicating the relationship between the antenna port number related to transmission of the PUSCH and the antenna port number related to transmission of the SRS, and the first beam switching time.

4. The operating method of claim 1, wherein, when the uplink signal comprises the PUCCH, the configuration information related to the uplink signal comprises at least one of information related to a resource of the PUCCH comprising hybrid repeat request acknowledgement (HARQ-ACK) for a physical downlink shared channel (PDSCH) or spatial relation information related to transmission of the PUCCH,
wherein the determining of the second beam switching time for transmission of the uplink signal based on the configuration information related to the uplink signal and the first beam switching time comprises determining the second beam switching time based on at least one of the information related to the resource of the PUCCH comprising HARQ-ACK for the PDSCH or the spatial relation information related to transmission of the PUCCH, and the first beam switching time.

5. An operating method of a terminal in a wireless communication system, the operating method comprising:
transmitting, to a base station, information related to a first beam switching time for transmission of an uplink signal;
receiving, from the base station, configuration information related to the uplink signal and information related to a second beam switching time for transmission of the uplink signal, wherein the second beam switching time is determined based on the first beam switching time and the configuration information related to the uplink signal; and
transmitting the uplink signal to the base station, based on the configuration information related to the uplink signal and the second beam switching time,
wherein the uplink signal comprises at least one of a sounding reference signal (SRS), a physical uplink shared channel (PUSCH), or a physical uplink control channel (PUCCH).

6. An operating method of a terminal in a wireless communication system, the operating method comprising:
determining, based on configuration information related to an uplink signal, a beam switching time for transmission of the uplink signal;
receiving, from a base station, information indicating transmission of the uplink signal; and
transmitting the uplink signal to the base station, based on the beam switching time and the information indicating transmission of the uplink signal,
wherein the uplink signal comprises at least one of a sounding reference signal (SRS), a physical uplink shared channel (PUSCH), or a physical uplink control channel (PUCCH).

7. The operating method of claim 6, wherein, when the uplink signal comprises the SRS, the configuration information related to the uplink signal comprises at least one of time domain transmission information of the SRS or information related to a resource set of the SRS,
wherein the determining of the beam switching time for transmission of the uplink signal based on the configuration information related to the uplink signal comprises determining the beam switching time based on at least one of the time domain transmission information of the SRS or the information related to the resource set of the SRS.

8. The operating method of claim 6, wherein, when the uplink signal comprises the PUSCH, the configuration information related to the uplink signal comprises at least one of information about a downlink control information (DCI) format for indicating transmission of the PUSCH, information about a precoding method for the PUSCH, information related to a resource set of the SRS corresponding to the precoding method for the PUSCH, or information indicating a relationship between an antenna port number related to transmission of the PUSCH and an antenna port number related to transmission of the SRS, wherein the determining of the beam switching time for transmission of the uplink signal based on the configuration information related to the uplink signal comprises determining the beam switching time based on at least one of the information about the DCI format for indicating transmission of the PUSCH, the information about the precoding method for the PUSCH, the information related to the resource set of the SRS corresponding to the precoding method for the PUSCH, or the information indicating the relationship between the antenna port number related to transmission of the PUSCH and the antenna port number related to transmission of the SRS.

9. The operating method of claim 6, wherein, when the uplink signal comprises the PUCCH, the configuration information related to the uplink signal comprises at least one of information related to a resource of the PUCCH comprising hybrid repeat request acknowledgement (HARQ-ACK) for a physical downlink shared channel (PDSCH) or spatial relation information related to transmission of the PUCCH, wherein the determining of the beam switching time for transmission of the uplink signal based on the configuration information related to the uplink signal comprises determining the beam switching time based on at least one of the information related to the resource of the PUCCH comprising HARQ-ACK for the PDSCH or the spatial relation information related to transmission of the PUCCH.

10. The operating method of claim 6, wherein, when the uplink signal comprises the SRS, the information indicating transmission of the uplink signal comprises information indicating transmission of the SRS, wherein the operating method further comprises determining, based on the beam switching time, a minimum time interval between a time point when the information indicating transmission of the SRS is received and a time point when the SRS is transmitted.

11. The operating method of claim 10, wherein the transmitting of the uplink signal to the base station based on the beam switching time and the information indicating transmission of the uplink signal comprises determining whether to transmit the SRS based on the information indicating transmission of the SRS, by comparing at least one of the minimum time interval or the beam switching time with a time offset between a resource to which the information indicating transmission of the SRS is allocated and at least one resource set for the SRS allocated by the information indicating transmission of the SRS.

12. The operating method of claim 6, wherein, when the uplink signal comprises the PUSCH, the information indicating transmission of the uplink signal comprises information indicating transmission of the PUSCH, wherein the operating method further comprises determining a PUSCH preparation procedure time for transmission of the PUSCH, based on the beam switching time.

13. The operating method of claim 12, wherein the transmitting of the uplink signal to the base station based on the beam switching time and the information indicating transmission of the uplink signal comprises determining whether to transmit the PUSCH based on the information indicating transmission of the PUSCH, by comparing at least one of the PUSCH preparation procedure time or the beam switching time with a time offset between a resource to which the information indicating transmission of the PUSCH is allocated and a PUSCH resource allocated by the information indicating transmission of the PUSCH.

14. The operating method of claim 6, wherein, when the uplink signal comprises the PUCCH, the information indicating transmission of the uplink signal comprises information indicating transmission of the PUCCH, wherein the operating method further comprises determining a time interval between a time point when a PDCCH comprising information for scheduling a physical downlink shared channel (PDSCH) is received and a time point when the PUCCH comprising HARQ-ACK for the PDSCH is transmitted.

15. The operating method of claim 14, wherein the transmitting of the uplink signal to the base station based on the beam switching time and the information indicating transmission of the uplink signal comprises determining whether to transmit the PUCCH based on the information indicating transmission of the PUCCH, by comparing the time interval between the time point when the PDCCH is received and the time point when the PUCCH is transmitted with the beam switching time.

* * * * *